United States Patent
Kilpatrick, II et al.

(10) Patent No.: US 8,860,765 B2
(45) Date of Patent: Oct. 14, 2014

(54) MOBILE DEVICE WITH AN INCLINOMETER

(75) Inventors: Thomas E. Kilpatrick, II, San Diego, CA (US); Sten Jorgen Ludvig Dahl, San Diego, CA (US); Patrik N. Lundqvist, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 946 days.

(21) Appl. No.: 12/553,332

(22) Filed: Sep. 3, 2009

(65) Prior Publication Data

US 2010/0060664 A1   Mar. 11, 2010

Related U.S. Application Data

(60) Provisional application No. 61/095,225, filed on Sep. 8, 2008.

(51) Int. Cl.
*G09G 5/00* (2006.01)
*G06F 1/16* (2006.01)

(52) U.S. Cl.
CPC ...... *G06F 1/1694* (2013.01); *G06F 2200/1635* (2013.01); *G06F 1/1677* (2013.01); *G06F 1/1654* (2013.01); *G06F 1/1641* (2013.01); *G06F 1/1616* (2013.01); *G06F 1/1649* (2013.01); *G06F 2200/1614* (2013.01); *G06F 1/1684* (2013.01)
USPC .............. 345/659; 345/1.1; 345/1.2; 345/1.3; 345/649; 345/650; 345/657

(58) Field of Classification Search
None
See application file for complete search history.

(56) References Cited

U.S. PATENT DOCUMENTS

| | | | |
|---|---|---|---|
| 6,133,898 A | 10/2000 | Ludolph et al. | |
| 6,252,563 B1 | 6/2001 | Tada et al. | |
| 6,331,840 B1 | 12/2001 | Nielson et al. | |
| 6,466,369 B1 | 10/2002 | Maddock | |
| 6,567,101 B1 | 5/2003 | Thomas | |
| 6,573,913 B1 | 6/2003 | Butler et al. | |
| 6,577,496 B1 | 6/2003 | Gioscia et al. | |
| 6,643,124 B1 * | 11/2003 | Wilk | 361/679.04 |
| 6,765,553 B1 | 7/2004 | Odamura | |
| 7,028,410 B2 | 4/2006 | Sato et al. | |

(Continued)

FOREIGN PATENT DOCUMENTS

| CN | 1484068 A | 3/2004 |
|---|---|---|
| CN | 1575117 A | 2/2005 |

(Continued)

OTHER PUBLICATIONS

International Search Report—PCT/US2009/056290—International Search Authority, European Patent Office, Dec. 18, 2009.

(Continued)

*Primary Examiner* — Jwalant Amin
(74) *Attorney, Agent, or Firm* — James R. Gambale, Jr.

(57) ABSTRACT

A method is disclosed that includes detecting a change in an inclination at a panel of an electronic device. The panel has a display surface. The method also includes detecting a rotation of the panel from a first orientation to a second orientation. The method also includes automatically redrawing an image displayed at the display surface responsive to the rotation when the change in the inclination of the panel does not exceed a threshold during the rotation.

38 Claims, 46 Drawing Sheets

(56) References Cited

U.S. PATENT DOCUMENTS

| | | |
|---|---|---|
| 7,145,593 B2 | 12/2006 | Yamaguchi et al. |
| 7,184,025 B2 | 2/2007 | Williams et al. |
| 7,210,236 B2 | 5/2007 | Sato et al |
| 7,231,609 B2 | 6/2007 | Baudisch |
| 7,453,418 B2 | 11/2008 | Palmquist |
| 7,637,024 B2 | 12/2009 | Amundson et al. |
| 7,958,644 B2 | 6/2011 | Boeve et al. |
| 8,068,121 B2 | 11/2011 | Williamson et al. |
| 2002/0158811 A1 | 10/2002 | Davis |
| 2003/0095373 A1 | 5/2003 | Duquette |
| 2004/0108968 A1 | 6/2004 | Finke-Anlauff |
| 2004/0203520 A1 | 10/2004 | Schirtzinger et al. |
| 2005/0024349 A1 | 2/2005 | Shon |
| 2005/0099361 A1 | 5/2005 | Majer |
| 2005/0122671 A1 | 6/2005 | Homer |
| 2005/0155184 A1 | 7/2005 | Kayl |
| 2005/0235458 A1 | 10/2005 | Zou |
| 2006/0017692 A1 | 1/2006 | Wehrenberg et al. |
| 2006/0026243 A1 | 2/2006 | Franchuk et al. |
| 2006/0034042 A1 | 2/2006 | Hisano et al. |
| 2006/0094480 A1 | 5/2006 | Tanaka |
| 2006/0109197 A1 | 5/2006 | Kuwabara et al. |
| 2006/0161278 A1* | 7/2006 | Maeda et al. ............ 700/94 |
| 2006/0264243 A1 | 11/2006 | Aarras |
| 2006/0284785 A1 | 12/2006 | Bitterlich |
| 2007/0041151 A1 | 2/2007 | Park |
| 2007/0046561 A1 | 3/2007 | Cheon et al. |
| 2007/0085759 A1 | 4/2007 | Lee et al. |
| 2007/0126910 A1 | 6/2007 | Misawa |
| 2007/0252823 A1 | 11/2007 | Hirota |
| 2007/0263081 A1 | 11/2007 | De Beer et al. |
| 2007/0268264 A1 | 11/2007 | Aarras et al. |
| 2007/0273666 A1 | 11/2007 | Shin et al. |
| 2007/0279315 A1 | 12/2007 | Laves et al. |
| 2008/0062625 A1 | 3/2008 | Batio |
| 2008/0259095 A1 | 10/2008 | Dubs et al. |
| 2009/0193351 A1 | 7/2009 | Lee et al. |
| 2009/0244832 A1 | 10/2009 | Behar et al. |
| 2009/0296331 A1 | 12/2009 | Choy |
| 2009/0303208 A1 | 12/2009 | Case, Jr. et al. |
| 2009/0309846 A1 | 12/2009 | Trachtenberg et al. |
| 2010/0007576 A1 | 1/2010 | Demuynck et al. |
| 2010/0039350 A1 | 2/2010 | Wakefield et al. |
| 2010/0053089 A1* | 3/2010 | Kwok et al. ............ 345/173 |
| 2010/0060547 A1 | 3/2010 | Bloebaum et al. |
| 2010/0064244 A1 | 3/2010 | Kilpatrick, II et al. |
| 2010/0064536 A1 | 3/2010 | Caskey et al. |
| 2010/0066643 A1 | 3/2010 | King et al. |
| 2010/0079355 A1 | 4/2010 | Kilpatrick, II et al. |
| 2010/0085274 A1 | 4/2010 | Kilpatrick, II et al. |
| 2010/0085382 A1 | 4/2010 | Lundqvist et al. |
| 2010/0245275 A1 | 9/2010 | Tanaka |
| 2011/0109526 A1 | 5/2011 | Bauza et al. |
| 2011/0126141 A1 | 5/2011 | King et al. |
| 2011/0210922 A1 | 9/2011 | Griffin |
| 2011/0216064 A1 | 9/2011 | Dahl et al. |
| 2011/0216082 A1 | 9/2011 | Caskey et al. |
| 2012/0084674 A1 | 4/2012 | Visosky |
| 2012/0084722 A1 | 4/2012 | Cassar et al. |

FOREIGN PATENT DOCUMENTS

| | | |
|---|---|---|
| CN | 1694059 A | 11/2005 |
| CN | 2752839 Y | 1/2006 |
| CN | 1761267 A | 4/2006 |
| CN | 1763590 A | 4/2006 |
| CN | 1930542 A | 3/2007 |
| CN | 1949905 A | 4/2007 |
| CN | 101184298 A | 5/2008 |
| DE | 20005910 U1 | 5/2000 |
| DE | 20102205 | 8/2001 |
| EP | 0454120 A2 | 10/1991 |
| EP | 0929027 | 7/1999 |
| EP | 1058181 A1 | 12/2000 |
| EP | 1775925 | 4/2007 |
| EP | 1775925 A2 * | 4/2007 |
| JP | 03071507 | 3/1991 |
| JP | 4248616 A | 9/1992 |
| JP | 6004208 A | 1/1994 |
| JP | 06044001 | 2/1994 |
| JP | 6083779 A | 3/1994 |
| JP | 8044672 A | 2/1996 |
| JP | 8272715 A | 10/1996 |
| JP | 9305259 A | 11/1997 |
| JP | 10319879 A | 12/1998 |
| JP | 11038953 A | 2/1999 |
| JP | 11305918 A | 11/1999 |
| JP | 2000068883 A | 3/2000 |
| JP | 2003520998 A | 7/2003 |
| JP | 2004046792 A | 2/2004 |
| JP | 2004078727 A | 3/2004 |
| JP | 2005260314 A | 9/2005 |
| JP | 2005278938 A | 10/2005 |
| JP | 2006003155 A | 1/2006 |
| JP | 2006053678 A | 2/2006 |
| JP | 2006243621 A | 9/2006 |
| JP | 2006276228 A | 10/2006 |
| JP | 2007033395 A | 2/2007 |
| JP | 2007220109 A | 8/2007 |
| JP | 2007525775 A | 9/2007 |
| JP | 2007281864 A | 10/2007 |
| JP | 2007293706 A | 11/2007 |
| JP | 2007328529 A | 12/2007 |
| JP | 2008085777 A | 4/2008 |
| JP | 2008139711 A | 6/2008 |
| JP | 2008203726 A | 9/2008 |
| JP | 2009159364 A | 7/2009 |
| JP | 2009236934 A | 10/2009 |
| JP | 2010238148 A | 9/2010 |
| KR | 20060086923 A | 8/2006 |
| RU | 2101752 C1 | 1/1998 |
| RU | 2151468 C1 | 6/2000 |
| RU | 2170496 C2 | 7/2001 |
| RU | 2295194 C2 | 3/2007 |
| RU | 2319997 C2 | 3/2008 |
| RU | 74259 U1 | 6/2008 |
| TW | M286420 U | 1/2006 |
| TW | 200612132 | 4/2006 |
| TW | I257596 B | 7/2006 |
| TW | 200702025 | 1/2007 |
| TW | M322689 U | 11/2007 |
| TW | M329121 U | 3/2008 |
| TW | M344283 U | 11/2008 |
| WO | 9709813 A1 | 3/1997 |
| WO | WO0153919 | 7/2001 |
| WO | WO02063439 A2 | 8/2002 |
| WO | 03096558 A1 | 11/2003 |
| WO | 2004088622 A1 | 10/2004 |
| WO | 2005020046 A1 | 3/2005 |
| WO | WO2005065180 | 7/2005 |
| WO | WO2005093550 | 10/2005 |
| WO | WO2005106637 | 11/2005 |
| WO | WO2005121930 | 12/2005 |
| WO | 2006080308 A1 | 8/2006 |
| WO | 2006123211 A2 | 11/2006 |
| WO | WO2007069835 A1 | 6/2007 |
| WO | WO2007135776 | 11/2007 |
| WO | 2008084798 A1 | 7/2008 |

OTHER PUBLICATIONS

Grudin J, "Partitioning Digital Worlds, Focal and Peripheral Awareness in Multiple Monitor Use", Microsoft Research, CHI 2001—Mar. 31-Apr. 2005, vol. No. 3, Issue No. 1, pp. 458-465.

Hinckley K., et al., "Codex A Dual Screen Tablet Computer", CHI 2009—New Mobile Interactions, Apr. 9, 2009, Boston, MA, pp. 1933-1942.

Matrox, "Matrox Monitor Bezel Management TripleHead2Go Digital Edition", Jun. 5, 2008, XP55028038, Retrieved from the Internet, URL: http//www.matrox.com/graphics/surroundgaming/media/en/pdf/Matrox_Monitor_Bezel_Management_White_Paper.pdf [retrieved on Nov. 30, 2010].

(56) References Cited

OTHER PUBLICATIONS

Matrox., "Matrox DTH2Go Bezel Management", Oct. 28, 2007, XP55028040, Retrieved from the Internet: URL: www.youtube.com/watch"v=ZxRRA-aGHBI [retrieved on May 24, 2012].

Rekimoto J., et al., "Augmented Surfaces: A Spatially Continuous Work Space for Hybrid Computing Environments", CHI 99 May 15-20, 1999, pp. 378-385.

Written Opinion—PCT/US2009/056290—ISA/EPO—Dec. 18, 2009.

Taiwan Search Report—TW098130266—TIPO—Jun. 26, 2013.

Apted T., et al., "Sharing Digital Media on Collaborative Tables and Displays", pp. 1- 4, 2005 Retrieved from the internet at: http://rp-www.cs.usyd.edu.au/-tapted/files/pubs/apted05sharing.pdf.

Taiwan Search Report—TW098130266—TIPO—May 2, 2014.

* cited by examiner

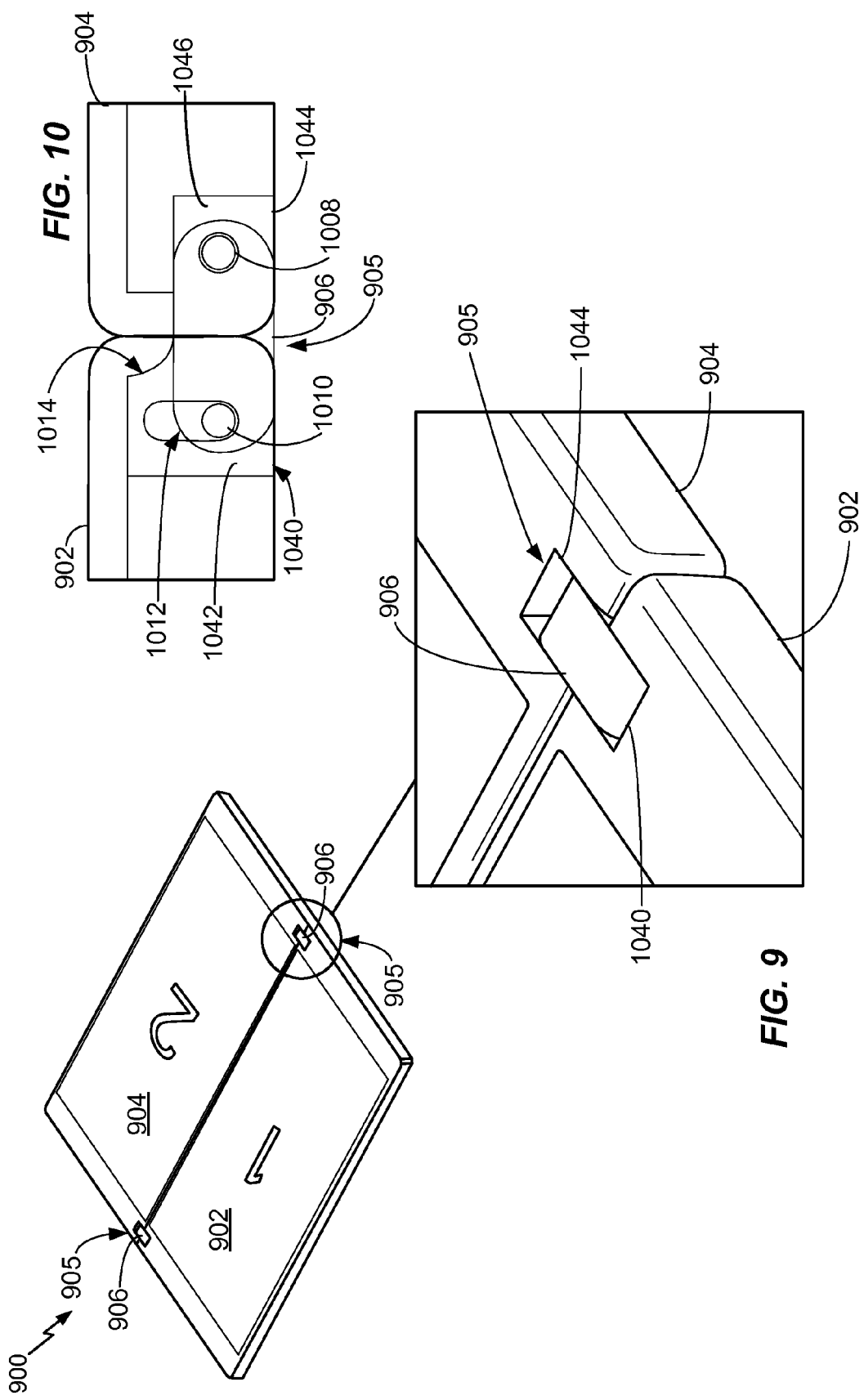

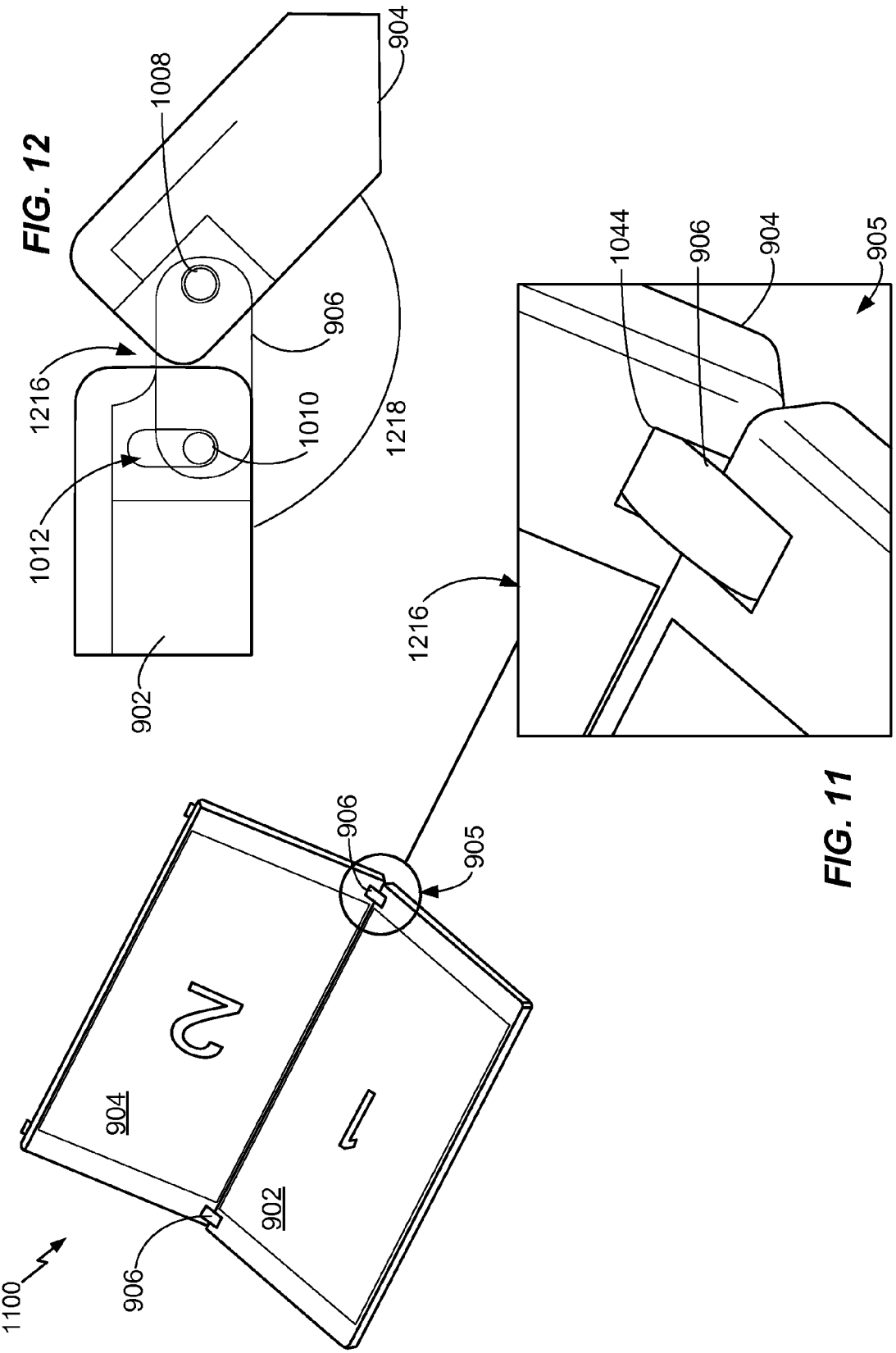

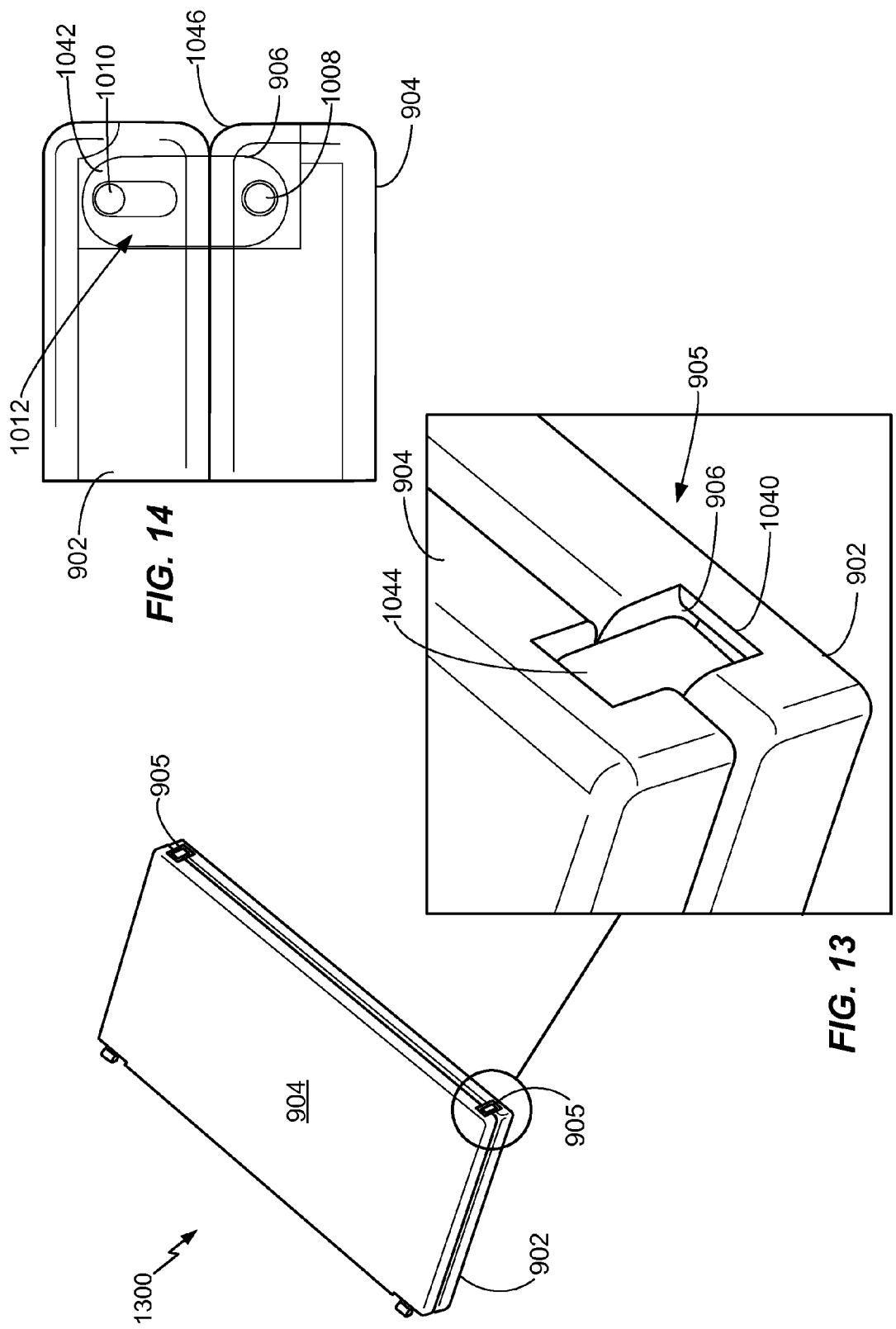

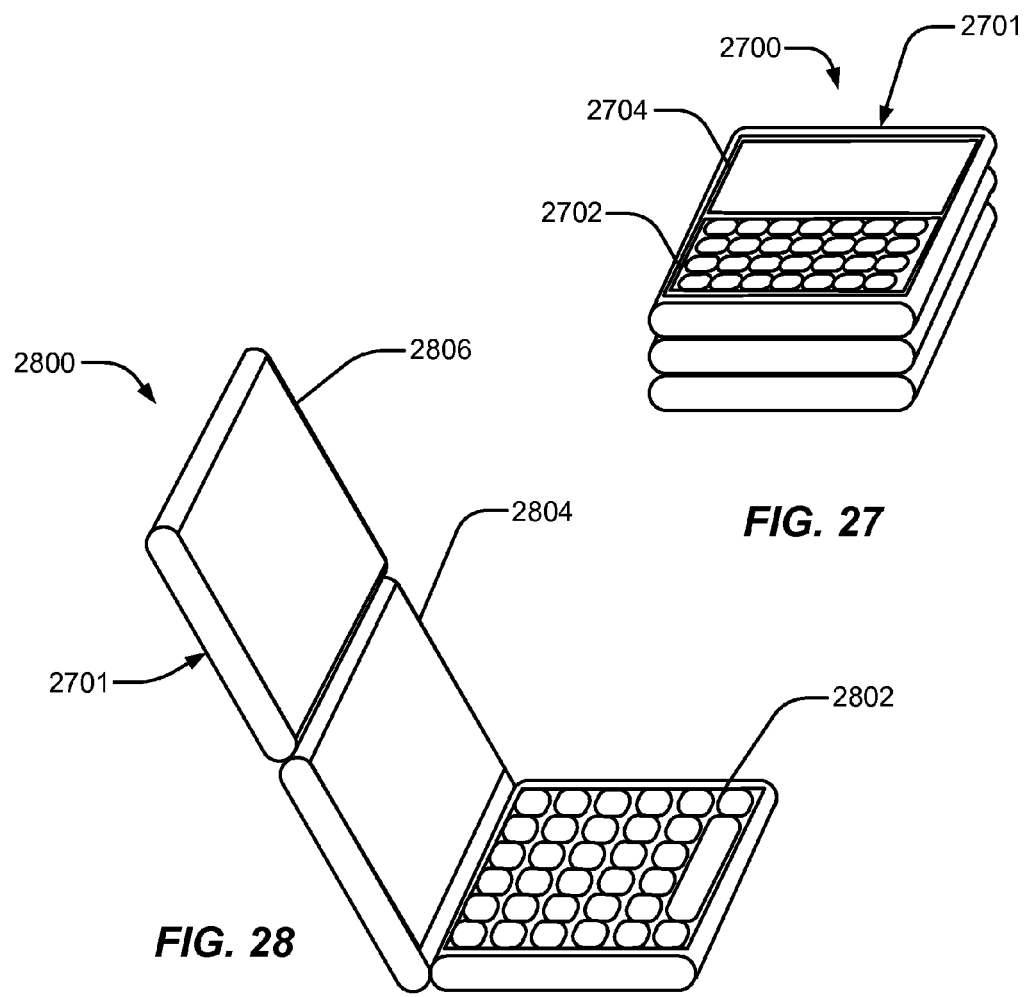
FIG. 27
FIG. 28
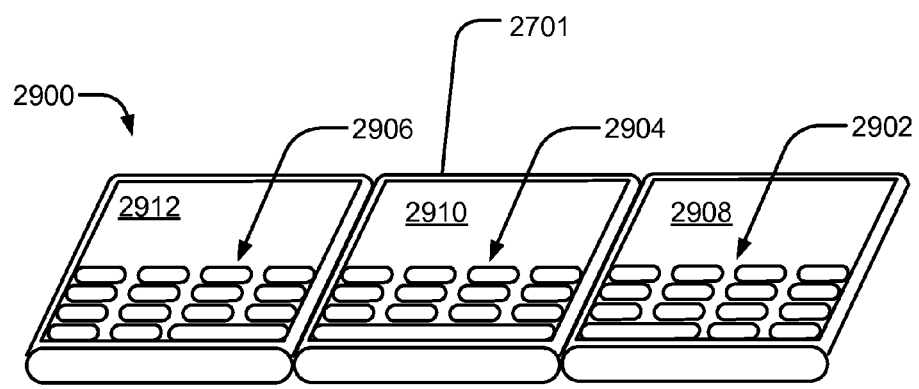
FIG. 29

MOBILE DEVICE WITH AN INCLINOMETER

CROSS-REFERENCE TO RELATED APPLICATIONS

The present disclosure claims the benefit of Provisional Application No. 61/095,225, filed Sep. 8, 2008, which is incorporated by reference herein in its entirety and to which priority is claimed.

FIELD

The present disclosure is generally related to a multi-panel electronic device with an inclinometer.

DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such portable wireless telephones include other types of devices that are incorporated therein. For example, a portable wireless telephone can also include a digital still camera, a digital video camera, a digital recorder, and an audio file player. Also, such wireless telephones can process executable instructions, including software applications, such as a web browser application, that can be used to access the Internet. As such, these portable wireless telephones can include significant computing capabilities.

Although such portable devices may support software applications, the usefulness of such portable devices is limited by a size of a display screen of the device. Generally, smaller display screens enable devices to have smaller form factors for easier portability and convenience. However, smaller display screens limit an amount of content that can be displayed to a user and may therefore reduce a richness of the user's interactions with the portable device.

SUMMARY

A mobile device with a controller, accelerometer, and an inclinometer is disclosed. The accelerometer is positioned off-center towards one end of the mobile device. The controller senses acceleration of the mobile device greater than a predetermined threshold indicating rotation of the mobile device and also determines that the inclination of the mobile device has been relatively constant during the rotation. The controller holds the content displayed on the multi-fold mobile device in place as the device turns by continuously redrawing the content until the acceleration stops. This enables a user of the device to spin the device, while the device is flat or otherwise, to switch the display of the content from a portrait to landscape display, or any display position in between.

In a particular embodiment, an electronic device is disclosed that includes a first panel having a first display surface, a second panel having a second display surface, a third panel having a third display surface. The first panel is rotatably coupled to a first edge of the second panel and the third panel is rotatably coupled to a second edge of the second panel. The electronic device also includes an inclinometer located at the second panel and configured to detect a change in an inclination of the second panel. The electronic device also includes an accelerometer offset from a center of the second panel to detect a rotation of the second panel from a landscape orientation to a portrait orientation. The electronic device also includes a processor configured to execute at least one software application having a graphical user interface. The processor is responsive to the inclinometer and responsive to the accelerometer to redraw an image displayed at the first display surface, the second display surface, the third display surface, or any combination thereof, from a landscape-type display of the image to a portrait-type display of the image when the first panel, the second panel, and the third panel are in at least one predetermined folding configuration and the change in the inclination of the second panel does not exceed a threshold during the rotation of the second panel.

In another particular embodiment, a method is disclosed that includes detecting a change in an inclination at a panel of an electronic device, where the panel has a display surface. The method also includes detecting a rotation of the panel from a first orientation to a second orientation. The method also includes automatically redrawing an image displayed at the display surface responsive to the rotation when the change in the inclination of the panel does not exceed a threshold during the rotation.

One particular advantage provided by at least one of the disclosed embodiments is an intuitive operation of a multi-panel electronic device in which the multi-panel electronic device maintains a static display with respect to the view of a user of the multi-panel electronic device during rotation of the multi-panel electronic device. This particular advantage may also be observed when the device is parallel to the ground while rotating.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

FIG. 9 is a diagram of a third illustrative embodiment of an electronic device;

FIG. 10 is a partial cross-sectional diagram of the electronic device of FIG. 9;

FIG. 11 is a diagram of an illustrative embodiment of the electronic device of FIG. 9 in an angled configuration;

FIG. 12 is a partial cross-sectional diagram of the electronic device in the angled configuration of FIG. 11;

FIG. 13 is a diagram of an illustrative embodiment of the electronic device of FIG. 9 in a folded configuration;

FIG. 14 is a partial cross-sectional diagram of the electronic device in the folded configuration of FIG. 13;

FIG. 27 is a diagram of a ninth illustrative embodiment of an electronic device;

FIG. 28 is a diagram of an illustrative embodiment of the electronic device of FIG. 27 in a thumbing configuration;

FIG. 29 is a diagram of an illustrative embodiment of the electronic device of FIG. 27 in a fully extended configuration;

DETAILED DESCRIPTION

Figure 1:
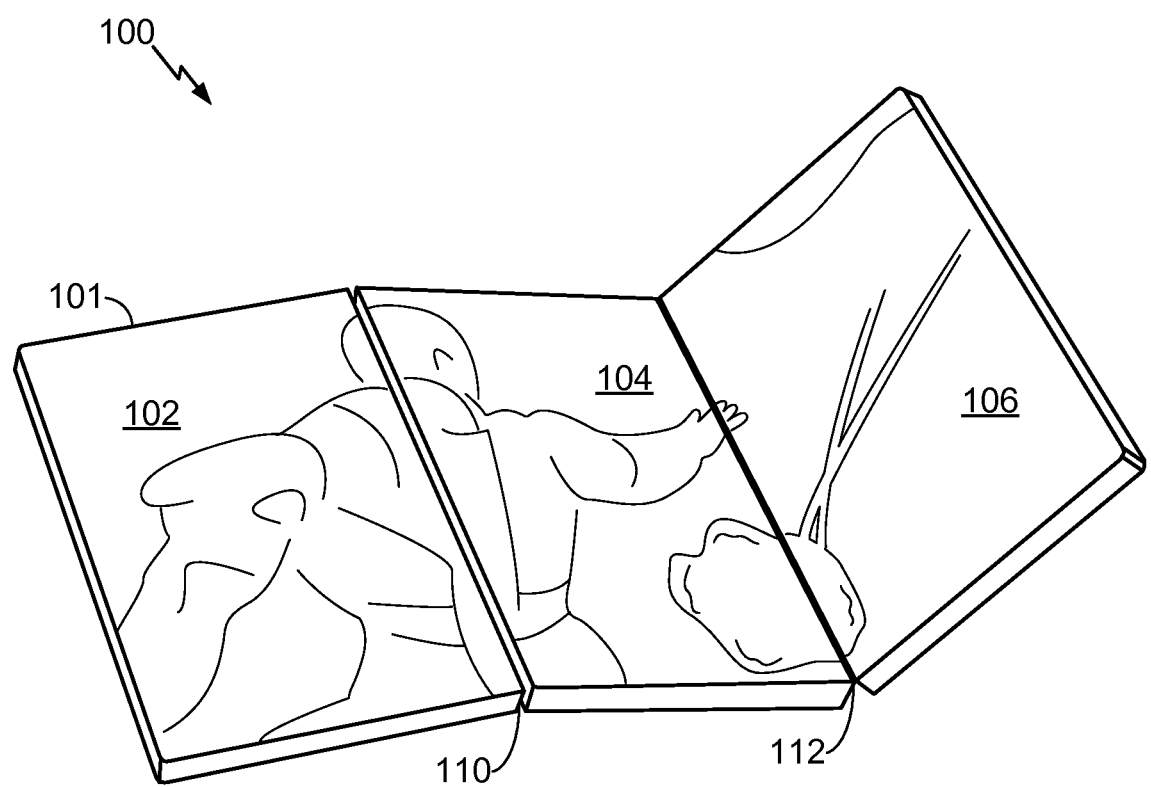
FIG. 1 is a diagram of a first illustrative embodiment of an electronic device.

Referring to FIG. 1, a first illustrated embodiment of an electronic device is depicted and generally designated 100. The electronic device 101 includes a first panel 102, a second panel 104, and a third panel 106. The first panel 102 is coupled to the second panel 104 along a first edge at a first fold location 110. The second panel 104 is coupled to the third panel 106 along a second edge of the second panel 104, at a second fold location 112. Each of the panels 102, 104, and 106 includes a display surface configured to provide a visual display, such as a liquid crystal display (LCD) screen. The electronic device 101 is a wireless communication device having multiple display surfaces and configured to automatically adjust a user interface or to display images when a user changes a physical configuration of the electronic device 101.

As depicted in FIG. 1 the first panel 102 and the second panel 104 are rotatably coupled at the first fold location 110 to enable a variety of device configurations. For example, the first panel 102 and the second panel 104 may be positioned such that the display surfaces are substantially coplanar to form a substantially flat surface. As another example, the first panel 102 and the second panel 104 may be rotated relative to each other around the first fold location 110 until a back surface of the first panel 102 contacts a back surface of the second panel 104. Likewise, the second panel 104 is rotatably coupled to the third panel 106 along the second fold location 112, enabling a variety of configurations including a fully folded, closed configuration where the display surface of the second panel 104 contacts the display surface of the third panel 106 and a fully extended configuration where the second panel 104 and the third panel 106 are substantially coplanar.

In a particular embodiment, the first panel 102, the second panel 104, and the third panel 106 may be manually configured into one or more physical folded states, as will be described with respect to FIGS. 2-7. By enabling the electronic device 101 to be positioned in multiple foldable configurations, a user of the electronic device 101 may elect to have a small form factor for easy maneuverability and functionality or may elect an expanded, larger form factor for displaying rich content and to enable more significant interaction with one or more software applications via expanded user interfaces.

In a particular embodiment, the electronic device 101 includes multiple folding display panels 102, 104, and 106. When fully extended, the electronic device 101 can provide a panorama view similar to a wide screen television. When fully folded to a closed position, the electronic device 101 can provide a small form factor and still provide an abbreviated view similar to a cell phone. In general, the multiple configurable displays 102, 104, and 106 may enable the electronic device 101 to be used as multiple types of devices depending on how the electronic device 101 is folded or configured.

Figure 2:
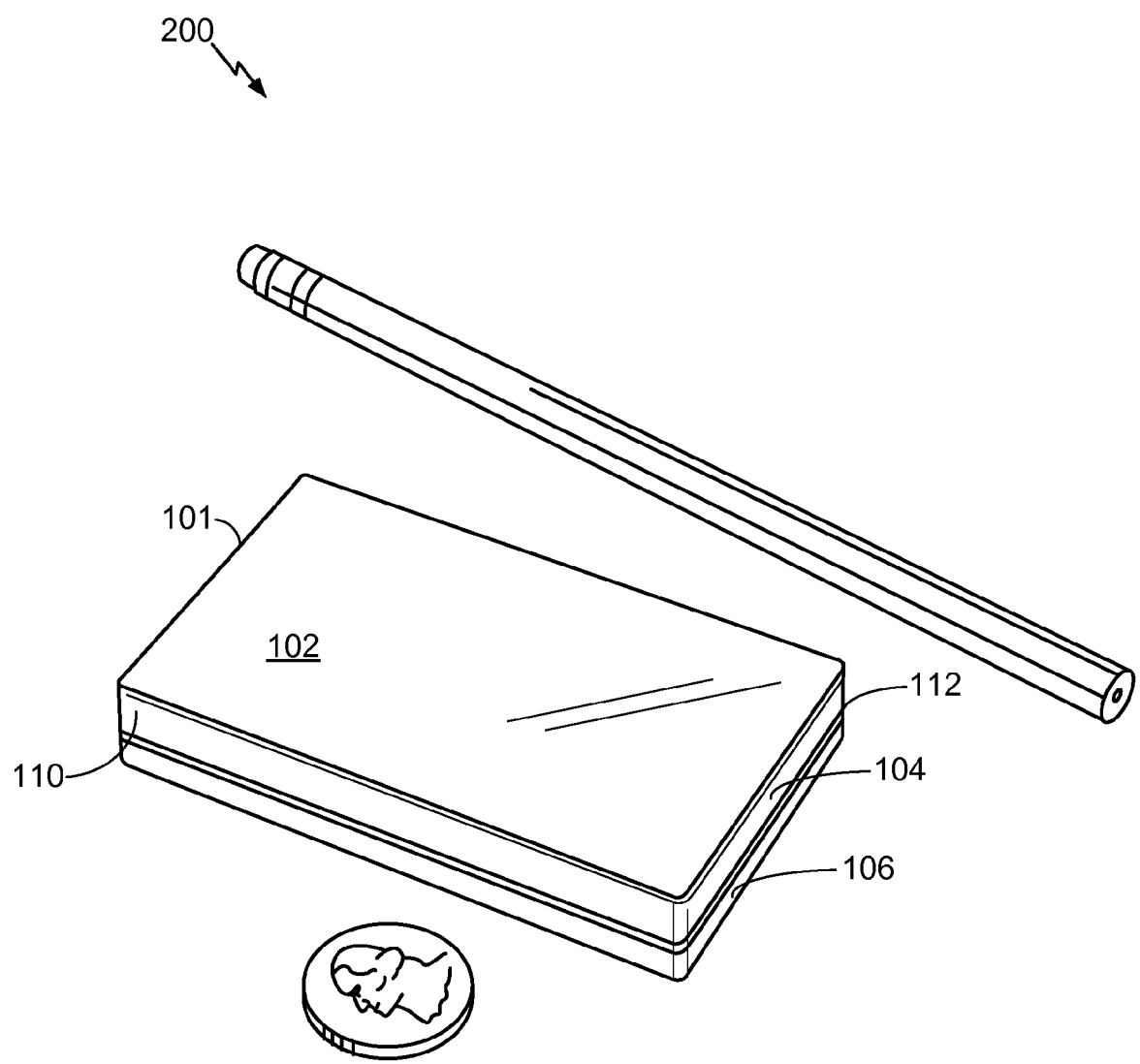
FIG. 2 is a diagram of an illustrative embodiment of the electronic device of FIG. 1 in a fully folded configuration.

Referring to FIG. 2, a second embodiment of the electronic device 101 of FIG. 1 in a fully folded configuration is depicted and generally designated 200. The first panel 102 is depicted on an upper surface of the electronic device 101. As illustrated in FIG. 2, the display surface of the first panel 102 is visible, and the first fold location 110 between the first panel 102 and the second panel 104 is fully folded, such that the back surface of the first panel 102 is in contact with the back surface of the second panel 104. The third panel 106 is fully folded against the second panel 104 along the second fold location 112. The second panel 104 is configured such that the second display surface is substantially proximate to the display surface of the third panel 106 within the fully folded configuration. As illustrated in FIG. 2, the electronic device 101 has a substantially rectangular shape or form factor including three stacked layers (i.e., the first panel 102, the second panel 104, and the third panel 106). The display surfaces of the second panel 104 and the third panel 106 are substantially protected from damage from external sources within the fully folded configuration 200 of FIG. 2. Although the embodiment depicted in FIG. 2 illustrates a particular embodiment of the electronic device 101, next to a United States Quarter and a pencil for size comparison purposes it should be clearly understood that FIG. 2, as well as all other figures of the present application, are not necessarily to scale, and should not be interpreted as limiting the scope of the present disclosure.

Figure 3:
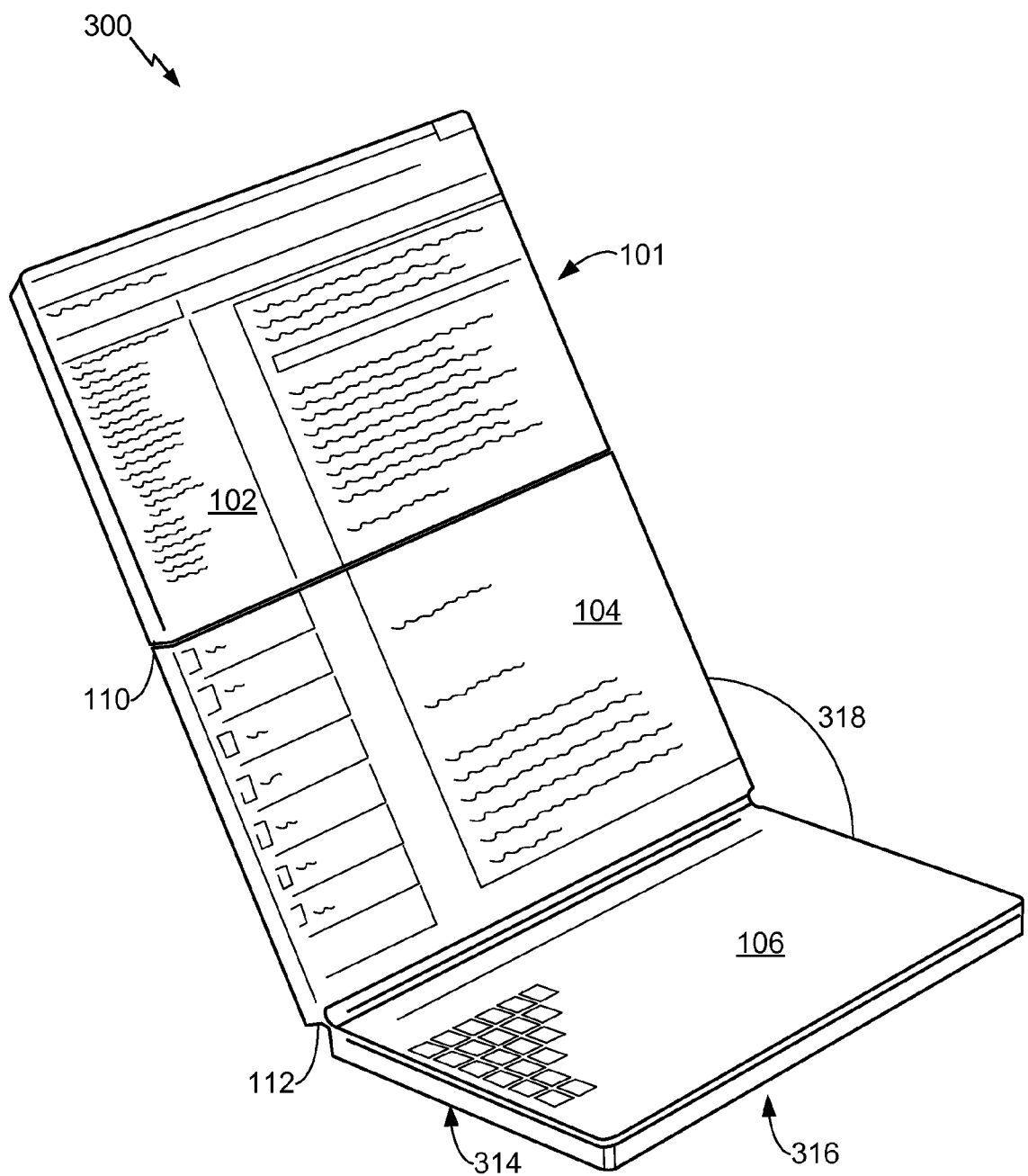
FIG. 3 is a diagram of an illustrative embodiment of the electronic device of FIG. 1 in a thumbing configuration.

Referring to FIG. 3, the electronic device 101 of FIG. 1 in a "thumbing" configuration is depicted and generally designated 300. The first panel 102 and the second panel 104 are coupled at the first fold location 110 in a substantially coplanar configuration. The second panel 104 and the third panel 106 are offset relative to one another, along the second fold location 112. In a particular embodiment, an angle 318 of rotation from the display surface of the third panel 106 to the display surface of the second panel 104 is an angle greater than 90 degrees and less than 180 degrees. For example, as illustrated in FIG. 3, the angle 318 formed between the second panel 104 and the third panel 106 may be substantially 135 degrees.

As illustrated in FIG. 3, a back surface 314 of the first panel 106 may rest on a support surface, such as a table surface, desk surface, a user's hand, or the like. In a particular embodiment, the third panel 106 may be weighted such that in the particular configuration depicted in FIG. 3, the electronic device 101 may be stable when maintained in the thumbing configuration 300 on a surface. As illustrated, in the thumbing configuration 300, the third panel 106 may display a keyboard 316, while the first and second panels 102, 104 may display one or more portions of the graphical user interface, such that a user may have a substantially horizontal keyboard 316, and a conveniently angled and located effective 2-panel display surface formed of the display surface of the first panel 102 and the display surface of the second panel 104. In a particular embodiment, the electronic device 101 may be held in the thumbing configuration 300 by a user such that the keyboard 316 can be actuated by one or more of the user's thumbs.

Figure 4:
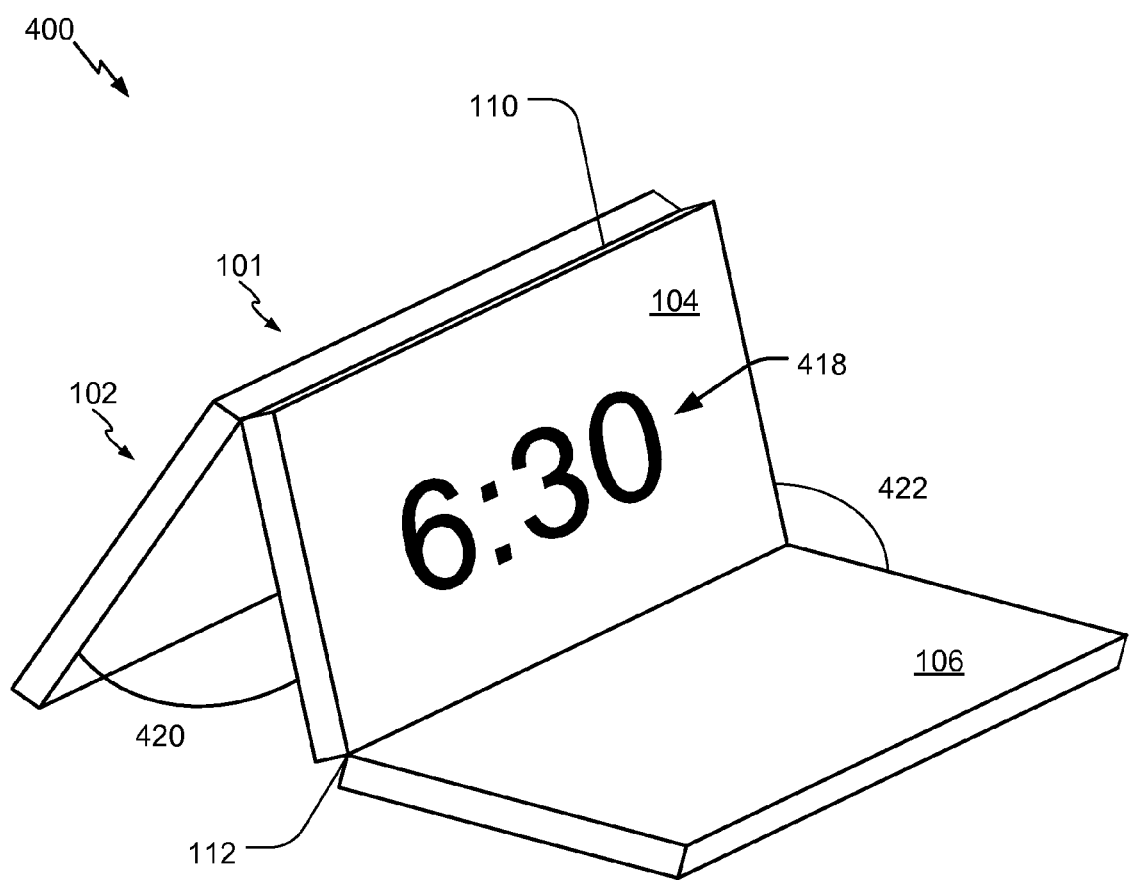
FIG. 4 is a diagram of an illustrative embodiment of the electronic device of FIG. 1 in a travel clock configuration.

Referring to FIG. 4, the electronic device 101 of FIG. 1 in a travel clock configuration is depicted and generally designated 400. The first panel 102 is folded with respect to the second panel 104 along the first fold location 110, at an angle 420 that is less than 180 degrees, and greater than 0 degrees. For example, the angle 420 formed by the first panel 102 and the second panel 104 may be substantially 60 degrees. The second panel 104 is oriented with respect to the third panel 106 along the second fold location 112 at an angle 422 that is greater than 90 degrees and less than 180 degrees. As illustrated, the angle 422 along the second fold location 112 may be approximately 135 degrees.

In a particular embodiment, the travel clock configuration 400 includes a display of clock indicia 418, such as a digital clock indicia or analog clock indicia, at the display surface of the second panel 104. For example, the clock indicia 418 may be an image of a clock face. In a particular embodiment, the display surface of the first panel 102 may be in a powered down configuration, while the display surface 106 of the third panel 106 may display one or more controls typical of a travel clock, such as an alarm set control, a volume control, a radio station tuning control, or other controls (not shown).

Figure 5:
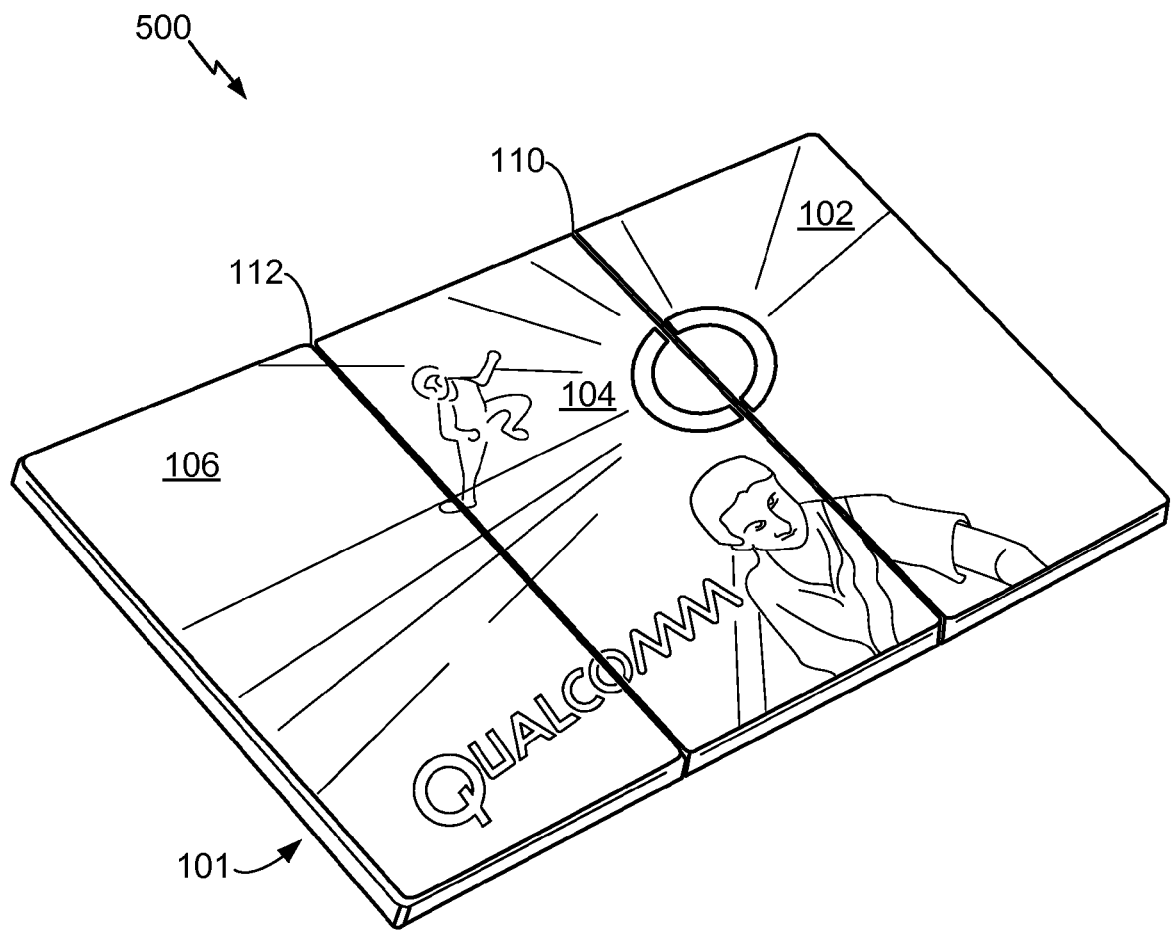
FIG. 5 is a diagram of a first illustrative embodiment of the electronic device of FIG. 1 in a fully extended configuration.

FIG. 5 depicts the electronic device 101 of FIG. 1 in a fully extended configuration 500. The first panel 102 and the second panel 104 are substantially coplanar, and the second panel 104 is substantially coplanar with the third panel 106. The panels 102, 104, and 106 may be in contact at the first fold location 110 and the second fold location 112 such that the display surfaces of the first panel 102, the second panel 104, and the third panel 106 effectively form an extended, three-panel display screen. As illustrated, in the fully extended configuration 500, each of the display surfaces displays a portion of a larger image, with each individual display surface displaying a portion of the larger image in a portrait mode, and the larger image extending across the effective three-panel screen in a landscape mode. In a particular embodiment, the panels 102, 104, and 106 may be lockable to be substantially maintained in the fully extended configuration 500.

Figure 6:
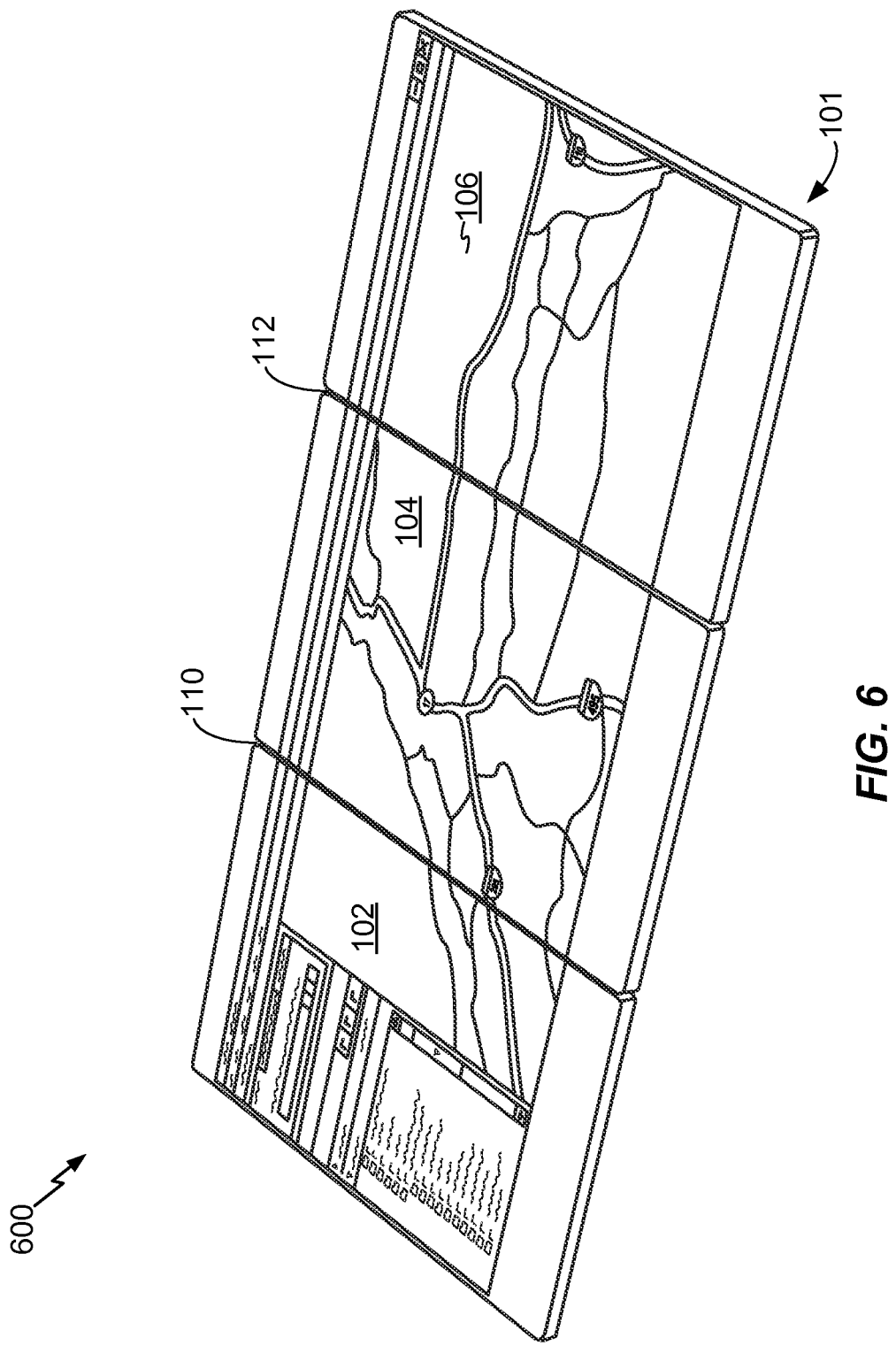
FIG. 6 is a diagram of a second illustrative embodiment of the electronic device of FIG. 1 in a fully extended configuration.

FIG. 6 depicts the electronic device 101 of FIG. 1 in a fully extended configuration 600 having a reduced effective display surface on the first panel 102, the second panel 104, and the third panel 106 as compared to FIG. 5. Like FIG. 5, the panels 102, 104, and 106 are substantially extended, and may be locked into position. However, as illustrated in FIG. 6, an upper and lower surface portion of the portrait mode of each of the panels 102, 104, and 106 may not include the display surface and may instead include one or more hardware features, such as a hinge, microphone, speaker or other hardware features (not shown).

Figure 7:
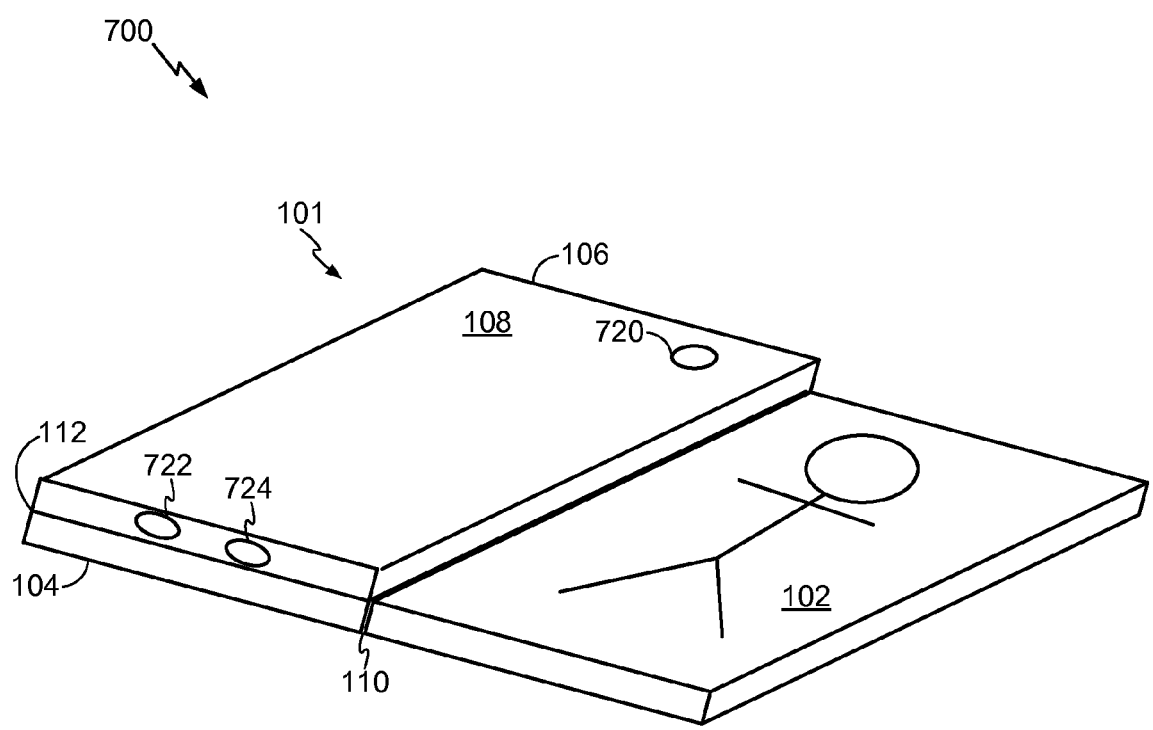
FIG. 7 is a diagram of an illustrative embodiment of the electronic device of FIG. 1 in a video conferencing configuration.

FIG. 7 shows the electronic device 101 of FIG. 1 in a video conferencing configuration 700. The first panel 102 is coupled to the second panel 104 at the first fold location 110 to be substantially coplanar with the second panel 104. The second panel 104 and third panel 106 are coupled in a folded configuration along the second fold location 112 such that the display surfaces of the second panel 104 and the third panel 106 are substantially proximate to each other, and protected within the interior of the folded configuration. By having the third panel 106 folded over the second panel 104, a back surface 108 of the third panel 106, including a camera 720, is exposed to a user of the electronic device 101. A bottom edge of the third panel 106 includes a microphone 722 and a speaker 724. Although depicted on the bottom edge of the third panel 106, it should be clearly understood that the microphone 722 and the speaker 724 may be located at other positions on the electronic device 101. For example, as will be illustrated with respect to FIG. 32, the microphone 722 may be located at a top of the display surface of the first panel 102, and the speaker 724 may be located at a bottom location of the display surface of the first panel 102. The video conferencing configuration 700 enables a user of the electronic device 101 to view an image on the display surface of the first panel 102 of a participant in the video conferencing call, and to simultaneously be located in a field of view of the camera 720, to capture an image of the user and to provide the captured image of the user to one or more participants of the video conference.

In a particular embodiment, the electronic device 101 of FIGS. 1-7 uses three separate touch screen displays 102, 104, and 106, that are connected mechanically and capable of folding, that can be used individually or together. This enables multiple user interfaces that can be changed based on the shape or configuration of the electronic device 101. The multiple configurable user interfaces allow the electronic device 101 to be used as multiple types of devices depending on how the electronic device 101 is folded or configured. When using the electronic device 101 a user could start by interacting with a single screen (device completely folded), then have the interface change automatically (based on application or setting) when the electronic device 101 is folded to a different physical configuration. The electronic device 101 may be configured to execute concurrent applications on multiple screens, and to reconfigure applications based on user interaction changing the device configuration. For example, the electronic device 101 may be configured to execute an application at a single display 102, 104, or 106, in one physical configuration, and to execute the application across all three displays 102, 104, and 106 in a different physical configuration.

For example, when the electronic device 101 is fully folded to the closed position (one screen displayed, such as the fully folded configuration 200 of FIG. 2), the electronic device 101 retains a small form factor and could provide an abbreviated user interface view. Based on user interaction this fully folded configuration could display applications, such as a phone, short-message-service (SMS), a personal digital assistant (PDA) type browser application, a keypad, menus, other interface elements, or any combination thereof.

When fully extended (all screens displayed, such as the fully extended configuration 500 of FIG. 5 or 600 of FIG. 6), the electronic device 101 may provide a panorama view. Based on the user's application of choice, the panorama view could automatically display interfaces similar to wide-screen video, a desktop environment with applications (e.g. email, text editor), or a web browser, with or without keyboard, as illustrative, non-limiting examples. The interactions for these interfaces could be similar to their native format instead of confined to a mobile phone-type interaction.

When displays are folded in a triangular shape (one part of the triangle is a display facing backward, the other part of the triangle a display facing forward, the final folded under or flat in front, such as the travel clock configuration 400 of FIG. 4) the configuration could automatically trigger the display of a directional user interface. In other words, the front display(s) may show a device interface for the particular configuration, such as a gaming application, email, SMS, phone, alarm clock, digital radio, or music player, as illustrative, non-limiting examples, while the back display, the bottom display, or both, may be idled or off.

When one outside display is configured at approximately a 45 degree angle to the other displays (such as the thumbing configuration 300 of FIG. 3), the electronic device 101 could automatically change the interface. For example, the interface could be a text entry device. The 45 degree display may show a keyboard while the others displayed a text entry application, a non-PDA-type browser, or other desktop-like application.

Thus, the electronic device 101 may have the ability to automatically change the user interface and interaction method based on a mechanical trigger, sensor information, or the like. The electronic device 101 may provide the advantage of anticipating the user's expectations for the device without the user having to browse multiple menus. When the electronic device 101 is fully extended it may be larger than current mobile device interfaces, thus overcoming a drawback of conventional mobile devices of insufficient screen area. A user of the electronic device 101 can change the application interfaces to more closely match their needs and preferences at the time of use. Difficulties that may be encountered by users of conventional mobile devices using complicated desktop-like interfaces, like text editors or browsers, may be relieved by the electronic device 101 enabling the interface to spread across multiple displays.

Figure 8:
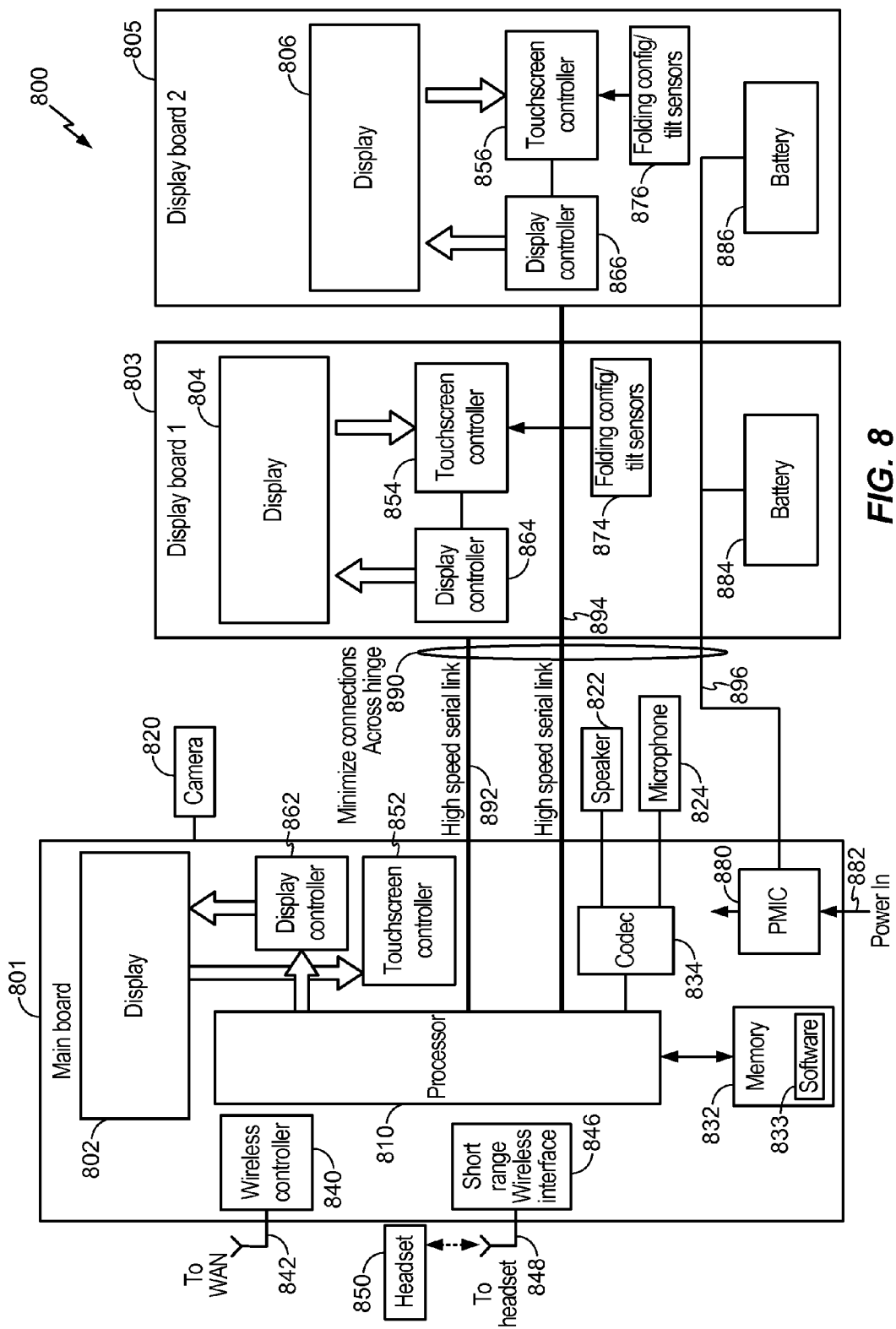
FIG. 8 is a block diagram of a second illustrative embodiment of an electronic device.

Referring to FIG. 8, a particular illustrative embodiment of an electronic device is depicted and generally designated 800. The device 800 includes a main board 801 coupled to a first display board 803 and to second display board 805 via set of connections 890 across a hinge (not shown). Each of the boards 801, 803, and 805 may be in separate panels of a multi-panel hinged device, such as the electronic device 101 of FIGS. 1-7.

The main board 801 includes a display 802, a processor 810 coupled to a memory 832, a display controller 862 a touchscreen controller 852, a wireless controller 840, a short range wireless interface 846, a coder/decoder (CODEC) 834, and a power management integrated circuit (PMIC) 880. The first display board 803 includes a display 804 coupled to a display controller 864, a touchscreen controller 854, and one or more folding configuration/tilt sensors 874. The second display board 805 includes a display 806 coupled to a display controller 866, a touchscreen controller 856, and one or more folding configuration/tilt sensors 876. The first display board 803 is coupled to the main board 801 via a first communication path, such as a first high-speed serial link 892. The second display board 805 is coupled to the main board 801 via a second communication path, such as a second high-speed serial link 894. The first display board 803 and the second display board 805 each have a battery 884 and 886 that is coupled to the PMIC 880 via a power line 896, which may be able to conduct at least 1.5 amps (A) between the PMIC 880 and the batteries 884 and 886. In a particular embodiment, a camera 820 and a power input 882 are also coupled to the main board 801.

The processor 810 may include one or more processing devices, such as one or more ARM-type processors, one or more digital signal processors (DSPs), other processors, or any combination thereof. The processor 810 can access one or more computer readable media, such as the representative memory 832. The memory 832 stores data (not shown) and processor executable instructions such as software 833. Generally, the software 833 includes processor executable instructions that are executable by the processor 810, and may include application software, operating system software, other types of program instructions, or any combination thereof. Although the memory 832 is depicted as external to the processor 810, in other embodiments the memory 832 may be internal to the processor 810 such as at a cache, at one or more registers or register files, at other storage devices at the processor 810, or any combination thereof.

The processor 810 is also coupled to folding configuration sensors, such as the folding configuration and tilt sensors 874 and 876 at the first display panel 803 and the second display panel 805, respectively. In an illustrative example, the device 800 may be the electronic device 101 of FIG. 1, and the sensors 874 and 876 may adapted to detect a folding configuration of the device 800 as one or more of the fully folded configuration illustrated in FIG. 2, the thumbing configuration illustrated in FIG. 3, the travel clock configuration illustrated in FIG. 4, the fully extended configurations illustrated in FIG. 5-6, or the video conferencing configuration illustrated in FIG. 7.

The display controllers 862, 864, and 866 are configured to control the displays 802, 804, and 806. In a particular embodiment, the displays 802, 804, and 806 may correspond to the display surfaces 102, 104, and 106 illustrated in FIGS. 1-7. The display controllers 862, 864, and 866 may be configured to be responsive to the processor 810 to provide graphical data to display at the displays 802, 804, and 806 according to a configuration of the device 800. For example, when the device 800 is in a fully folded configuration, the display controllers 862, 864, and 866 may control the first display 802 to display a graphical user interface and may power down or not use the other displays 804 and 806. As another example, when the device 800 is in a fully extended configuration, the display controllers 862, 864, and 866 may control the displays 802, 804, and 806 to each display a respective portion of an image to operate as a single effective screen spanning all three displays 802, 804, and 806.

In a particular embodiment, each of the displays 802, 804, and 806 is responsive to user input via a respective touchscreen that is coupled to a touchscreen controller 852, 854, or 856, respectively. The touchscreen controllers 852, 854, and 856 are configured to receive signals from the displays 802, 804, and 806 representing a user input and to provide data to the processor 810 indicating the user input. For example, the processor 810 may be responsive to a user input indicating a double-tap at an application icon on the first display 802 and may launch an application and display an application window at one or more of the displays 802, 804, or 806 in response to the user input.

In a particular embodiment, by having each display controller 862, 864, and 866 and each touchscreen controller 852, 854, and 856 with a corresponding display 802, 804, and 806, an amount of data communicated between the panels may be reduced compared to other embodiments having a controller and a corresponding display on separate panels. However, in other embodiments, two or more of the display controllers 862, 864, or 866, or touchscreen controllers 853, 854, or 856, may be combined, such as into a single controller that controls all three displays 802, 804, and 806. Additionally, although three displays 802, 804, and 806 are illustrated, in other embodiments the device 800 may include more or less than three displays.

The high-speed serial links 892 and 894 may be high speed bi-direction serial links. For example the links 892 and 894 may be Mobile Display Digital Interface (MDDI)-type links. Touchscreen data and sensor data may be embedded in the serial stream to return to the processor 810 from the panels 803 and 805, so that only four differential pairs may be used for signaling across the respective hinges between the panels 801, 803, and 805.

In a particular embodiment, the sensors 874 and 876 may be adapted detect a folding configuration of the device 800 based on input received at one or more sensors. For example, one or more of the sensors 874 and 876 may include or receive input from one or more accelerometers, inclinometers, hinge detectors, other detectors, or any combination thereof. The sensors 874 and 876 may provide information to the processor 810 indicating a detected folding configuration of the device 800. The sensors 874 and 876 may be responsive to a relative folding position, such as by detecting an angle of rotation of a display panel relative to a neighboring display panel of the device 800. The sensors 874 and 876 may also be responsive to one or more other sensors such as one or more accelerometers or inclinometers coupled to one or more display panels of the device 800.

As illustrated in FIG. 8, a coder/decoder (CODEC) 834 can also be coupled to the processor 810. A speaker 822 and a microphone 824 can be coupled to the CODEC 834. FIG. 8 also indicates that a wireless controller 840 can be coupled to the processor 810 and to a wireless antenna 842, and can enable the device 800 to communicate via a wireless network such as a wide area network (WAN). The processor 810 may be responsive to the wireless controller 840 to display call indicia, such as a caller identification or a caller number, at one or more of the displays 802, 804, and 806 when the device 800 receives an incoming call. The processor 810 may determine a size, position, and orientation, as well as a particular display 802, 804, and 806, to display the call indicia at least partially based on the folding configuration of the device 800 that is determined based on input from the sensors 874 and 876. For example the call indicia may be displayed as a pop-up window or text over one or more other applications having a size, location, and orientation based on the folding configuration.

In a particular embodiment, the device 800 is configured to be operable for wireless telephonic communications in all folding configurations. In a particular embodiment, the processor 810 is coupled to a short-range wireless interface 846 that may be coupled to a headset 850 via an antenna 848. The short-range wireless interface 846 may be wirelessly coupled to the headset 850, such as a device including an earpiece and a microphone, via an ad-hoc wireless network, such as a Bluetooth network. The processor 810 may implement logic to determine whether to display the call indicia or to alert the headset 850 in response to an incoming call. For example, the processor 810 may automatically alert the headset 850 when the device 800 is in a fully expanded configuration and a multimedia file or streaming media is displayed across all displays 802, 804, and 806, and may display the call indicia otherwise.

In a particular embodiment, one or more components of FIG. 8 may be located proximate to or within one or more of the device panels. For example, the processor 810 may be located within the center panel and the outer panels may each store a battery 884 and 886. In a particular embodiment, the panels may be weighted in a manner to enable the device to remain upright in a thumbing configuration.

Referring to FIG. 9, a particular illustrative embodiment of an electronic device is depicted and generally designated 900. The device 900 includes a first panel 902 and a second panel 904. The first panel 902 and the second panel 904 are coupled via a recessed hinge 905, near a top edge and a bottom edge of the panels 902 and 904. In a particular embodiment, the electronic device 900 can be manipulated by a user into a variety of configurations for use, and may automatically adjust a software configuration or displayed image in response to a configuration change. In an illustrated embodiment, the electronic device 900 is a two-panel embodiment of the electronic device 101 of FIG. 1, the electronic device 800 of FIG. 8, or any combination thereof. In a particular embodiment, the recessed hinge 905 includes a coupling member 906. FIG. 9 includes an enlarged view of the recessed hinge 905, showing the coupling member 906 substantially flush with the surfaces of the first panel 902 and the second panel 904, and visible through a first aperture 1040 defined by the first panel and the second aperture 1044 defined by the second panel 904.

The folding display panels 902 and 904, when fully extended, may provide a panorama view similar to a wide screen television, and when fully folded to a closed position may provide a small form-factor and still provide an abbreviated view similar to a conventional cellular phone. A small hinge, such as the recessed hinge 905, that provides more complex motion, including translation and rotation, could be used to reduce the display panel gap and create a more continuous tiling and may be used in one or more designs with a multitude of displays or panels.

FIG. 10 illustrates a side partial cross sectional view of the device 900 of FIG. 9. The first panel 902 defines the first aperture 1040 which is in communication with a first cavity 1042 within the first panel 902. The second panel 904 defines the second aperture 1044 which is in communication with a second cavity 1046 in the second panel 904. The coupling member 906 is coupled to a first pivot member, such as a first pin 1010, and to a second pivot member, such as a second pin 1008. The first pin 1010 and the second pin 1008 enable the first panel 902 to be rotatably coupled to the coupling member 906; and the second pin 1008 enables the second panel 904 to be rotatably coupled to the coupling member 906. As a result, the first panel 902 and the second panel 904 are rotatably coupled to each other. Further, the apertures 1040 and 1044 defined in the first panel 902 and the second panel 904, respectively, are formed to enable the coupling member 906 to be inserted therein, and to enable a range of rotational motion of each of the panels 902 and 904 with respect to the coupling member 906. In addition, the first pin 1010 is engaged within a slot 1012 within the first cavity 1042 to enable a lateral movement of the first panel 902 relative to the second panel 904, such that the first panel 902 has a range of motion relative to the second panel 904 when the recessed hinge 905 is in an extended configuration, with the first pin 1010 at a first end of the slot 1012. Furthermore, the first panel 902 has a second range of motion relative to the second panel 904 when the recessed hinge 905 is in a retracted configuration with the first pin 1010 at a second end of the slot 1012, where the first range of motion is larger than the second range of motion. As will be discussed with respect to FIGS. 15-20, a sensor may be coupled to the recessed hinge 905 to detect a relative orientation of the first panel 902 to the second panel 904.

As illustrated, the first aperture 1040 is dimensioned to receive at least a first portion of the coupling member 906, the first portion including the portion of the coupling member 906 coupled to the pin 1010. In addition, the second aperture 1044 is dimensioned to receive at least a second portion of the coupling member 906, the second portion including the portion coupled to the second pin 1008. In addition, the first cavity 1042 includes an extended recessed component 1014 to receive coupling member 906 when the first pin 1010 is at an innermost position within the slot 1012.

FIG. 11 depicts the electronic device 900 of FIG. 9 in an angled configuration 1100. The first panel 902 is oriented at an angle with respect to the second panel 904 via the recessed hinge 905, illustrated as including a coupling member 906. FIG. 1 includes a close-up view of a recessed hinge 905 illustrating the coupling member 906 extending through a different area of the second aperture 1044 of the second panel 904 as compared to FIG. 9.

FIG. 12 illustrates the first panel 902 rotatably coupled to the second panel 904 via the coupling member 906. The coupling member 906 is rotatably coupled to the first panel 902 via the first pin 1010 engaged in the slot 1012 and rotatably coupled to the second panel 904 via the second pin 1008. As illustrated in FIG. 12, the second panel 904 is abutted against the first panel 902, to provide an angle stop 1216. In the configuration of FIG. 12, the second panel 904 may be rotated in an inward direction to a position fully folded to lay flat against the surface of the panel 902, and may be rotated in an outward direction to a predetermined angle 1218 relative to the first panel 902 and prevented from further rotational separation via the angle stop 1216. The angle stop 1216 may hold the second panel 904 at the predetermined angle 1218, which is illustrated in the embodiment of FIG. 12 as substantially 135 degrees relative to the first panel 902.

Referring to FIG. 13, the electronic device 900 depicted in FIG. 9 is illustrated in a fully folded configuration 1300. The fully folded configuration 1300 has the first panel 902 with a first surface, such as a display surface, including a screen, substantially proximate to the second panel 904. The recessed hinges 905 are illustrated in a retracted configuration to enable the first panel 902 to be located substantially proximate to the second panel 904 to reduce a device height in the fully folded configuration 1300. An enlarged view of the recessed hinge 905 is illustrated in FIG. 13 showing the coupling member 906 extending through the first aperture 1040 of the first panel 902 and the second aperture 1044 of the second panel 904.

FIG. 14 illustrates a side partial cross-sectional view of the fully folded configuration 1300. As illustrated in FIG. 14, the first panel 902 is fully folded against the second panel 904, with the coupling member 906 completely within the first cavity 1042 of the first panel 902 and the second cavity 1046 of the second panel 904. As illustrated, the coupling member 906 has the second pin 1010 engaged in the first cavity 1042 at one extremity of the slot 1012, enabling the first panel 902 and the second panel 904 to be positioned substantially proximate to each other, and as illustrated, substantially flat against each other.

In a particular embodiment, the recessed hinges 905 may be detented and equipped with sensors so that a multi-fold mobile device can adjust display image orientation and content based on feedback from the hinge sensors, as will be discussed more with respect to FIGS. 15-17 and 18-20. The hinges may use, for example, pressure sensors, electrical contacts, Hall sensors, optics, or induction detection to read position, as illustrative, non-limiting examples. Feedback may be received from more than one hinge location or rotation. The hinges may enable folding panels to be set in predetermined positions, and a multi-fold mobile device may set a display image orientation and content or user interface at least partially based on detecting the folding panels in a predetermined position. For example, hinges may be ball detented, may have one or more intermediate positions or stops between fully open and fully closed, may be spring-biased, or may have other configurations to enable folding panels to be held in multiple positions. For example, one or more hinges may be spring-biased so that panels can be separated slightly for repositioning and allowed to snap back into a different configuration. In addition, an electronic device may have a first type of hinges at one fold and a second type of hinges at another fold.

For example, in a particular embodiment a detented hinge may enable the panels to be placed flat, or in one plane, with a display image active and viewable in landscape mode. When the multi-fold device is not flat, then the left panel may contain a touch panel keyboard in portrait orientation and the other displays may be combined in portrait mode. When the multi-fold device is closed, the right display may be active and in portrait orientation with the remaining displays off and inactive. The functional flow could involve the multi-fold device being set in a particular position, one or more smart hinges reading the position, and an image or user interface adjusting in response to reading the position. A wide variety of possible configurations for the display image or user interface may be enabled by detented hinges at a multi-fold device, and in a particular embodiment, a small form factor device may be enabled to expand to be used as a large-screen multimedia device.

Figure 15:
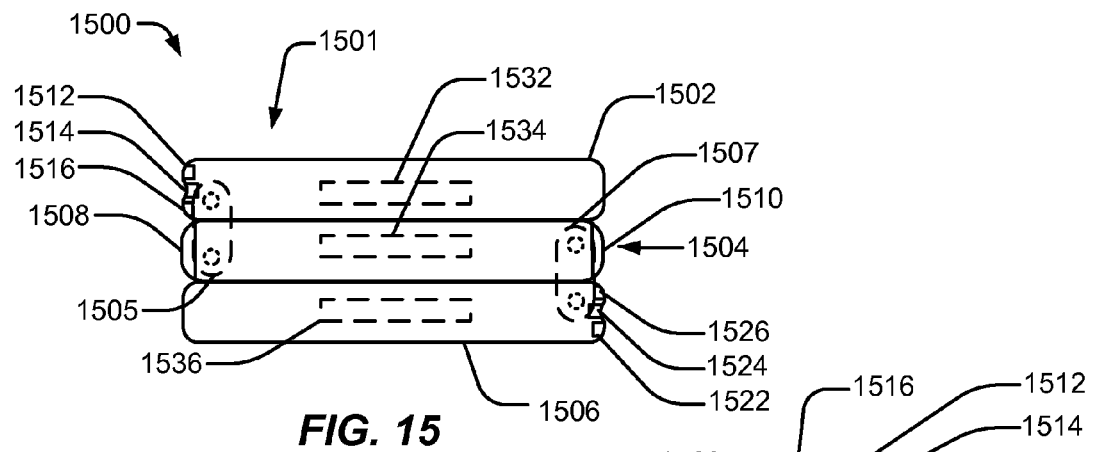
FIG. 15 is a diagram of a fourth illustrative embodiment of an electronic device.

FIG. 15 illustrates a particular illustrative embodiment of a three-panel electronic device in a folded configuration 1500. The three-panel device 1501 includes a first panel 1502, a second panel 1504, and a third panel 1506. The first panel 1502 is coupled to the second panel 1504 via a first hinge 1505, illustrated as a recessed hinge shown with dashed lines. The second panel 1504 is coupled to the third panel 1506 via a second hinge 1507. The first panel 1502 includes a first sensor 1512, a second sensor 1514, and a third sensor 1516, which may include one or more electrodes, pressure sensors, other sensors, or any combination thereof, which in various configurations may contact a first end 1508 of the second panel 1504. In addition, the second panel 1504 has a second end 1510 that in various configurations may contact with a first sensor 1522, a second sensor 1524, and a third sensor 1526, or any combination thereof, of the third panel 1506. The first panel 1502 includes a first internal sensor 1532, the second panel 1504 includes a second internal sensor 1534, and the third panel 1506 includes a third internal sensor 1536. In an illustrative embodiment, the three-panel device 1501 may be the electronic device 101 of FIGS. 1-7, the electronic device 800 of FIG. 8, a three-panel embodiment of the electronic device 900 of FIGS. 9-14, or any combination thereof.

In a particular embodiment, the three-panel device 1501 may recognize the configuration based on activities at the sensors 1512 through 1516, and 1522 through 1526. In particular, a relative orientation of the first panel 1502 to the second panel 1504 may be detected at the first hinge, such as via the presence or absence of a contact between the first edge 1508 with one or more of the sensors 1512-1516. In addition, relative orientation of the second panel 1504 with the third panel 1506 may be detected or sensed via a presence or absence of contact between the second edge 1510 and one or more of the sensors 1522-1526. As illustrated, the electronic device 1501 in the configuration 1500 is in a fully folded configuration. Similarly, the one or more of the sensors 1532, 1534, and 1536 may include an accelerometer, an inclinometer sensor to measure an inclination, a sensor to measure a relative movement, such as a gyroscopic sensor, another type of sensor, or any combination thereof. By using sensors at the hinges, such as these sensors 1512-1516, and 1522-1526, as well as the internal sensors 1532-1536, a folding configuration, a relative or absolute alignment, an inclination of the device or other physical configurations may be detected and responded to via a processor controlling the device such as the processor 810 of FIG. 8.

For example, the sensors 1512-1516, and 1522-1526, and the internal sensors 1532-1536 may be included or fed into the folding configuration sensor 826 of FIG. 8. The device may include a processor such as the processor 810 of FIG. 8, that is responsive to a sensor coupled to a hinge to detect a device configuration from a set of at least three predetermined configurations. The sensor may include at least one of a Hall sensor, an optical sensor, or an inductive sensor. One or more of the hinges may be detented to enable a stable extended configuration, folded configuration, and intermediate configuration of the first panel relative to the second panel, and the processor may be configured to execute a software application having at least three predetermined operating modes corresponding to the at least three predetermined configurations. The processor may also be adapted to adjust an operating mode of the software application based on the detected device configuration, as well as to adjust a user interface displayed at the first display surface, the second display surface, and the third display surface based on the detected device configuration. For example, in a first predetermined configuration the first display surface, the second display surface, and the third display surface may be configured to emulate a single screen in a landscape configuration, in a second predetermined configuration the first display surface may be active and the second display surface and the third display surface may be inactive, and in a third predetermined configuration a keyboard may be displayed at the third display surface and the first display surface and the second display surface may be configured to emulate a single screen in a portrait configuration. Although the sensors 1532-1536 are depicted as internal sensors, in other embodiments one or more of the sensors need not be internal, and may instead be coupled to a surface of the respective panel, or at other positions relative to the panels.

Figure 16:
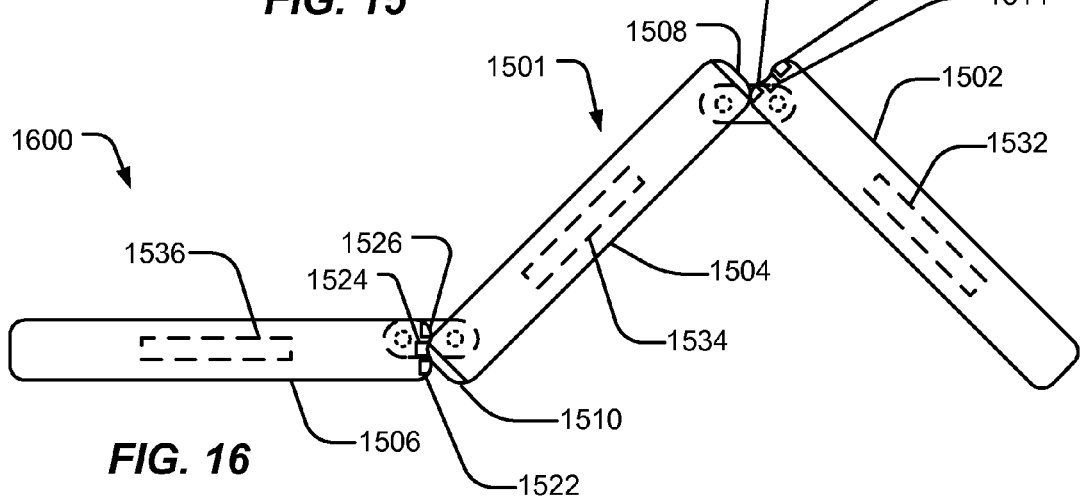
FIG. 16 is a diagram of the electronic device of FIG. 15 in a travel clock configuration.

FIG. 16 depicts the electronic device 1501 of FIG. 15 in a travel clock configuration 1600. The first panel 1502 includes the sensors 1512-1516 and the first internal sensor 1532. The first sensor 1512 and second sensor 1514 are not in contact with the first end 1508 of the second panel 1504, and the third sensor 1516 is in contact with the first end 1508, indicating that the second panel 1502 is positioned at a first angle stop that is at a substantially 90 degree relative orientation to the second panel 1504. Similarly, the second edge 1510 of the second panel 1504 is in contact with the second sensor 1524 of the third panel 1506, but is not in contact with the first sensor 1522 or the third sensor 1526 of the third panel 1506. Therefore, a processor of the device 1501 may determine that the second panel 1504 is in a relative alignment with the third panel 1506 at a second angle stop, such as at a 135 degree relative orientation as illustrated in FIG. 16. In addition, the internal sensor 1534 of the second panel 1504 may indicate that the second panel 1504 is inclined relative to a gravitational directional pull, and the internal sensor 1536 of the third panel 1506 may indicate that the third panel 1506 is in a relatively horizontal orientation, and stationary, and therefore the electronic device 1501 may recognize that it has been put into the travel clock configuration 1600.

Figure 17:
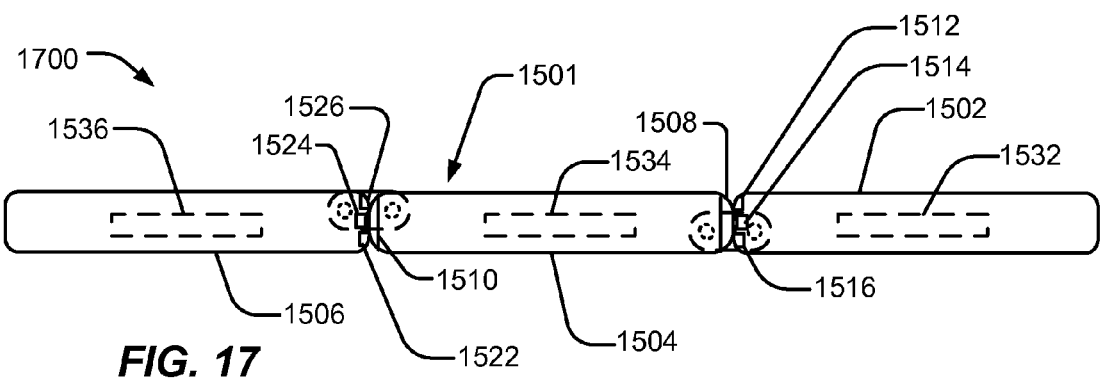
FIG. 17 is a diagram of the electronic device of FIG. 16 in a fully extended configuration.

FIG. 17 depicts the electronic device 1501 of FIG. 15 in a fully extended configuration 1700. The first panel 1502 and the second panel 1504 are positioned such that the first end 1508 of the second panel 1504 is in substantial contact with the first sensor 1512 and the third sensor 1516 of the first panel 1502, but not in contact with the second sensor 1514, indicating that the first panel 1502 and the second panel 1504 are in a end-to-end alignment at a third angle stop, and substantially coplanar at a relative rotational orientation of approximately 180 degrees. Similarly, the second panel 1504 and the third panel 1506 are also substantially coplanar at the third angle stop, as may be detected due to the second edge 1510 being in contact with first sensor 1522 and the third sensor 1526 of the third panel 1506, but not in contact with the second sensor 1524. In addition, one or more of the internal sensors 1532, 1534 and 1536 may be used to indicate an acceleration, an inclination, one or more relative positions, or any combination thereof. By including sensors, such as electronic sensors, pressure sensors, magnetic field detectors, or any combination thereof, at one or more angle stops or rest positions of the panels 1502, 1504, and 1506, the electronic device 1501 may determine a relative orientation between one or more of the panels 1502-1506, enabling the electronic device 1501 to determine a hardware configuration it is currently in, and to detect a change in a hardware configuration as the sensors 1512-1516 and 1522-1526 are engaged and disengaged, respectively.

Figure 18:
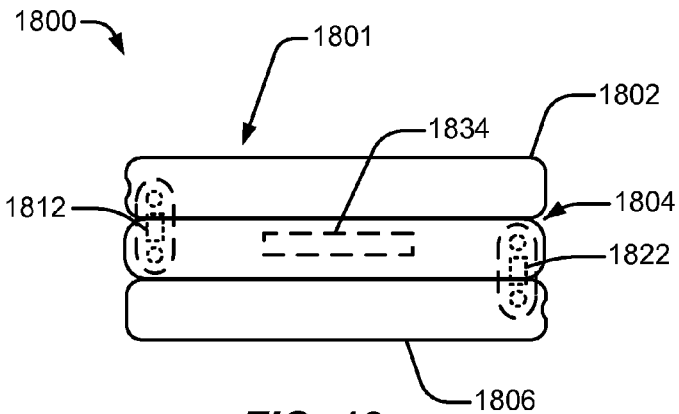
FIG. 18 is a diagram of a fifth illustrative embodiment of an electronic device.

FIG. 18 depicts an electronic device 1801 having a first panel 1802, and second panel 1804, and a third panel 1806 in a fully folded configuration 1800. The first panel 1802 is rotatably coupled to the second panel 1804 via recessed hinge that includes a first sensor 1812. The second panel 1804 is coupled to the third panel 1806 via a recessed hinge that includes a second sensor 1822. The second panel 1804 also includes one or more internal sensors 1834. In a particular embodiment, the first sensor 1812 within the recessed hinge may detect a rotational alignment of the first panel 1802 to the second panel 1804, or a degree of rotation between one or more of the panels 1802 and 1804 relative to a coupling member, relative to one or more of the pins of the hinge, relative to a direction of gravitational force, via other mechanisms, or any combination thereof, to enable a relative positioning of the first panel 1802 with respect to the second panel 1804 to be detected at the first sensor 1812. The second sensor 1822 may be configured to perform substantially similarly to the first sensor 1812, to detect a relative orientation between the second panel 1804 and the third panel 1806. In contrast to the electronic device 1501 of embodiments depicted in FIGS. 15 through 17, the electronic device 1801 of FIG. 18 in the fully folded configuration 1800 includes a single internal sensor 1834, and two hinge sensors 1812 and 1822, enabling the electronic device 1801 to detect a first parameter, such as an orientation, position, momentum, or acceleration using the internal sensor 1834, and to further detect a folded, unfolded, or partially folded configuration of the panels 1802, 1804, 1806 via the hinge sensors 1812 and 1822. In a particular embodiment, the electronic device 1801 may be the electronic device 101 of FIGS. 1-7, the electronic device 800 of FIG. 8, a three-panel embodiment of the electronic device 900 of FIGS. 9-14, the electronic device 1501 of FIGS. 15-17, or any combination thereof.

Figure 19:
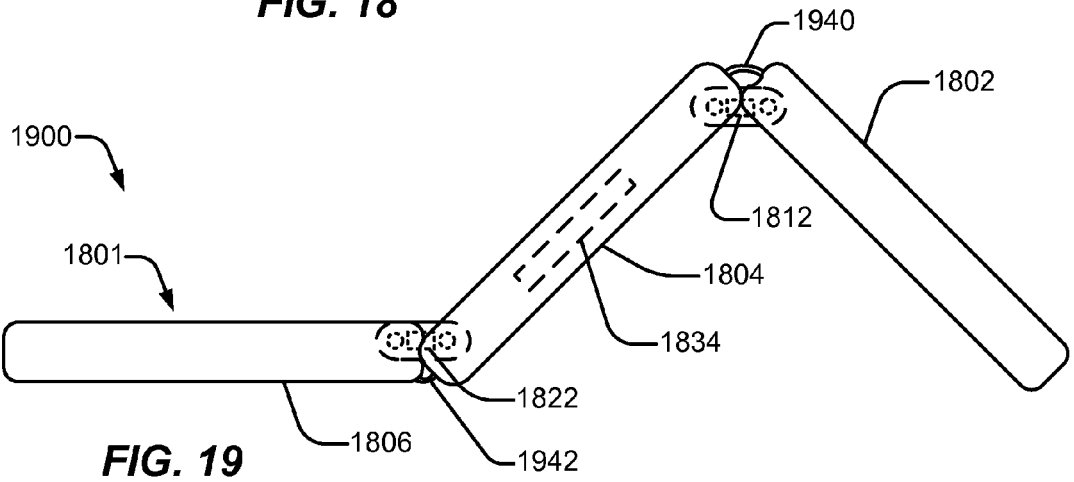
FIG. 19 is a diagram of the electronic device of FIG. 18 in a travel clock configuration.

FIG. 19 depicts the electronic device 1801 of FIG. 18 in a travel clock configuration 1900. The first panel 1802 is coupled at approximately a 90 degree angle to the second panel 1804 via a hinge including the first sensor 1812. The second panel 1804 is coupled at approximately 135 degree angle to the third panel 1806 via the hinge including the second sensor 1822. The internal sensor 1834 may detect an inclination of the second panel, which in combination with sensor readings at the first sensor 1812 and the second sensor 1822, may indicate to a processor controlling the electronic device 1801 that the electronic device 1801 is in the travel clock configuration 1900. Also, the electronic device 1801 also includes one or more signal paths 1940 and 1942 to communicate electronic data and control signals between the first panel 1802 and the second panel 1804, and between the second panel 1804 and the third panel 1806, respectively. In a particular embodiment, the signal paths 1940 and 1942 may include flex cable, one or more wires, other signal bearing media, such as fiber optic cable, other electrically conductive material to transmit signals, or any combination thereof. Signals transmitted via the signal paths 1940 and 1942 may be transmitted serially, in parallel, or in combination of serially and in parallel, and may be transmitted according to one or more protocols. In a particular embodiment, one or more of the signaling paths 1940 and 1942 may include a Mobile Display Digital Interface (MDDI) interface.

Figure 20:
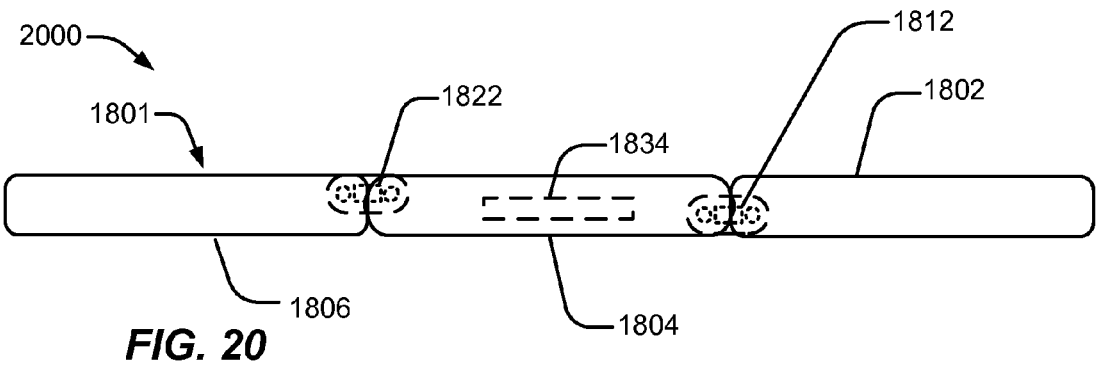
FIG. 20 is a diagram of the electronic device of FIG. 18 in a fully extended configuration.

FIG. 20 depicts the electronic device 1801 of FIG. 18 in a fully extended configuration 2000. The first panel 1802 is substantially coplanar with the second panel 1804. The second panel 1804 is also substantially coplanar with the third panel 1806. As illustrated, the first sensor 1812 may detect that the first hinge is in a fully extended configuration position, and the second sensor 1822 may detect that the second hinge is in a fully extended configuration position. In addition, the internal sensor 1834 may detect that the second panel 1804 is in a substantially flat or horizontal position or alignment. Based on the sensors 1812, 1822, and 1834, the electronic device 1801 may recognize that it is in a fully extended position, and may configure software or graphical user interfaces to display in a landscape configuration across one or more display surfaces of the adjacent panels 1802-1806.

Figure 21:
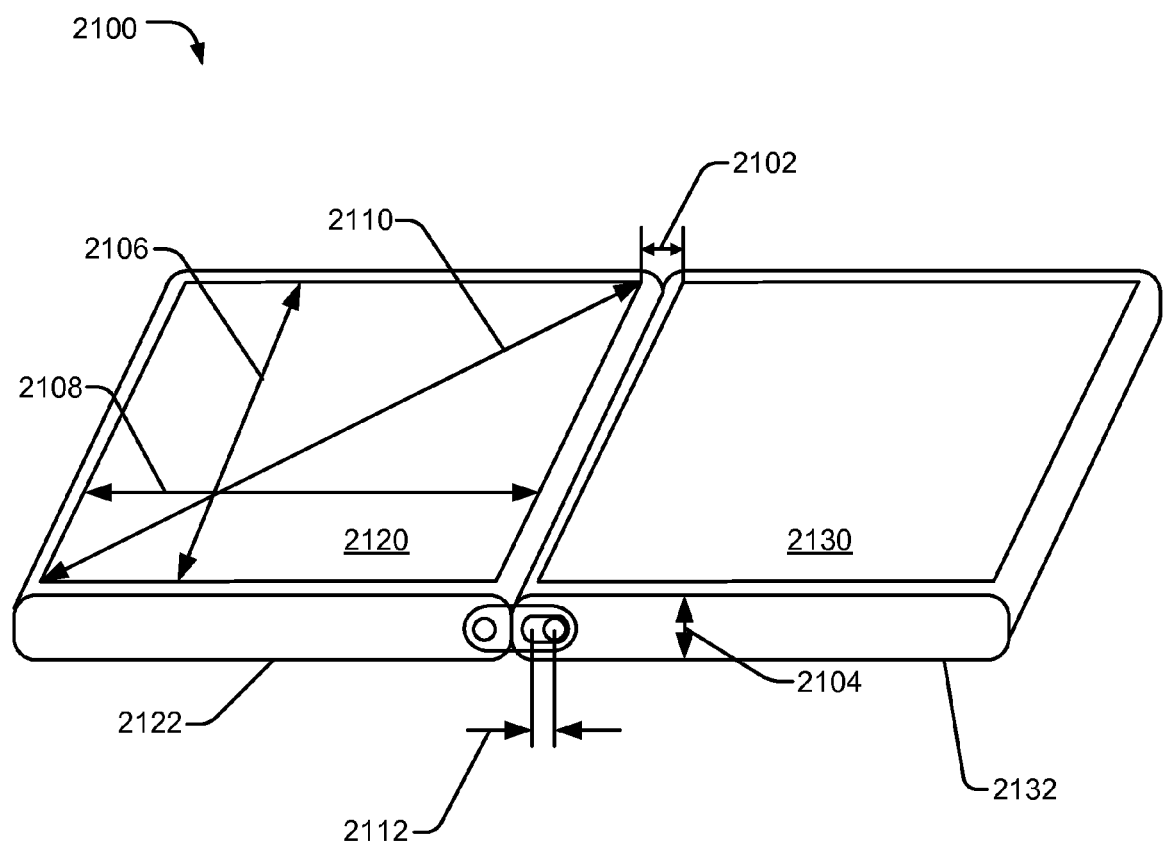
FIG. 21 is a diagram of a sixth illustrative embodiment of an electronic device.

Referring to FIG. 21, a particular embodiment of an electronic device is depicted and generally designated 2100. In a particular embodiment, the electronic device 2100 may be the electronic device 101 of FIGS. 1-7, the electronic device 800 of FIG. 8, the electronic device 900 of FIGS. 9-14, the electronic device 1501 of FIGS. 15-17, the electronic device 1801 of FIGS. 18-20, or any combination thereof.

The device 2100 includes a first display surface 2120 on a first panel 2122 and a second display surface 2130 on a second panel 2132, separated by a recessed hinge. Each display surface 2120 and 2130 has a portrait height 2106, a portrait width 2108, and a diagonal dimension 2110. The display surfaces 2120 and 2130 extend approximately to an edge of each of the panels 2122 and 2132. A gap 2102 indicates a distance between an edge of the first display surface 2120 and an edge of the second display surface 2130. The panels 2122 and 2132 have a height dimension 2104. The electronic device 2100 includes a recessed hinge with a slot that enables a linear range of motion of a pin, illustrated as hinge travel distance 2112. In a particular embodiment, the gap 2102 is designed to be small relative to dimensions of the display surfaces 2120 and 2130. In addition, the height dimension 2104 is designed to be small relative to the display surfaces to result in a convenient size in a fully folded configuration. Further, the hinge travel distance 2112 may be adjusted to enable the panels 2120 and 2130 to extend in order to rotate from a fully extended position to a fully folded position, and to be recessed after reconfiguration into a substantially locked position. In an illustrative embodiment, the hinge travel distance 2112 may be between 2 millimeters (mm) and 10 mm. For example, the hinge travel distance 2112 may be about 5 mm.

In a particular embodiment, the portrait height 2106 is between 5-10 centimeters (cm), the portrait width 2108 is between 4-8 cm, and the diagonal dimension 2110 may be between 6 and 13 cm, to enable a convenient size to fit in a pant or jacket pocket when fully folded while providing a large enough display area to provide multiple icons or controls of sufficient size and separation to be individually selected by a user's finger via a touchscreen interface. In an illustrative embodiment, the portrait height 2106 may be approximately 8 cm, the portrait width 2108 may be approximately 6 cm, and the diagonal dimension 2110 may be approximately 10.2 cm (i.e., approximately 4 inches).

In a particular embodiment, the gap 2102 is between approximately 0 and 2.4 mm. In an illustrative embodiment, the gap 2102 is less than 2 mm, and may be substantially evenly formed of a portion of the first panel 2122 extending beyond the edge of the first display surface 2120 toward the second panel 2132 and a portion of the second panel 2132 extending beyond the edge of the second display surface 2130 toward the first panel 2122. In a particular embodiment, the gap 2102 is dimensioned so that when an image or video is displayed across both display surfaces 2120 and 2130 a human visual system may immediately or eventually ignore, or may not be substantially distracted by, a missing portion corresponding to the gap 2102.

In a particular embodiment the height dimension 2104 is large enough to include a thickness of the display panels 2120 and 2130, internal electronics, one or more batteries, sensors, or any combination thereof, but small enough to be conveniently placed in a pants pocket when the device 2100 is in a fully folded configuration. For example, in an embodiment, having three panels, the height dimension 2104 may be less than 5.5 mm, so that a height of the device in a three-panel fully folded configuration is no more than 16.5 mm. In an illustrative embodiment, the height dimension 2104 is approximately 5 mm.

Figure 22:
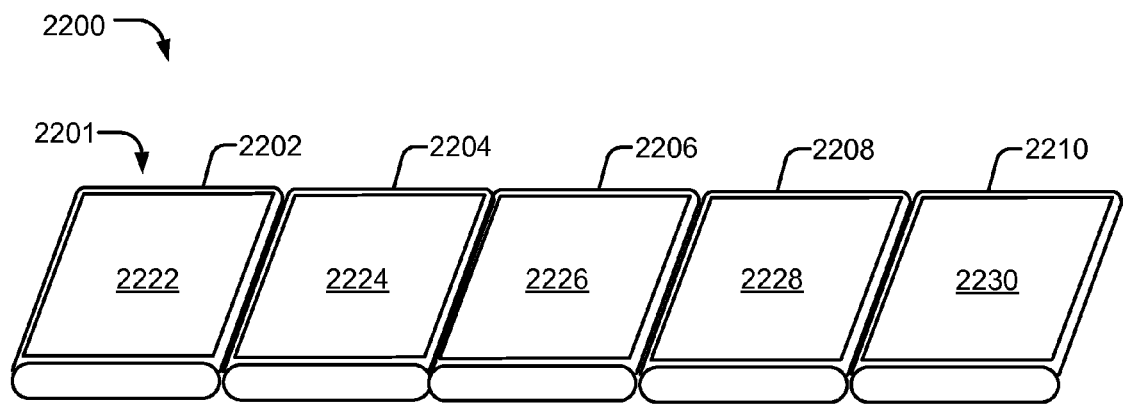
FIG. 22 is a diagram of a seventh illustrative embodiment of an electronic device.

FIG. 22 depicts a particular illustrative embodiment of an electronic device 2201 having five configurable panels. The electronic device 2201 has a first panel 2202, a second panel 2204, a third panel 2206, a fourth panel 2208, and a fifth panel 2210 in a fully extended configuration 2200. In a particular embodiment, each of the panels 2202-2210 may include a respective display surface 2222, 2224, 2226, 2228, and 2230, such that in the fully extended configuration 2200 an effective screen area may be formed by the display surfaces of all of the panels 2202-2210. In a particular embodiment, the electronic device 2201 is a five-panel embodiment of the electronic device 101 of FIGS. 1-7, the electronic device 800 of FIG. 8, the electronic device 900 of FIGS. 9-14, the electronic device 1501 of FIGS. 15-17, the electronic device 1801 of FIGS. 18-20, the electronic device 2100 of FIG. 21, or any combination thereof.

Figure 23:
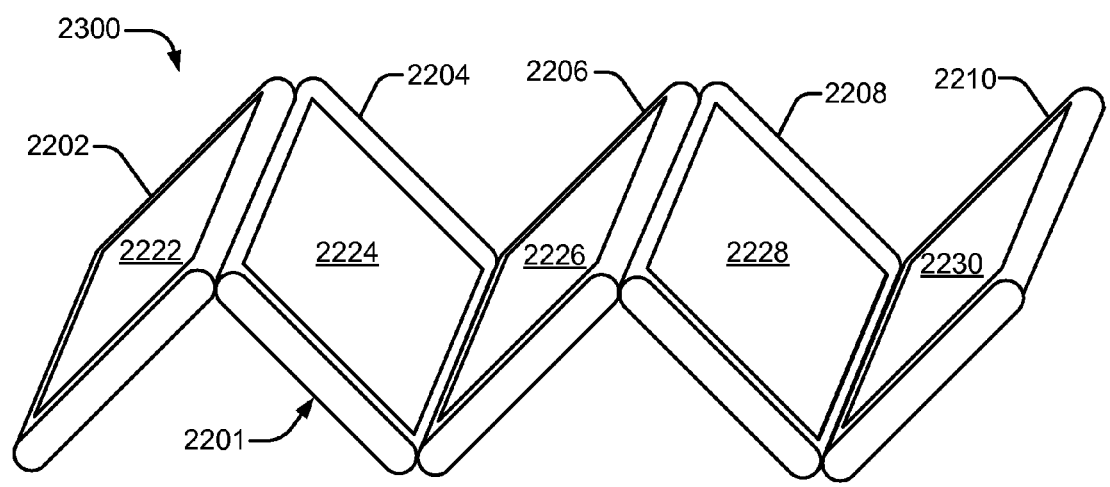
FIG. 23 is a diagram of the electronic device of FIG. 22 in a partially folded configuration.

FIG. 23 depicts a particular embodiment of the electronic device 2201 of FIG. 22 in a transitional configuration 2300. The first panel 2202 is coupled to the second panel 2204 to enable the first panel 2202 and second panel 2204 to rotate from a fully extended position depicted in FIG. 22 to a position where a back side of each panel 2202 and 2204 is proximate to the back side of the other panel. Similarly, the second panel 2204 and the third panel 2206 are rotatably coupled to be positionable from at least a fully extended position to a fully folded position having the display surface 2224 of the panel 2204 proximate to the display surface 2226 of the panel 2206. The panel 2206 and the panel 2208 are rotatably coupled to be positioned from at least the fully extended position to a fully folded position having a back surface of the panel 2206 proximate to a back surface of the panel 2208. The panels 2208 and 2210 are rotatably coupled to be positionable from at least a fully extended position to a fully folded position where the display surface 2228 of the panel 2208 is proximate to the display surface 2230 of the panel 2210. In a particular embodiment, the electronic device 2201 depicted in FIGS. 22 and 23 may be generally analogous to the electronic devices 101, 800, 900, 1501, 1801, or 2100 depicted in FIGS. 1-21, and may include one or more configurations, operations, sensors, hinges, or other features of previously disclosed embodiments. It should be understood that any number of panels may be included in a portable electronic device that automatically adjusts a graphical display based on a change of folding configuration and is within the scope of the present disclosure.

Figure 24:
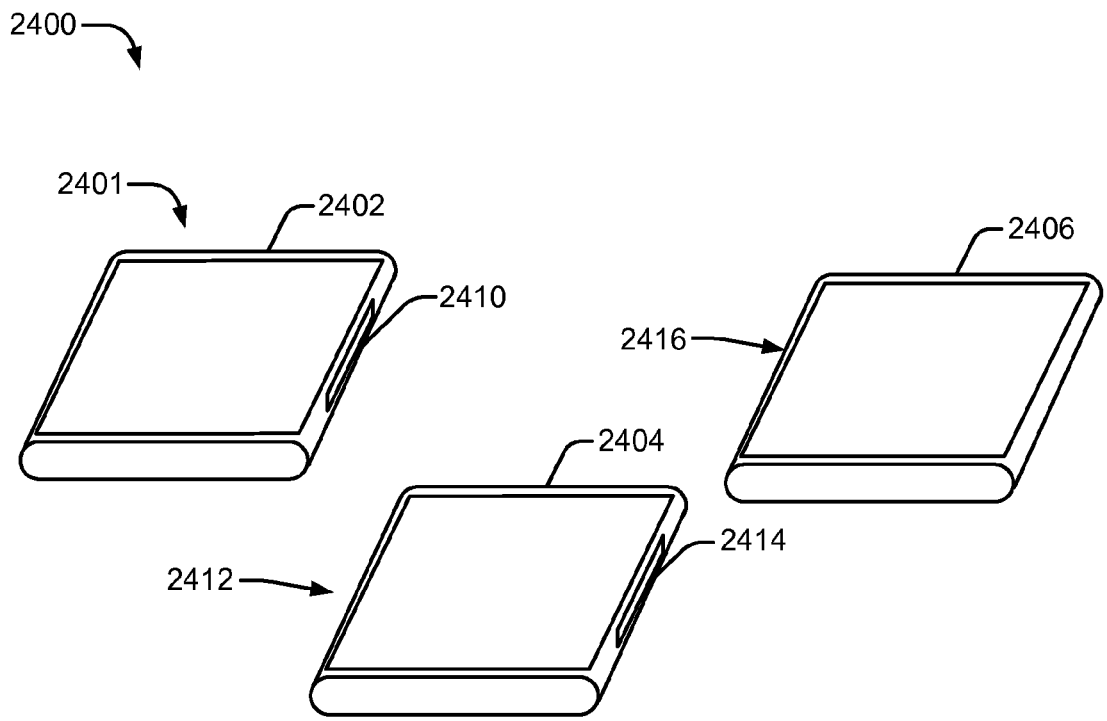
FIG. 24 is a diagram of an eighth illustrative embodiment of an electronic device.

FIG. 24 depicts a particular illustrative embodiment of an electronic device 2401 having three detachable panels in a detached configuration 2400. A first panel 2402 includes a coupling mechanism 2410 that enables the first panel 2402 to couple to the second panel 2404 via a second coupling mechanism 2412 of the second panel 2404. The coupling mechanisms 2410 and 2412 may be configured to provide mechanical and electronic coupling between the first panel 2402 and the second panel 2404. Similarly, the second panel 2404 includes a third coupling mechanism 2414 configured to provide mechanical and electronic coupling to a fourth coupling mechanism 2416 of a third panel 2406. In a particular embodiment, the electronic device 2401 is a detachable-panel embodiment of the electronic device 101 of FIGS. 1-7, the electronic device 800 of FIG. 8, the electronic device 900 of FIGS. 9-14, the electronic device 1501 of FIGS. 15-17, the electronic device 1801 of FIGS. 18-20, the electronic device 2100 of FIG. 21, the electronic device 2201 of FIGS. 22-23, or any combination thereof.

Figure 25:
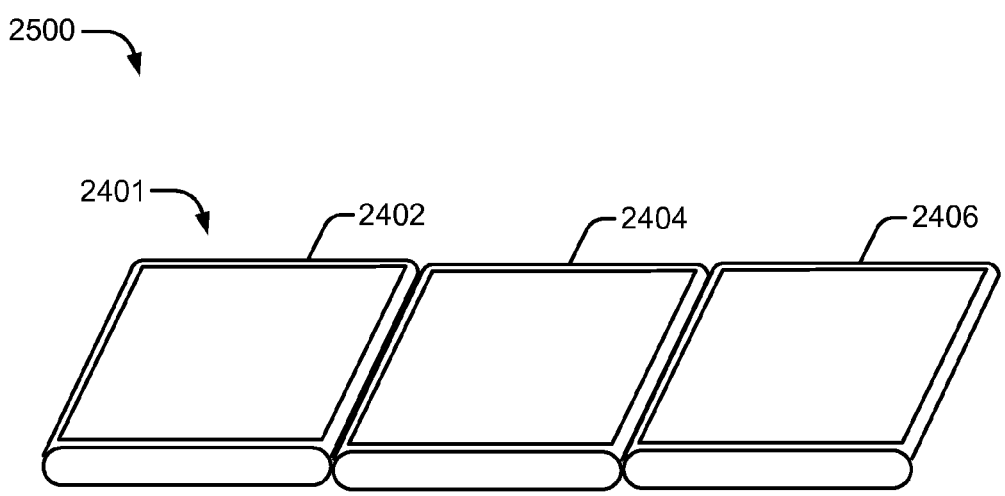
FIG. 25 is a diagram of the electronic device of FIG. 24 in an assembled configuration.

FIG. 25 depicts the electronic device 2401 of FIG. 24 in a fully attached configuration 2500. The first panel 2402 is fixedly coupled to the second panel 2404 which is fixedly coupled to the third panel 2406. The panels 2402-2406 are in a fully extended configuration. In a particular embodiment, the coupling mechanisms 2410-2416 depicted in FIG. 24 may rigidly couple the panels 2402, 2404, 2406 so that little to no rotational movement is enabled between the panels 2402-2406. However, in other embodiments, the coupling mechanisms 2410-2416 may provide or enable rotational motion of one or more of the panels 2402-2406 relative to each other, to enable functionality as described with respect to FIGS. 1-23.

Figure 26:
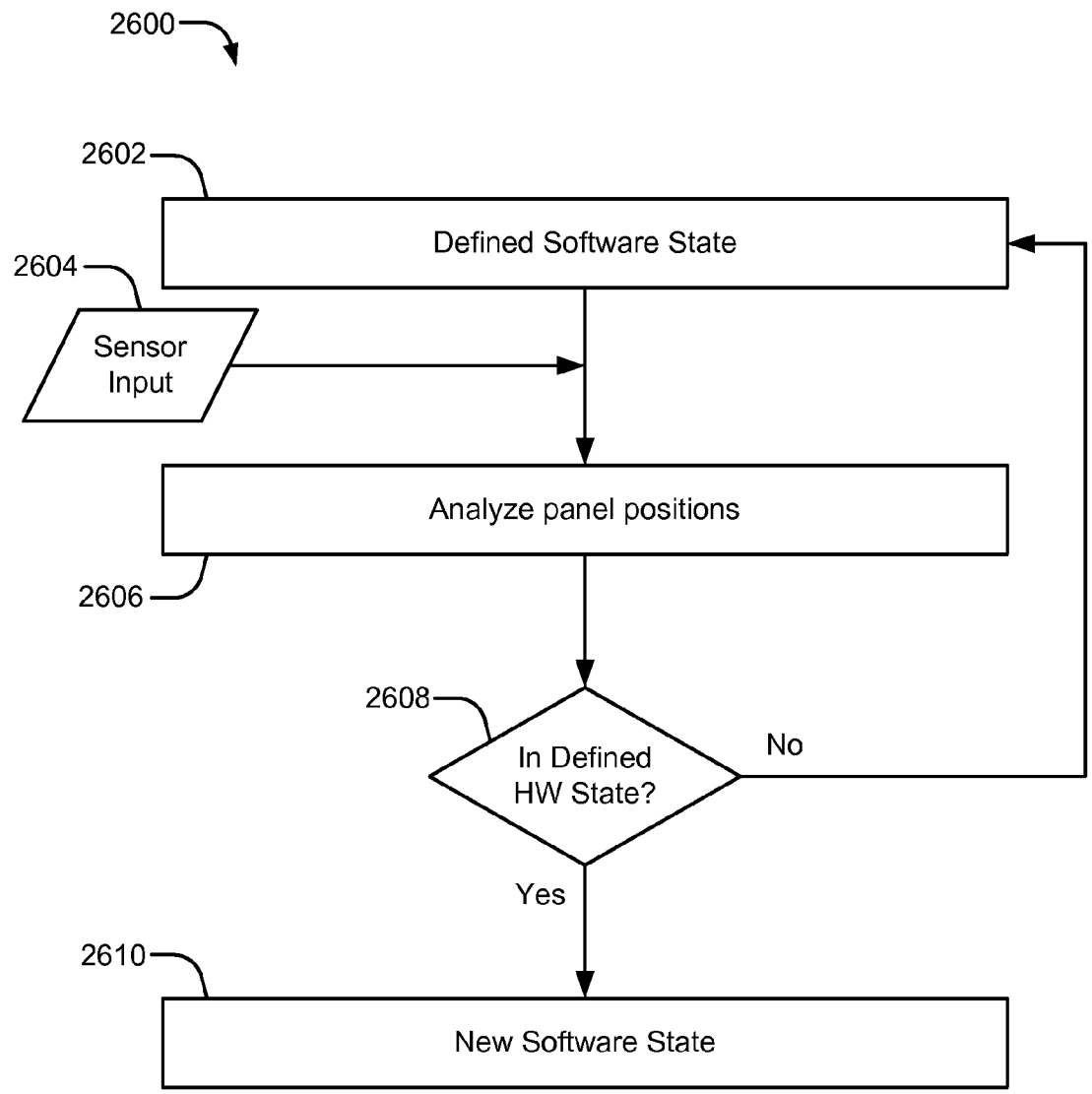
FIG. 26 is a flowchart of a first illustrative embodiment of a method of changing software states at a multi-panel electronic device.

FIG. 26 is a flowchart of an illustrative embodiment of a method of changing software states at a multi-panel electronic device, generally designated 2600. In a particular embodiment, the method 2600 may be performed at the electronic device 101 of FIGS. 1-7, the electronic device 800 of FIG. 8, the electronic device 900 of FIGS. 9-14, the electronic device 1501 of FIGS. 15-17, the electronic device 1801 of FIGS. 18-20, the electronic device 2100 of FIG. 21, the electronic device 2201 of FIGS. 22-23, the electronic device 2401 of FIGS. 24 and 25, or any combination thereof.

In a particular embodiment, the electronic device may include well-defined hardware configurations including a folded mode, a fully unfolded mode, a thumbing mode, a video conferencing mode, and a travel clock mode. A sensor in each panel or fold between panels may detect and report a change in panel or hinge position. A panel or hinge position may be reported in degree of fold, such as within a range of between approximately −180 degrees to approximately 180 degrees. One or more sensors in a middle panel, such as the internal sensor 1834 depicted in FIGS. 18-20, may detect and report orientation changes. A software controller may collect and analyze sensor input and can decide to take one or more actions in response to the sensor input. For example, the software controller may initiate a change of a size of an application, such as an application window or user interface element, initiate a change of an orientation of an application, initiate an auto-launch of an application, initiate an auto-exit of an application, initiate a state change of an application, or a combination of actions.

As illustrated in FIG. 26, the electronic device has a defined software state at 2602. For example, the defined software state may indicate one or more parameters such as whether an application is running or waiting, whether the application receives user input such as keyboard input, one or more application window sizes, positions, orientations, and a type of user interface provided for the application. The defined software state 2602 may indicate a number of panels and a display mode available to an application. For example, the device may be in a folded configuration and the software controller may have launched an application in a one-panel portrait mode. The application may define or include one or more predetermined states to be responsive to the available number of panels and display mode and to improve a user experience.

A sensor input 2604 is received, and the panel positions are analyzed at 2606. In a particular embodiment, the sensor input 2604 may indicate a change in one or more of a hinge position, an orientation, or a movement. For example, a change in hinge position may be detected by hinge sensors, such as the sensors 1512-1516 of FIGS. 15-17 or the sensors 1812 and 1822 of FIGS. 18-20, while a change in orientation or movement may be detected by one or more internal sensors, such as the internal sensors 1532-1536 of FIGS. 15-17 or the internal sensor 1834 of FIGS. 18-20. In addition, a change in hinge position can be detected indirectly by sensors other than hinge sensors, such as via a change in relative orientation of adjacent panels that is detected by inclinometers coupled to the adjacent panels.

Moving to decision 2608, a determination is made whether the electronic device is in a defined hardware state. Where the electronic device is not in a defined hardware state, processing returns to 2602. For example, if the determined hardware configuration is not one the predefined hardware configurations, the software controller may assume that the device is in transition to a known state and may wait for additional sensor inputs.

Where the electronic device is determined to be in a defined hardware state, at 2608, the electronic device enters a new software state at 2610. For example where the electronic device is determined to be in a fully unfolded hardware configuration, the software controller may reconfigure the application with new layout requirements, such as three-panel landscape mode or a three-panel portrait mode.

In a particular embodiment, the software controller may be implemented by circuitry or other hardware, firmware, one or more processors executing program instructions, such as the processor 810 of FIG. 8, a general purpose processor or dedicated processor, or any combination thereof. In a particular embodiment, an application such as the software 834 of FIG. 8 may be written to support multiple predefined states of operation, and may be responsive to a control signal such as an interrupt or a semaphore indicating a particular hardware state or change of state. In a particular embodiment, the software is responsible for querying the hardware configuration and for self-adjusting a software state. In another embodiment, the software is responsible for supporting an interface to receive hardware state change messages from the software controller.

FIGS. 27-31 depict a particular embodiment of automatically configuring a keyboard in response to a detected hardware configuration of an electronic device 2701. In a particular embodiment, the electronic device 2701 is the electronic device 101 of FIGS. 1-7, the electronic device 800 of FIG. 8, a three-panel version of the electronic device 900 of FIGS. 9-14, the electronic device 1501 of FIGS. 15-17, the electronic device 1801 of FIGS. 18-20, the electronic device 2100 of FIG. 21, the electronic device 2201 of FIGS. 22-23, the electronic device 2401 of FIGS. 24 and 25, or any combination thereof. In a particular embodiment, the electronic device 2701 is configured to operate according to the method 2600 of FIG. 26.

FIG. 27 depicts the electronic device 2701 in the fully folded configuration 2700. The electronic device 2701 in the fully folded configuration 2700 has a single panel display surface exposed, showing a display window 2704 and a keyboard area 2702. In a particular embodiment, the keyboard area 2702 is an image displayed as part of a display surface that also includes the display window, and may be actuated via key presses as detected at a touch screen surface. As illustrated, the image including the display window 2704 and the keyboard area 2702 is displayed in a portrait orientation on the single exposed display surface. In another embodiment, the electronic device 2701 may be configured to display an image including a display window and a keyboard area in a landscape orientation. The electronic device 2701 may be responsive to one or more sensors to selectively display the keyboard area in a portrait orientation or a landscape orientation based on a detected orientation of the electronic device 2701.

FIG. 28 depicts the electronic device 2701 of FIG. 27 in a thumbing configuration 2800. In the thumbing configuration 2800, the bottom panel has a display surface displaying a larger keyboard area 2802 than the smaller keyboard area 2702 depicted in FIG. 27. A first display surface 2804 of a middle panel, and a second display surface 2806 of a top panel may form two separate display windows, or may be combined to form a 2-panel effective screen. The keyboard area 2802, as being larger than the keyboard area 2702 of FIG. 27, may enable easier use and move effective data input via a touch screen at the display surface showing the keyboard area 2802.

FIG. 29 illustrates the electronic device 2701 of FIG. 27 in a fully extended configuration 2900. In the fully extended configuration 2900, the keyboard is illustrated as extended across all three panels, which form an effective display screen three panels wide and one panel tall. The effective display screen, in a landscape mode, is wider than it is tall, although each of the panels comprising the effective screen display a respective portion of a displayed landscape image in a portrait configuration. A right-most portion of a keyboard 2902 is displayed under a right-most portion 2908 of a display area at a right-most panel. A center panel displays a center portion 2904 of the keyboard beneath a center portion 2910 of the display area. A left-most panel displays a left-most portion 2906 of the keyboard under a left-most portion 2912 of the display area.

Figure 30:
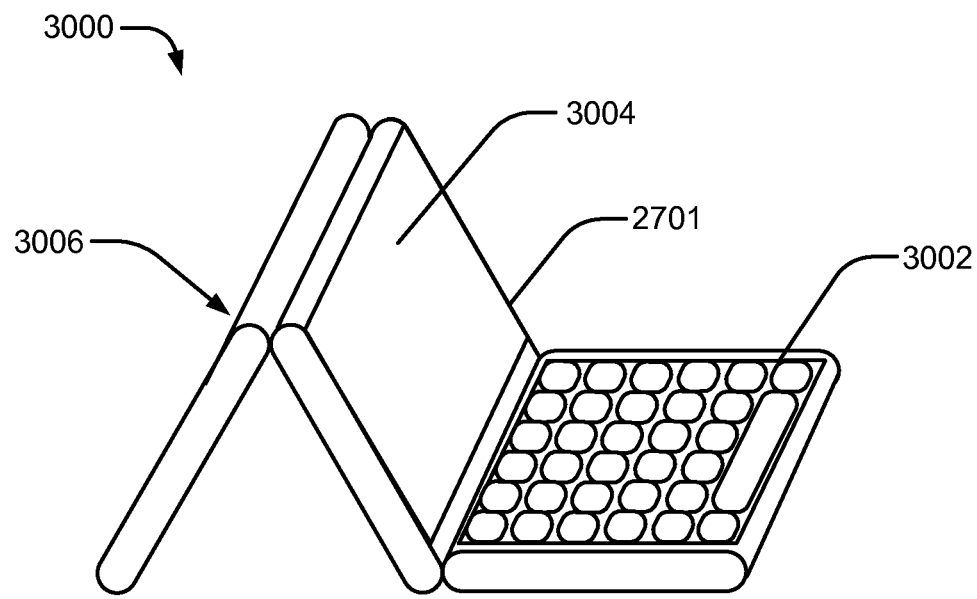
FIG. 30 is a diagram of an illustrative embodiment of the electronic device of FIG. 27 in a travel clock configuration.

FIG. 30 depicts the electronic device 2701 of FIG. 27 in a travel clock configuration 3000. A first horizontal panel displays a keyboard area 3002, which may be actuated via touch that is recognized by a touch screen surface. A second display surface 3004 of the center panel may be used for visual display of application windows, icons, other controls, as well as a clock indicia. A third display surface 3006 may have a display area that is powered down, or that performs other functions, such as a night light, displaying one or more ornamental designs, a user specified display, or any combination thereof.

Figure 31:
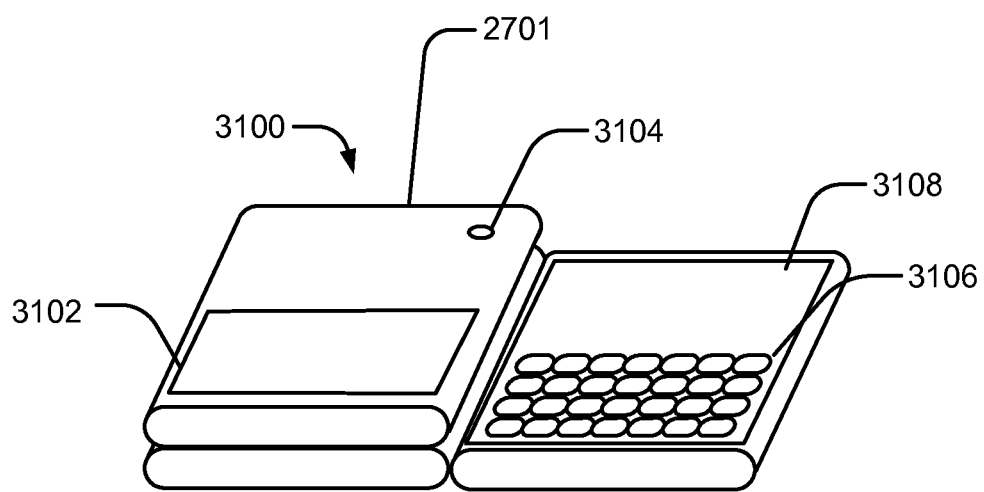
FIG. 31 is a diagram of an illustrative embodiment of the electronic device of FIG. 27 in a video conferencing configuration.

FIG. 31 illustrates the device 2701 of FIG. 27 in a video conferencing configuration 3100. A camera 3104 is illustrated on a back surface of the left-most panel, which is depicted in a folded configuration. The back surface of the leftmost panel may include additional user interface mechanisms, such as an additional display 3102. In addition, the right-most panel may be divided to provide a keyboard area 3106 at a bottom portion of a display surface, and a display area 3108 that may show an image of a participant in a video conference call, located above the keyboard area 3106. In general, the electronic device 2701 may be programmable to recognize a configuration of the device 2701, such as via one or more sensors internal to the panels, internal to the hinges, or other sensors, and may automatically reconfigure a display of a keyboard at an appropriate portion of one or more appropriate display surfaces, as illustrated in FIGS. 27-31. The reconfiguration, redisplay, and reorientation of the display panels, and in particular the keyboard, may be performed automatically in response to a user configuration, folding, hardware adjustment, inclination, orientation, acceleration, or any combination thereof, without any further input required of or detected from the user.

FIGS. 32-37 illustrate an electronic device 3201 having an icon control panel that is responsive to a configuration of the electronic device 3201, and that is further responsive to user input to open and close applications. In a particular embodiment, the electronic device 3201 is the electronic device 101 of FIGS. 1-7, the electronic device 800 of FIG. 8, a three-panel version of the electronic device 900 of FIGS. 9-14, the electronic device 1501 of FIGS. 15-17, the electronic device 1801 of FIGS. 18-20, the electronic device 2100 of FIG. 21, the electronic device 2201 of FIGS. 22-23, the electronic device 2401 of FIGS. 24 and 25, the electronic device 2701 of FIGS. 27-31, or any combination thereof. In a particular embodiment, the electronic device 3201 is configured to operate according to the method 2600 of FIG. 26.

Figure 32:
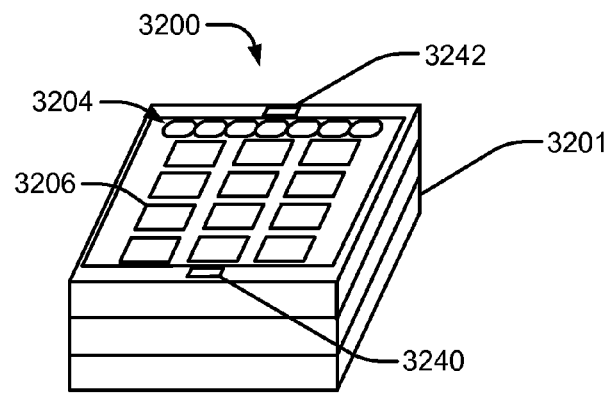
FIG. 32 is a diagram of a tenth illustrative embodiment of an electronic device.

FIG. 32 depicts the electronic device 3201 in a fully folded configuration 3200. A display surface of the left-most panel illustrates one or more controls or other indicia 3204 such as, for example, wireless phone indicia, including a power indicator, a signal strength indicator, an alarm signal, a digital network bandwidth indication, indicia, or any combination thereof. The upper display surface further includes multiple application icons, such as the representative application icon 3206. The application icons may be responsive to user input via a touch sensitive surface at the display surface. The electronic device 3201 may be usable for telephonic telecommunications, and may include a microphone 3240, a speaker 3242, other hardware elements to enable one or more functions of the electronic device 3201, or any combination thereof.

Figure 33:
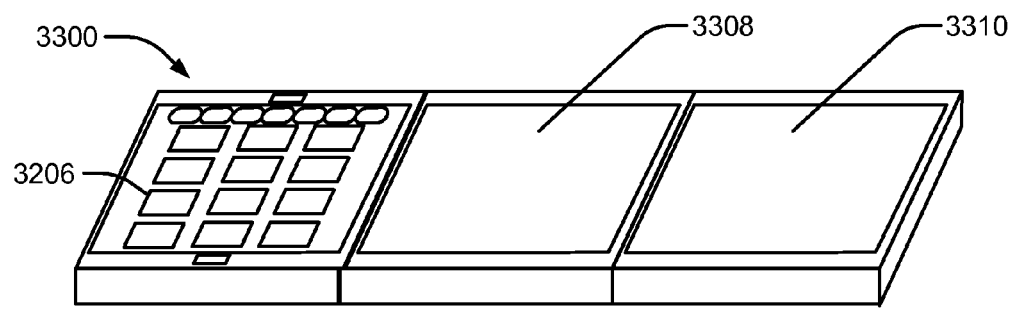
FIG. 33 is a diagram of an illustrative embodiment of the electronic device of FIG. 32 in a fully extended configuration.

FIG. 33 depicts the electronic device 3201 of FIG. 32 in a fully extended configuration 3300. When the device 3201 is extended from the fully folded configuration 3200 of FIG. 32 to the fully extended configuration 3300 of FIG. 33, a display screen 3308 of the center panel and a display screen 3310 of the right-most panel are exposed and viewable by a user. The display screens 3308 and 3310 may show a desktop area while the left-most panel may continue to show an icon panel including the representative application icon 3206.

Figure 34:
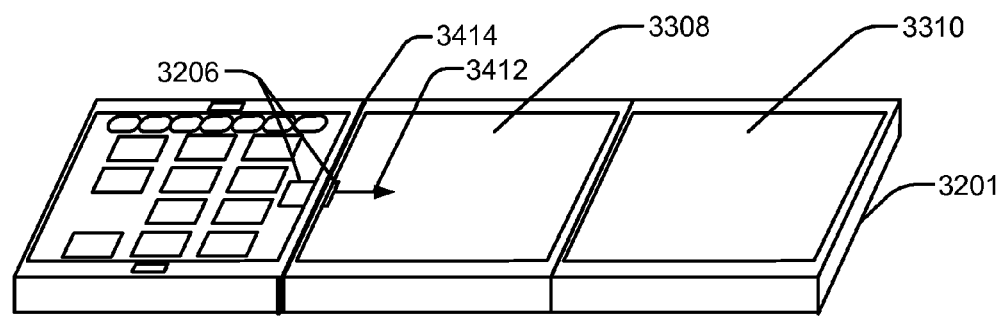
FIG. 34 is a diagram of an illustrative embodiment of the electronic device in the fully extended configuration of FIG. 33 showing movement of an application icon in response to a user input.

FIG. 34 depicts a movement of the representative application icon 3206 toward a gap 3414 between a left-most display surface and the center display surface 3308 in response to a user input. For example, the user input may be a dragging operation indicating a movement of the representative application icon 3206 toward the gap 3414, and may indicate, via a speed and direction of movement of the application icon 3206, that the representative application icon 3206 is to be moved across the gap 3414. A movement of the representative application icon 3206 is illustrated as an arrow 3412, where a speed of movement is illustrated as a length of the arrow 3412, and direction of movement is indicated as a direction of the arrow 3412. The speed and direction of movement of the application icon 3206 may be used to make a prediction of a user's intention associated with the user input, such as when the user input is received as a dragging operation at a touch-screen. For example, the speed and direction of movement of the application icon 3206 may be used to predict that a user input is intended to move the application icon 3206 across the gap 3414, even if the user input ends before reaching the gap 3206. In a particular embodiment, one or more physical laws may be simulated for user interface elements, such as momentum and friction, such that a user may initiate a motion of a user interface element and the user interface element may continue its motion according to the simulated physics of the interface. For example, an interface element set into motion by a dragging operation and then released may slow down and stop in a manner that is predictable to the user and that may be perceived as natural or intuitive by the user.

As illustrated in FIG. 34, as the speed and direction of movement provided by the user input indicates an instruction for the icon 3206 to cross the gap 3414, at least a portion of the icon 3206 may be displayed at the center display panel 3308, while the remaining portion of the icon 3206 may be displayed at the left-most display panel. In this way, a user may maintain a visual reference of the representative application icon 3206 having a continuous motion across the gap 3414. In a particular embodiment, such as shown when the icon 3206 is moved relatively slowly, the representative application icon 3206 may be moved across the gap 3414, and may be positioned in the center display area 3308. However, when the application icon 3206 is moved with sufficient speed across the gap 3414, the electronic device 3201 may interpret the user input indicating the movement of the representative application icon 3206 across the gap 3414 as a launch instruction for an application associated with the representative application icon 3206.

Figure 35:
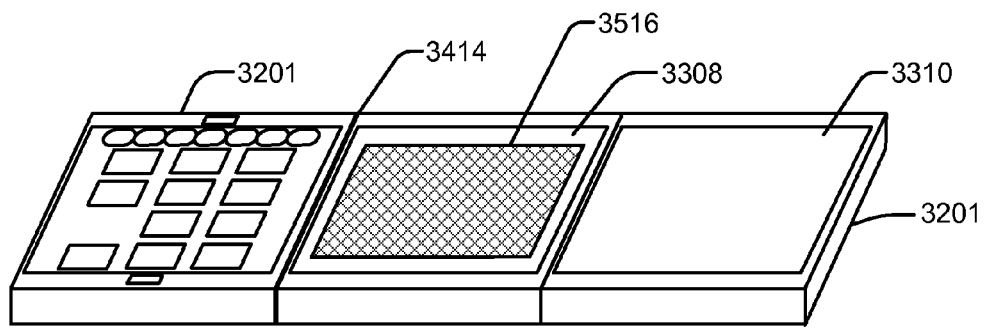
FIG. 35 is a diagram of an illustrative embodiment of the electronic device in the fully extended configuration of FIG. 33 displaying an application window.

As illustrated in FIG. 35, in a particular embodiment, when application icon 3206 of FIGS. 32-34 is pulled across the gap 3414 with sufficient speed, an application is launched that is associated with the application icon 3206, such as by opening an application window 3516 in the center display area 3308. In another embodiment, the application window 3516 may extend to cover both the center display surface 3308 and the right-most display surface 3310, which may be configured to operate as a 2-panel effective display screen.

Figure 36:
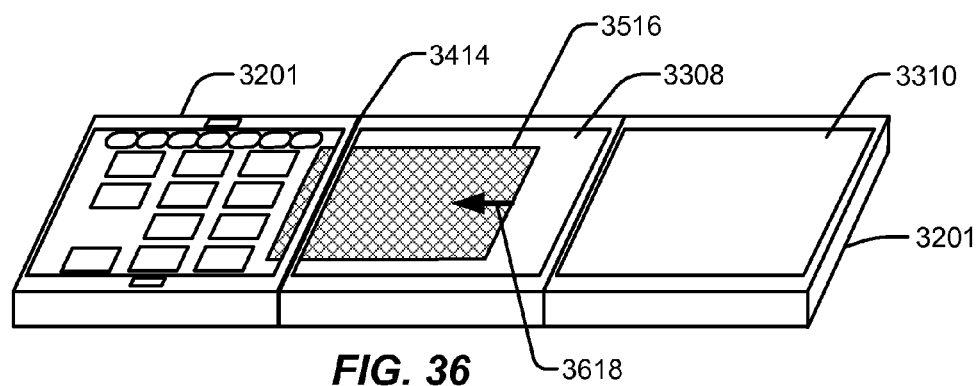
FIG. 36 is a diagram of an illustrative embodiment of the electronic device in the fully extended configuration of FIG. 33 showing movement of an application window in response to a user input.
Figure 37:
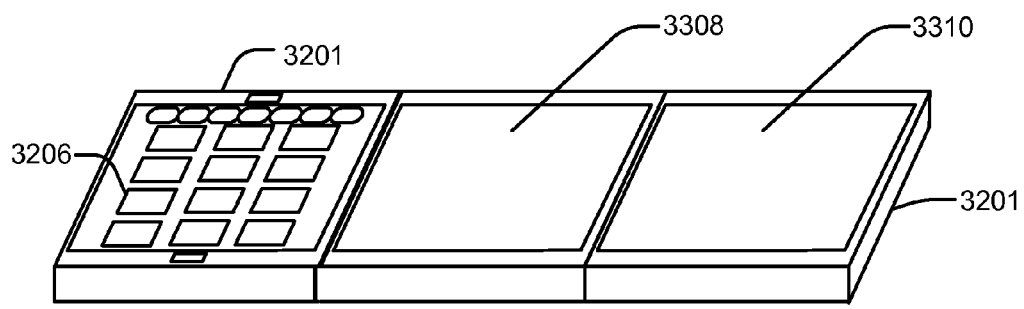
FIG. 37 is a diagram of an illustrative embodiment of the electronic device of FIG. 36 after a predetermined portion of the application window crosses a gap between display surfaces.

As illustrated in FIG. 36, in a particular embodiment, a user may instruct the electronic device to close the application window 3516 by providing user input directing the application window 3516 to have a movement, illustrated by an arrow 3618, toward the gap 3414. The application window 3516 may be displayed as traveling toward the gap 3414, and may also be displayed as having at least a portion displayed in the first display surface of the left-most panel to provide visual continuity to the user of the electronic device 3201 to appear as if the application window 3516 is at least partially across the gap 3414. In a particular embodiment, when the application window 3516 has been instructed by a user input to move a sufficient distance toward the gap 3414, such as when a particular motion of the application window 3516 across the gap 3414 has occurred or will occur, the electronic device 3201 may interpret the user input as a command to close the application displayed at the application window 3516, close the application and the application window 3516, and return the representative application icon 3206 to its original position in left-most surface panel as depicted in FIG. 37.

FIGS. 32-37 illustrate a method of interaction using the gaps between touch screens on a multi-screen electronic device to trigger an event or interaction with the user interface. By knowing the location and size of the gaps, the application or software can use the gap as another method of interaction. As an example, a browser could be launched from one screen to display on the remaining screens. The first screen could contain application icons including one for a browser, such as the application icon 3206 of FIG. 33. A user could place their finger on the icon for the browser then drag the icon in the direction of the screen gap, such as the gap 3414 of FIG. 34. As the user reaches the gap, an interaction could be initiated and visualized showing the browser opening up in the remaining screens. A reverse use of this trigger could include dragging some part of an open application, such as the application window 3516 of FIG. 35, across a given gap that initiates a close or hide feature back to the originating screen.

As illustrated in FIG. 34 and FIG. 36, a visual cue may be used on a forward side of a user interface element to both show direction and location across gaps while the user is dragging across multiple screens. When being dragged, the user interface element (such as an icon or application window) may shift a number of pixels in the forward direction so it is still visible to the user and cues the direction. When dragging across a gap between multiple screens, such as to auto-launch an application or to move a user interface element to another screen, the user interface element may shift forward the same distance as the measured gap to both show direction and the ability to move across screens. By showing the direction, location, and ability to cross gaps, the electronic device 3201 may provide the user with a continuous cue while dragging user interface elements. As a result, user errors may be reduced and usability of the electronic device 3201 may be improved.

Figure 38:
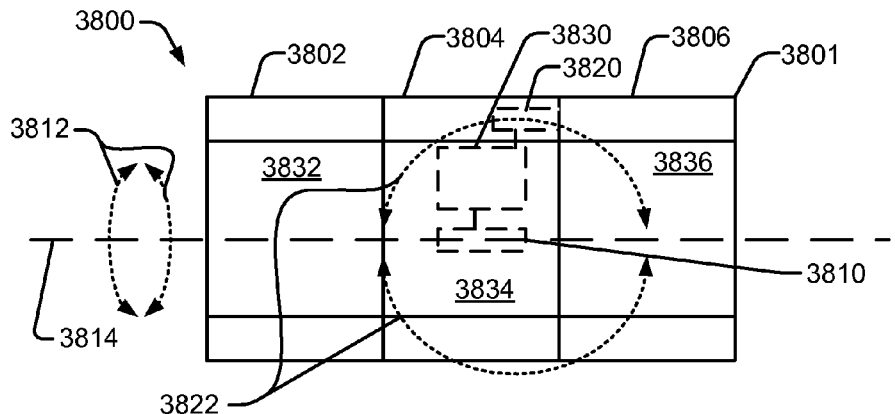
FIG. 38 is a diagram of a eleventh illustrative embodiment of an electronic device.

Referring to FIG. 38, a particular illustrative embodiment of an electronic device 3801 having an accelerometer and an inclinometer is depicted and generally designated 3800. In a particular embodiment, the electronic device 3801 is the electronic device 101 of FIGS. 1-7, the electronic device 800 of FIG. 8, a three-panel version of the electronic device 900 of FIGS. 9-14, the electronic device 1501 of FIGS. 15-17, the electronic device 1801 of FIGS. 18-20, the electronic device 2100 of FIG. 21, the electronic device 2201 of FIGS. 22-23, the electronic device 2401 of FIGS. 24 and 25, the electronic device 2701 of FIGS. 27-31, the electronic device 3201 of FIGS. 32-37, or any combination thereof. In a particular embodiment, the electronic device 3801 is configured to operate according to the method 2600 of FIG. 26.

The electronic device 3801 includes a first panel 3802 having a first display surface 3832, a second panel 3804 having a second display surface 3834, and a third panel 3806 having a third display surface 3836. The three display surfaces 3832-3836 are controlled to emulate a single display screen that extends across all three display surfaces 3832-3836. The first panel 3802 is rotatably coupled to a first edge of the second panel 3804 and the third panel 3806 is rotatably coupled to a second edge of the second panel 3804. An inclinometer 3810 is located at the second panel 3810, and an accelerometer 3820 is offset from a longitudinal axis 3814 of the second panel. A controller, such as a processor 3830, is coupled to the inclinometer 3810 and to the accelerometer 3820.

The inclinometer 3810 is configured to detect a change in an inclination of the second panel 3804. For example, the inclinometer 3810 may be configured to detect a change in an orientation caused by a longitudinal rotation direction 3812 about a longitudinal axis 3814. The accelerometer 3820 may be configured to detect an in-plane rotation direction 3822 of the second panel 3804 from a landscape orientation to a portrait orientation.

In a particular embodiment, the processor 3830 is configured to execute at least one software application having a graphical user interface. The processor 3830 is responsive to the inclinometer 3810 and the accelerometer 3820 to redraw an image displayed at the first display surface 3832, the second display surface 3834, the third display surface 3836, or any combination thereof, from a landscape-type display of the image to a portrait-type display of the image when the first panel 3832, the second panel 3834, and the third panel 3836 are in at least one predetermined folding configuration and the change in the inclination of the second panel 3834 does not exceed a threshold during the rotation of the second panel 3834. For example, the threshold may be an angle in a range between 5 degrees and 30 degrees (or −5 degrees and −30 degrees) and may be approximately 15 degrees (or −15 degrees).

For example, the controller may be configured to calculate that a detected acceleration is faster than an expected acceleration that would be expected to be detected for a person walking and carrying the device 3801, and that the inclinometer 3810 has detected no change (or less than a threshold change) in inclination. The controller may hold the content in place as the device 3801 turns around the content. Because the display may change positions compared to an original position of the display, the controller may continually redraw the content until the acceleration stops. For example, this would enable a user of the device 3801 to lay the device 3801 on a desk and to spin the device 3801 clockwise or counterclockwise to switch the display from portrait to landscape or any position in between.

Figure 39:
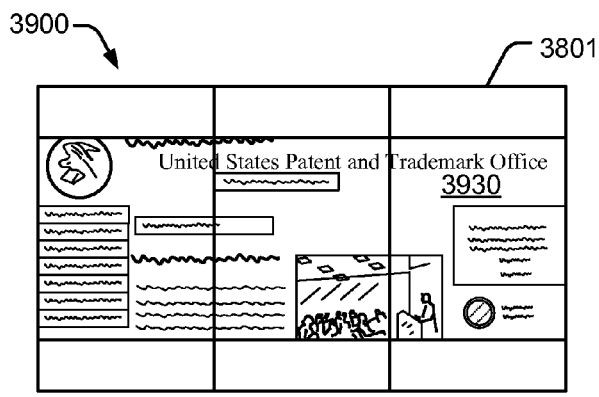
FIG. 39 is a diagram of an illustrative embodiment of the electronic device of FIG. 38 in a landscape orientation.
Figure 41:
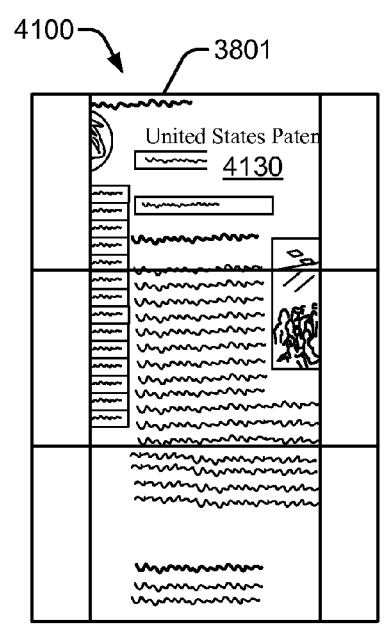
FIG. 41 is a diagram of an illustrative embodiment of the electronic device of FIG. 38 in a portrait orientation.
Figure 40:
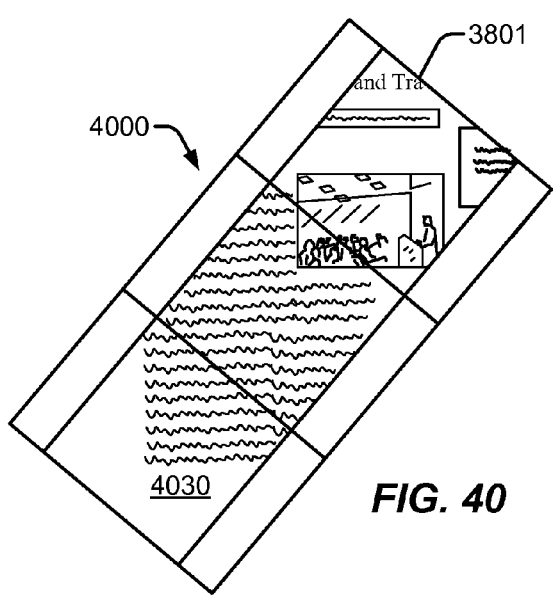
FIG. 40 is a diagram of an illustrative embodiment of the electronic device of FIG. 38 in a rotated orientation.

FIGS. 39-41 illustrate an operation of the electronic device 3801 of FIG. 38 as the device 3801 is rotated from a landscape orientation to a portrait orientation.

In FIG. 39, the electronic device 3801 is depicted in a landscape mode 3900 where a web browser application image is displayed as a landscape-type display across all three display surfaces. The device 3801 may be rotated counterclockwise through a transitional position 4000 shown in FIG. 40 to a profile mode position 4100 shown in FIG. 41 without substantially changing an inclination of the middle panel. For example the device 3801 may be placed flat on a surface such as a table or desk and rotated. As another example, the device 3801 may be held at a substantially constant inclination, such as a vertical inclination, as the device 3801 is rotated.

As illustrated in FIG. 40, as the processor 3830 receives inputs from the accelerometer 3820 and the inclinometer 3810 indicating that the device 3801 is rotating in the in-plane rotation direction 3822 but not significantly in the longitudinal rotation direction 3812, the image displayed at the display panels may be continually redrawn to maintain an orientation of the image with respect to a viewer. Such redrawing may provide an appearance to a user that the display surfaces function as a window to an underlying image, where the window rotates and the image remains stationary. FIG. 41 illustrates the electronic device 3801 at a portrait-type orientation that is attained by rotating the device a quarter-turn counterclockwise from the landscape-type configuration of FIG. 39. Thus, the user may continually rotate the device 3801 until a user is satisfied with an orientation for viewing of the content.

In a particular embodiment, a gaming application may be executed by the device 3801 such that a user provides control input by rotating the device 3801. For example, a driving application may display a driver's view of a racetrack across the extended display panels and a user may rotate the device 3801 as a steering wheel to control a steering of a vehicle on the racetrack, where the view does not rotate with the device and instead remains at a substantially stationary orientation, from the user's perspective. In addition, under certain circumstances a detected rotation of the device 3801 may be used to initiate specific processes in addition to a continual redrawing of the display. For example, when the device 3801 is executing a gaming application, a detected rotation may trigger one or more vibration actuators (not shown) or other hardware elements of the device 3801.

Figure 42:
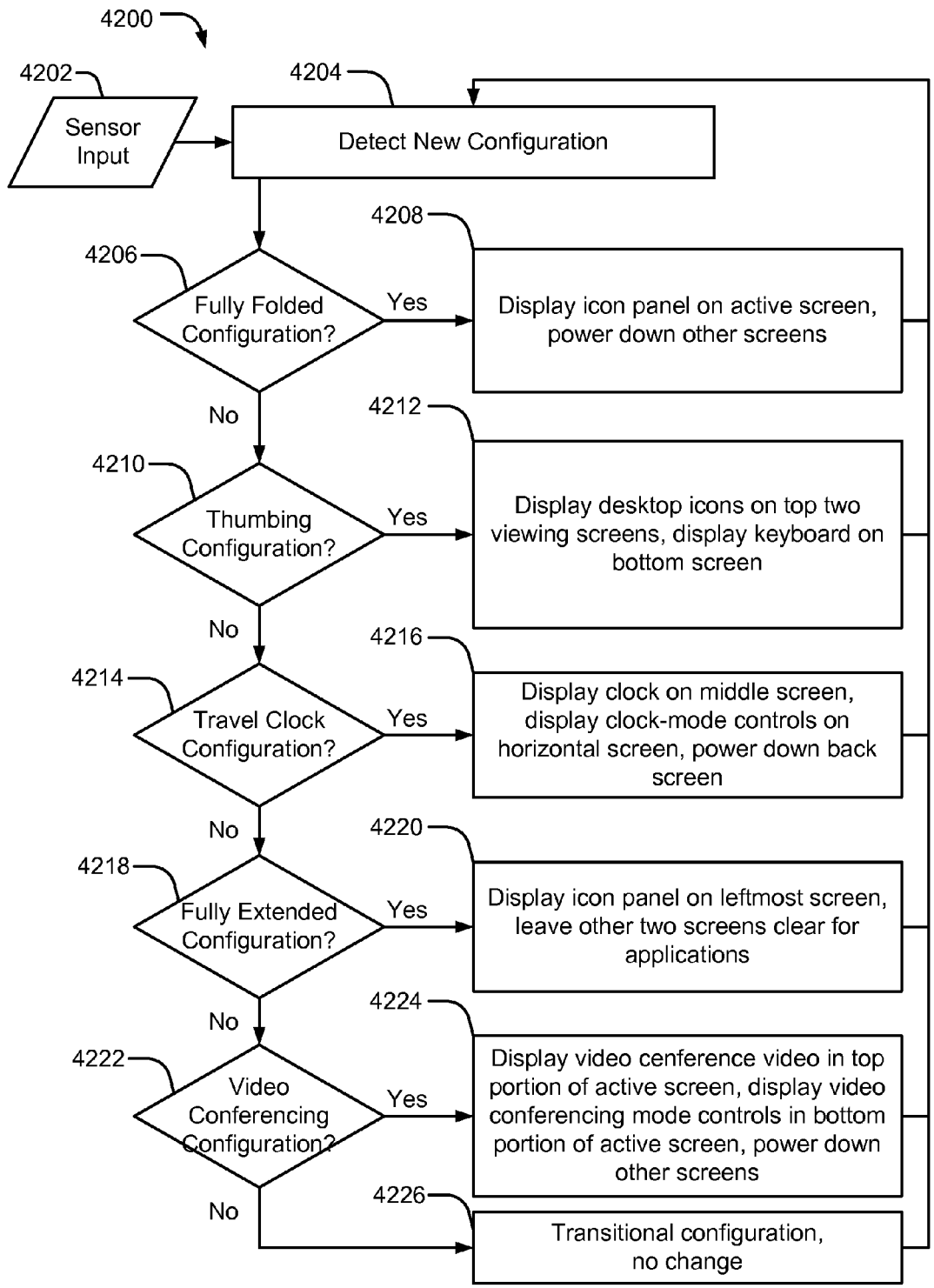
FIG. 42 is a flowchart of a second illustrative embodiment of a method of changing software states at a multi-panel electronic device.

FIG. 42 is a flowchart of a second illustrative embodiment of a method 4200 of changing software states at a multi-panel electronic device. In a particular embodiment, the method 4200 may be performed at the electronic device 101 of FIGS. 1-7, the electronic device 800 of FIG. 8, the electronic device 900 of FIGS. 9-14, the electronic device 1501 of FIGS. 15-17, the electronic device 1801 of FIGS. 18-20, the electronic device 2100 of FIG. 21, the electronic device 2201 of FIGS. 22-23, the electronic device 2401 of FIGS. 24 and 25, the electronic device 2701 of FIGS. 27-31, the electronic device 3201 of FIGS. 32-37, the electronic device 3801 of FIGS. 38-41, or any combination thereof.

The method 4200 illustrates a default state of an electronic device when no user interfaces for executing applications are displayed, such as after the device is powered on and before a user launches an application. A sensor input 4202 is received and used to detect a new hardware configuration at 4204. For example, the sensor input 4202 may indicate a relative orientation, or a change in orientation, of one or more panels of a multi-panel device, such as via one or more hinge sensors, inclinometers, accelerometers, one or more other sensors, or any combination thereof.

Moving to decision 4206, a determination is made whether the device is in a fully folded configuration, at 4206. Where the device is determined to be in the fully folded configuration, an icon panel may be displayed on an active screen, and other screens may be powered down, at 4208.

Where the device is determined to not be in the fully folded configuration, a determination is made whether the device is in a thumbing configuration, at decision 4210. Where the device is determined to be in the thumbing configuration, desktop icons may be displayed on a top two viewing screens, and a keyboard may be displayed on a bottom screen, at 4212.

Where the device is determined to not be in the thumbing configuration, a determination is made whether the device is in a travel clock configuration, at decision 4214. Where the device is determined to be in the travel clock configuration, a clock may be displayed at a middle screen, clock-mode controls may be displayed at a horizontal screen, and a back screen may be powered down, at 4216.

Where the device is determined to not be in the travel clock configuration, a determination is made whether the device is in a fully extended configuration, at decision 4218. Where the device is determined to be in the fully extended configuration, an icon panel may be displayed at a leftmost screen, and the other two screens may be left clear for applications, at 4220.

Where the device is determined to not be in the fully extended configuration, a determination is made whether the device is in a video conferencing configuration, at decision 4222. Where the device is determined to be in the video conferencing configuration, a video conference video may be displayed at a top portion of an active screen, video conferencing mode controls may be displayed at a bottom portion of the active screen, and the other screens may be powered down, at 4224.

Where the device is determined to not be in the video conferencing configuration, a determination may be made, at 4226, that the device is in a transitional configuration, and no change may be performed at the display panels, and processing may return to 4204.

Although the method 4200 illustrates five hardware configurations, in other embodiments, more than five configurations, or less than five configurations, may be used. For example, an upright configuration resembling a folding screen may cause the electronic device to automatically begin displaying streaming real-time news, stock quotes, and blog feeds received via a wireless data network, for use as a secondary desktop appliance, or to launch an audio or video file player to begin playing a playlist stored at the device or received via the data network, or to automatically launch other applications according to a user configuration, or any combination thereof. In addition, custom configurations may be programmed into the electronic device and tested against when the sensor input 4202 is received.

Figure 43:
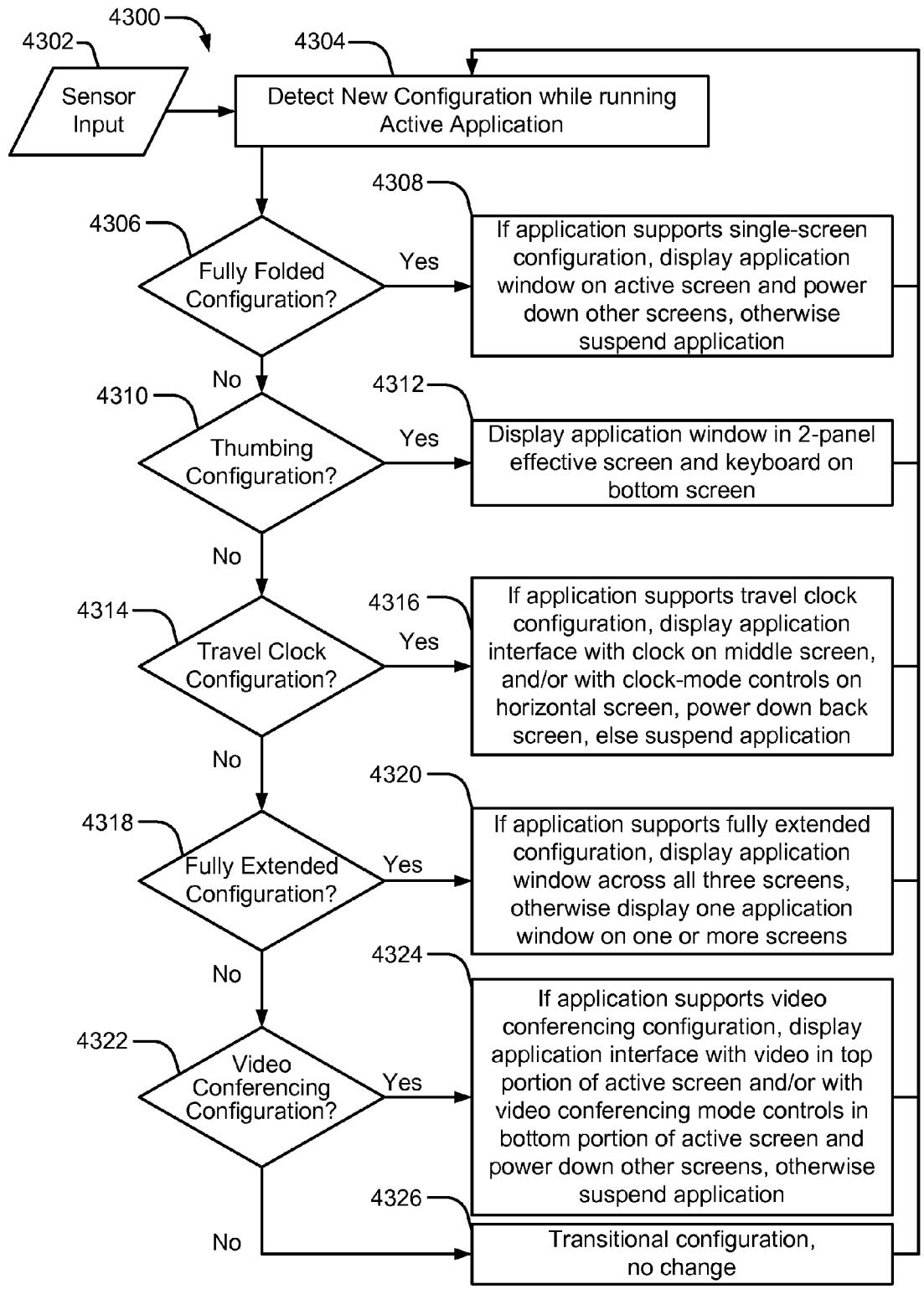
FIG. 43 is a flowchart of a third illustrative embodiment of a method of changing software states at a multi-panel electronic device.

FIG. 43 is a flowchart of a third illustrative embodiment of a method 4300 of changing software states at a multi-panel electronic device. In a particular embodiment, the method 4300 may be performed at the electronic device 101 of FIGS. 1-7, the electronic device 800 of FIG. 8, the electronic device 900 of FIGS. 9-14, the electronic device 1501 of FIGS. 15-17, the electronic device 1801 of FIGS. 18-20, the electronic device 2100 of FIG. 21, the electronic device 2201 of FIGS. 22-23, the electronic device 2401 of FIGS. 24 and 25, the electronic device 2701 of FIGS. 27-31, the electronic device 3201 of FIGS. 32-37, the electronic device 3801 of FIGS. 38-41, or any combination thereof.

The method 4300 illustrates a default state of an electronic device when an application is executing that supports multiple software states and that is responsive to a configuration change of the electronic device. A sensor input 4302 is received and used to detect a new hardware configuration, while running the active application, at 4304. For example, the sensor input 4302 may indicate a relative orientation, or a change in orientation, of one or more panels of a multi-panel device, such as via one or more hinge sensors, inclinometers, accelerometers, one or more other sensors, or any combination thereof.

Moving to decision 4306, a determination is made whether the device is in a fully folded configuration, at 4306. Where the device is determined to be in the fully folded configuration, if the application supports a single-screen configuration, the application window of the application in a single-screen mode is displayed on the active screen and the other screens are powered down, at 4308. Where the application does not support a single-screen mode, the application may be suspended and not displayed at the active screen.

Where the device is determined to not be in the fully folded configuration, a determination is made whether the device is in a thumbing configuration, at decision 4310. Where the device is determined to be in the thumbing configuration, an application window may be displayed in a two-panel effective screen and a keyboard is displayed at the bottom screen, at 4312.

Where the device is determined to not be in the thumbing configuration, a determination is made whether the device is in a travel clock configuration, at decision 4314. Where the device is determined to be in the travel clock configuration, if the application supports the travel clock configuration, an application interface is displayed with a clock on the middle screen or with clock-mode controls on the horizontal screen, or both, and the back screen is powered down, at 4316. If the application does not support the travel clock configuration, the application may be suspended and not displayed.

Where the device is determined to not be in the travel clock configuration, a determination is made whether the device is in a fully extended configuration, at decision 4318. Where the device is determined to be in the fully extended configuration, if the application supports the fully extended configuration, an application window may be displayed across all three screens, at 4320. If the application does not support the fully extended configuration, an application window may be displayed on one or more screens.

Where the device is determined to not be in the fully extended configuration, a determination is made whether the device is in a video conferencing configuration, at decision 4322. Where the device is determined to be in the video conferencing configuration, if the application supports the video conferencing configuration, an application interface may be displayed with video at a top portion of the active screen and/or with video conferencing mode controls in a bottom portion of the active screen, and the other screens may be powered down, at 4324. If the application does not support the video conferencing configuration, the application may be suspended.

Where the device is determined to not be in the video conferencing configuration, a determination may be made, at 4326, that the device is in a transitional configuration, and no change may be performed at the display panels, and processing may return to 4304.

In a particular embodiment, in one or more configurations not supported by the application and where the application is suspended, one or more icons or other indicators may be displayed to indicate the application has been suspended. In another embodiment, instead of suspending the application, the application may continue to be executed although no graphical user interface may be displayed. For example, an interface for an audio file player may not be displayed, but the audio file player may continue playing a playlist, when the device is changed to a configuration not supported by the audio file player. In another embodiment, the application may be auto-exited rather than suspended in response to a transition to a configuration not supported by the application. In another embodiment, the application may include configuration data to control whether the application is to be suspended or auto-exited.

In a particular embodiment, the device may perform other operations based on detecting a configuration change. For example, as will be discussed with respect to FIG. 48, when a browser window is open and displays content from a particular website, the device may automatically request the website to resend content based on an available screen size or resolution increasing or decreasing due to a configuration change. As another example, a video player may automatically change from a widescreen display mode to reduced resolution narrow display mode when an available screen size is reduced due to a configuration change, such as from a fully extended configuration to a fully folded, travel clock, or thumbing configuration.

Although the method 4300 illustrates five hardware configurations, in other embodiments, more than five configurations, or less than five configurations, may be used. For example, an upright configuration resembling a folding screen may cause the electronic device to display an application interface for the application in a left-most panel, and may automatically begin displaying streaming real-time news, stock quotes, and blog feeds received via a wireless data network in the center and right-most panel, for use as a secondary desktop appliance. In addition, custom configurations may be programmed to the electronic device and tested against when the sensor input 4302 is received.

In addition, one or both of the embodiments depicted in FIGS. 42 and 43 may include additional configuration determinations. For example, the method 4200, 4300, or both, may include one or more determinations whether the device is in a portrait orientation, a landscape orientation, or a rotating orientation (for example, as described with respect to FIGS. 38-41). Based on the determination, the device may make additional software configuration and user interface changes. To illustrate, when the sensor input 4202 or 4302 indicates the device is in the fully extended configuration and the active application is a video player, the video may be displayed across all three screens when the device is detected to be in a landscape orientation (e.g., the device is held so that the device is longer in a side-to-side direction than in an up-and-down direction) but may be displayed in only an upper two screens when the device is detected to be in a portrait orientation (e.g., the device is held so that the device is longer in an up-and-down direction than in a side-to-side direction). In a particular embodiment, the video may be stretched to cover the available display area, while in another embodiment an aspect ratio of the video may be preserved during display.

Figure 44:
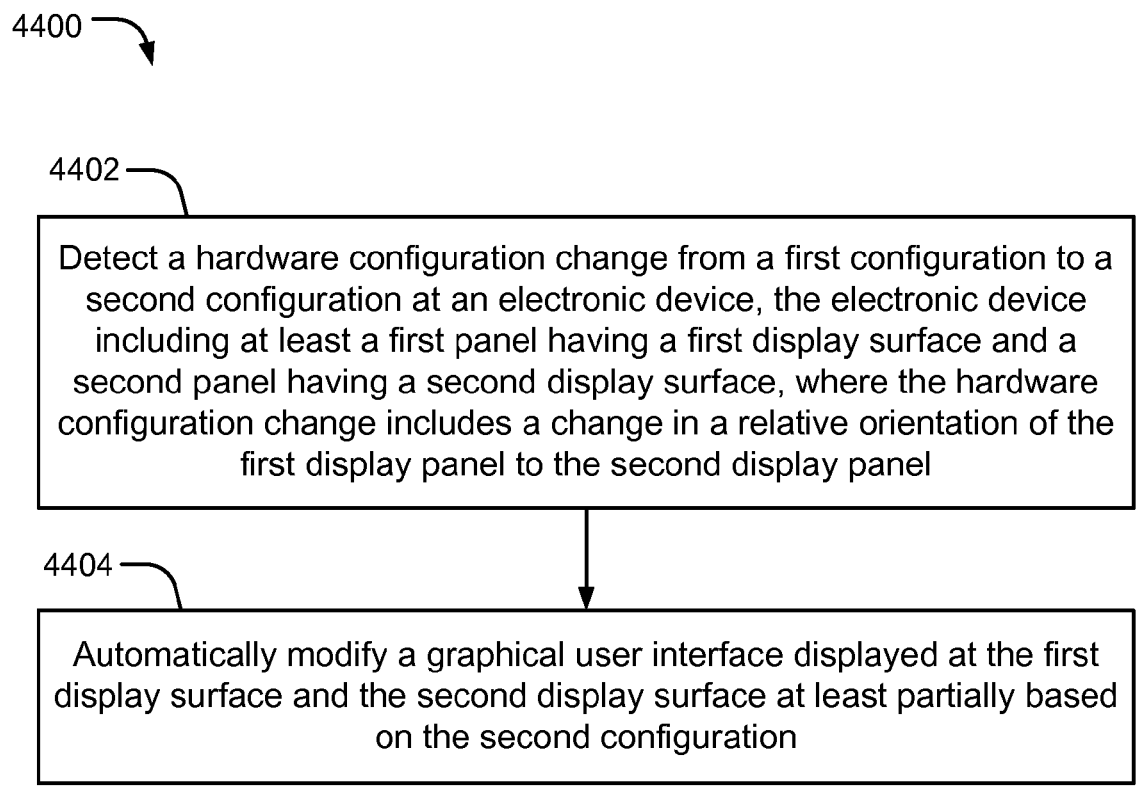
FIG. 44 is a flowchart of a fourth illustrative embodiment of a method of changing software states at a multi-panel electronic device.

FIG. 44 is a flowchart of a fourth illustrative embodiment of a method 4400 of changing software states at a multi-panel electronic device. In a particular embodiment, the method 4400 may be performed at the electronic device 101 of FIGS. 1-7, the electronic device 800 of FIG. 8, the electronic device 900 of FIGS. 9-14, the electronic device 1501 of FIGS. 15-17, the electronic device 1801 of FIGS. 18-20, the electronic device 2100 of FIG. 21, the electronic device 2201 of FIGS. 22-23, the electronic device 2401 of FIGS. 24 and 25, the electronic device 2701 of FIGS. 27-31, the electronic device 3201 of FIGS. 32-37, the electronic device 3801 of FIGS. 38-41, or any combination thereof.

At 4402, a hardware configuration change from a first configuration to a second configuration is detected at an electronic device. The electronic device includes at least a first panel having a first display surface and a second panel having a second display surface. The hardware configuration change includes a change in a relative orientation of the first display panel to the second display panel. Advancing to 4404, a graphical user interface displayed at the first display surface and the second display surface is automatically modified at least partially based on the second configuration.

In a particular embodiment, the first panel is rotatably coupled to the second panel along a first hinged edge of the second panel, a third panel is rotatably coupled to the second panel along a second hinged edge of the second panel, and the third panel has a third display surface.

In a particular embodiment, the first panel has a first back surface opposite the first display surface, the second panel has a second back surface opposite the second display surface, and the third panel has a third back surface opposite the third display surface. The second configuration may include a folded configuration having the first back surface proximate to the second back surface and the second display surface proximate to the third display surface. The graphical user interface may be automatically modified to display at the first display surface and not to display at the second display surface or the third display surface. For example, the second configuration may be the fully folded configuration 200 of FIG. 2.

In another embodiment, the second configuration includes a fully extended configuration having the first panel substantially coplanar with the second panel and having the second panel substantially coplanar with the third panel. The first display surface, the second display surface, and the third display surface may form a substantially continuous display surface extending across the first panel, the second panel, and the third panel. The graphical user interface may be automatically modified to expand a displayed graphical element across the substantially continuous display surface. For example, the second configuration may be the fully extended configurations 500 of FIG. 5 or 6, respectively.

In another embodiment, the second configuration includes the first panel substantially coplanar with the second panel to form a substantially continuous two-panel display surface. The second configuration may also include the third panel positioned such that an angle formed by the second display surface and the third display surface is greater than ninety degrees and less than one hundred eighty degrees. The angle is approximately one hundred thirty five degrees. The graphical user interface may be automatically modified to display a keyboard at the third display surface and to display other interface elements at the substantially continuous two-panel display surface. For example, the second configuration may be the thumbing configuration 300 of FIG. 3.

In another embodiment, the second configuration includes the first panel and the second panel positioned such that a first angle formed by the first display surface and the second display surface is approximately two hundred seventy degrees, and a second angle formed by the second display surface and the third display surface is approximately one hundred thirty five degrees. The graphical user interface may be automatically modified to display a clock at the second display panel. For example, the second configuration may be the travel clock configuration 400 of FIG. 4.

In another embodiment, the second configuration is a video conferencing configuration, where the first panel and the second panel are substantially coplanar, the third panel is folded onto the second panel such that the second display surface is proximate to the third display surface, and a camera housed within a back surface of the third panel has a field of view to capture an image of a user of the device. The graphical user interface may be automatically modified to display video images at the first display surface and not at the second display surface or the third display surface. For example the second configuration may be the video conferencing configuration 700 of FIG. 7.

Figure 45:
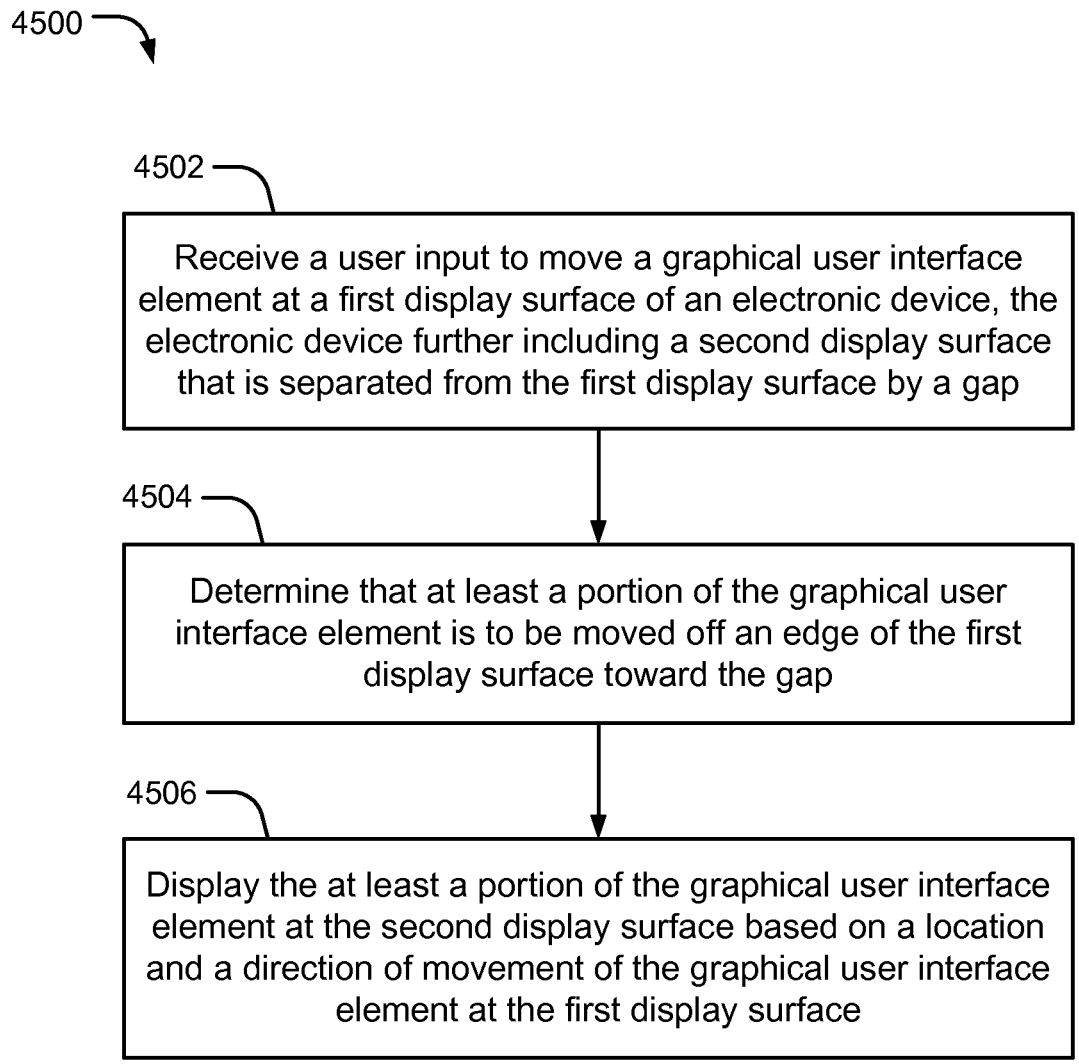
FIG. 45 is a flowchart of a fifth illustrative embodiment of a method of changing software states at a multi-panel electronic device.

FIG. 45 is a flowchart of a fifth illustrative embodiment of a method 4500 of changing software states at a multi-panel electronic device. In a particular embodiment, the method 4500 may be performed at the electronic device 101 of FIGS. 1-7, the electronic device 800 of FIG. 8, the electronic device 900 of FIGS. 9-14, the electronic device 1501 of FIGS. 15-17, the electronic device 1801 of FIGS. 18-20, the electronic device 2100 of FIG. 21, the electronic device 2201 of FIGS. 22-23, the electronic device 2401 of FIGS. 24 and 25, the electronic device 2701 of FIGS. 27-31, the electronic device 3201 of FIGS. 32-37, the electronic device 3801 of FIGS. 38-41, or any combination thereof.

At 4502, a user input is received to move a graphical user interface element at a first display surface of an electronic device. The electronic device further includes a second display surface that is separated from the first display surface by a gap. Moving to 4504, a determination is made that at least a portion of the graphical user interface element is to be moved off an edge of the first display surface toward the gap. Continuing to 4506, the at least a portion of the graphical user interface element is displayed at the second display surface based on a location and a direction of movement of the graphical user interface element at the first display surface.

For example, the graphical user interface element may be an application icon such as the icon 3206 displayed in FIG. 34 as having a first portion displayed at the leftmost display surface and having a second portion displayed at the center display surface during the movement 3412 across the gap 3414. As another example, the graphical user interface element may be an application window such as the window 3516 displayed in FIG. 36 as having a first portion displayed at the left-most display surface and having a second portion displayed at the center display surface during the movement 3618 across the gap 3414.

Figure 46:
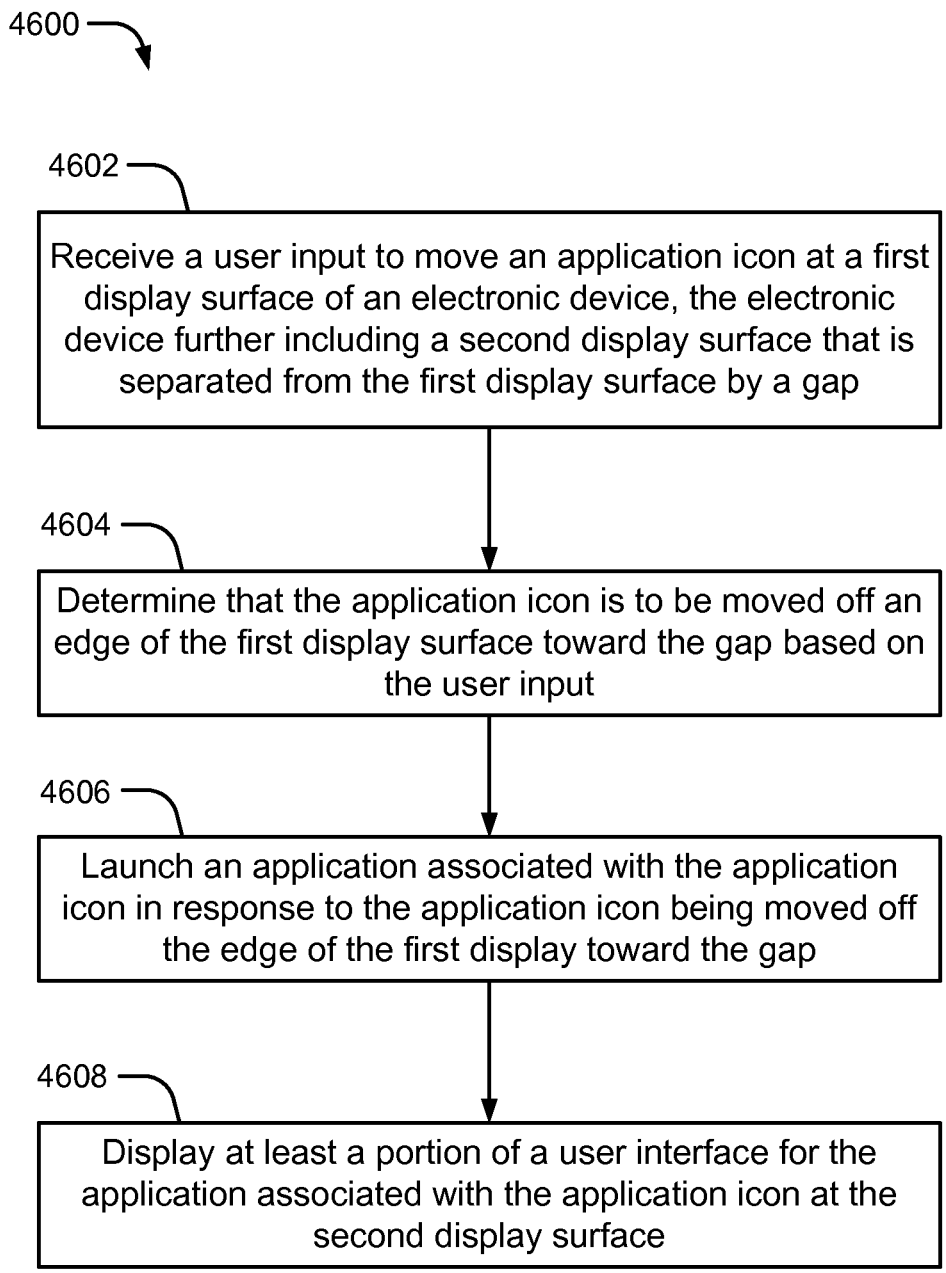
FIG. 46 is a flowchart of a sixth illustrative embodiment of a method of changing software states at a multi-panel electronic device.

FIG. 46 is a flowchart of a sixth illustrative embodiment of a method 4600 of changing software states at a multi-panel electronic device. In a particular embodiment, the method 4600 may be performed at the electronic device 101 of FIGS. 1-7, the electronic device 800 of FIG. 8, the electronic device 900 of FIGS. 9-14, the electronic device 1501 of FIGS. 15-17, the electronic device 1801 of FIGS. 18-20, the electronic device 2100 of FIG. 21, the electronic device 2201 of FIGS. 22-23, the electronic device 2401 of FIGS. 24 and 25, the electronic device 2701 of FIGS. 27-31, the electronic device 3201 of FIGS. 32-37, the electronic device 3801 of FIGS. 38-41, or any combination thereof.

At 4602, a user input is received to move an application icon at a first display surface of an electronic device. The electronic device further includes a second display surface that is separated from the first display surface by a gap. For example, the user input may include a drag operation of the application icon at a touch screen at the first display surface. In an illustrative embodiment, the application icon is the icon 3206 of FIGS. 32-35.

Advancing to 4604, a determination is made that the application icon is to be moved off an edge of the first display surface toward the gap based on the user input. For example, the icon 3206 may be moved toward the gap 3414 as illustrated in FIG. 34. Continuing to 4606, an application associated with the application icon is launched in response to the application icon being moved off the edge of the first display toward the gap. Proceeding to 4608, at least a portion of a user interface for the application associated with the application icon is displayed at the second display surface, such as the application window 3516 at the second display surface 3308 depicted in FIG. 35.

Figure 47:
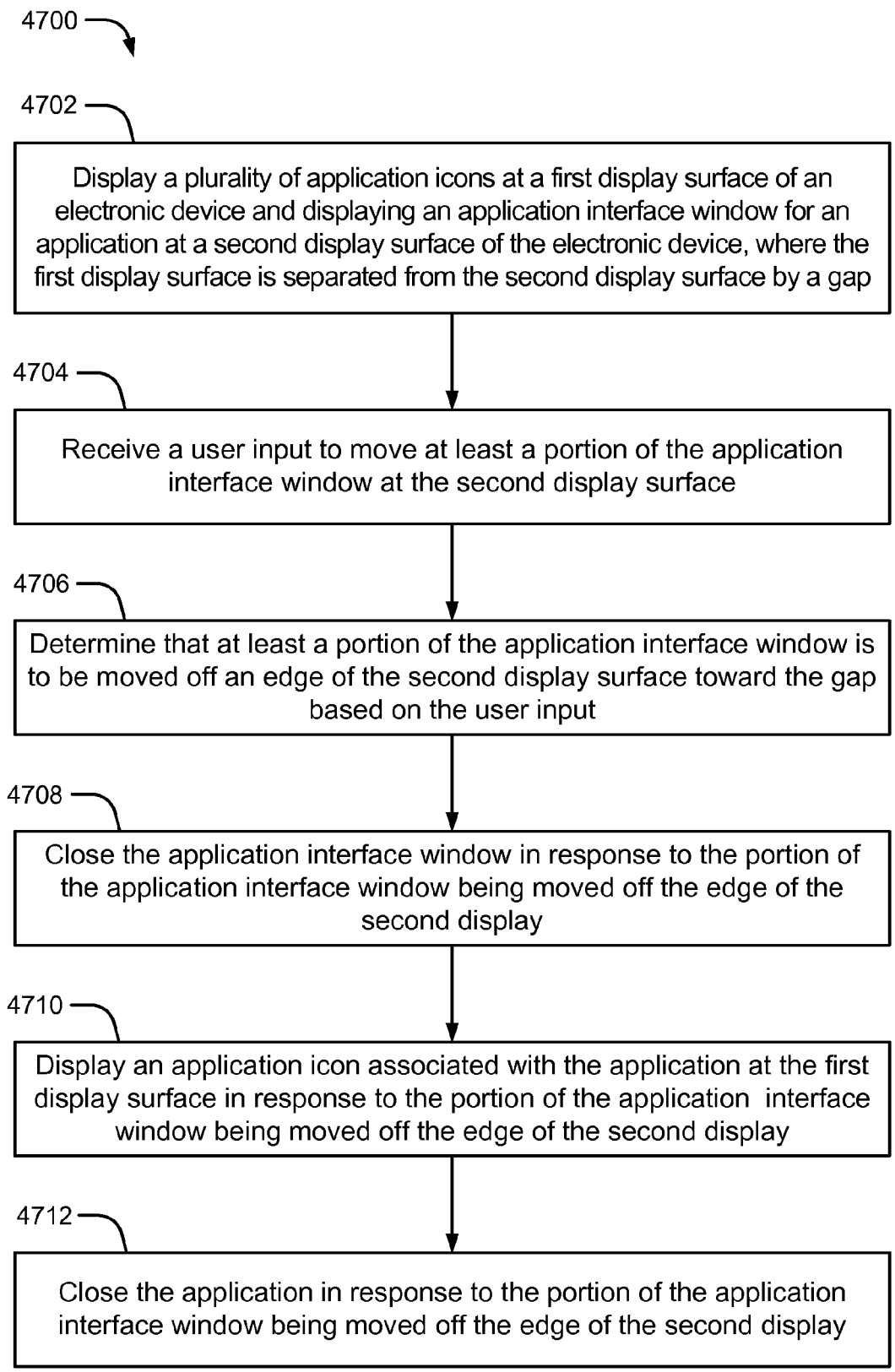
FIG. 47 is a flowchart of a seventh illustrative embodiment of a method of changing software states at a multi-panel electronic device.

FIG. 47 is a flowchart of a seventh illustrative embodiment of a method 4700 of changing software states at a multi-panel electronic device. In a particular embodiment, the method 4700 may be performed at the electronic device 101 of FIGS. 1-7, the electronic device 800 of FIG. 8, the electronic device 900 of FIGS. 9-14, the electronic device 1501 of FIGS. 15-17, the electronic device 1801 of FIGS. 18-20, the electronic device 2100 of FIG. 21, the electronic device 2201 of FIGS. 22-23, the electronic device 2401 of FIGS. 24 and 25, the electronic device 2701 of FIGS. 27-31, the electronic device 3201 of FIGS. 32-37, the electronic device 3801 of FIGS. 38-41, or any combination thereof.

At 4702, a plurality of application icons are displayed at a first display surface of an electronic device and an application interface window for an application is displayed at a second display surface of the electronic device. The first display surface is separated from the second display surface by a gap. In an illustrative embodiment, the application interface window may be the application window 3516 at the second display surface 3308 separated from the application icons by the gap 3414, as depicted in FIG. 35.

Moving to 4704, a user input is received to move at least a portion of the application interface window at the second display surface. For example, the user input may include a drag operation of the application icon at a touch screen at the second display surface. Continuing to 4706, a determination is made that at least a portion of the application interface window is to be moved off an edge of the second display surface toward the gap based on the user input. Advancing to 4708, the application interface window is closed in response to the portion of the application interface window being moved off the edge of the second display, such as is illustrated as the application window 3516 is moved across the gap 3414 in FIGS. 36-37.

Proceeding to 4710, in a particular embodiment, an application icon associated with the application is displayed at the first display surface in response to the portion of the application interface window being moved off the edge of the second display. For example, the application icon 3206 is displayed in FIG. 37 after a portion of the application window 3516 is moved across the gap 3414. Continuing to 4712, in a particular embodiment, the application is closed in response to the portion of the application interface window being moved off the edge of the second display.

Figure 48:
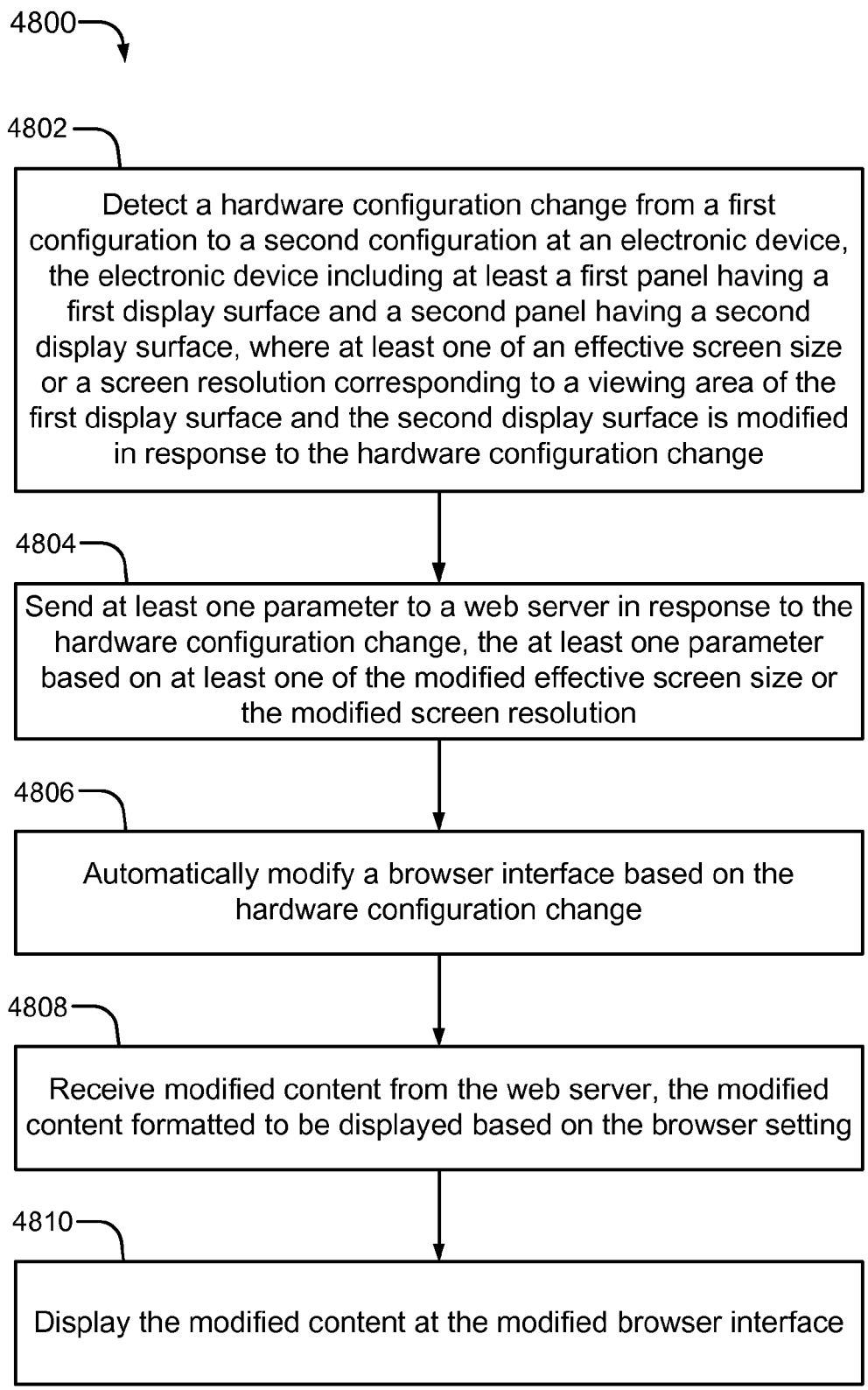
FIG. 48 is a flowchart of an eighth illustrative embodiment of a method of changing software states at a multi-panel electronic device.

FIG. 48 is a flowchart of an eighth illustrative embodiment of a method 4800 of changing software states at a multi-panel electronic device. Depending on screen size and resolution, a web browser at a multi-panel electronic device may automatically change the way the web browser presents itself to a web server. When the screen size and/or screen resolution changes, such as by folding or unfolding panels of the electronic device, the current web site may be automatically refreshed with a web site served for the new browser identification parameters. The user changes the parameters of the device by changing a folding configuration, and the device may automatically transmit information that enables the web sites to automatically serve web content that may be appropriate to the new parameters of the device.

In a particular embodiment, the method 4800 may be performed at the electronic device 101 of FIGS. 1-7, the electronic device 800 of FIG. 8, the electronic device 900 of FIGS. 9-14, the electronic device 1501 of FIGS. 15-17, the electronic device 1801 of FIGS. 18-20, the electronic device 2100 of FIG. 21, the electronic device 2201 of FIGS. 22-23, the electronic device 2401 of FIGS. 24 and 25, the electronic device 2701 of FIGS. 27-31, the electronic device 3201 of FIGS. 32-37, the electronic device 3801 of FIGS. 38-41, or any combination thereof.

At 4802, a hardware configuration change from a first configuration to a second configuration is detected at an electronic device. The electronic device includes at least a first panel having a first display surface and a second panel having a second display surface. At least one of an effective screen size or a screen resolution corresponding to a viewing area of the first display surface and the second display surface is modified in response to the hardware configuration change. For example, the first panel may be coupled to the second panel via a hinge, and the hardware configuration change may include a change of a relative orientation of the first panel with respect to the second panel.

Moving to 4804, at least one parameter is sent to a web server in response to the hardware configuration change, the at least one parameter based on at least one of the modified effective screen size or the modified screen resolution.

In a particular embodiment, the at least one parameter indicates a browser setting. Advancing to 4806, a browser interface may be automatically modified based on the hardware configuration change. Continuing to 4808, modified content may be received from the web server, the modified content formatted to be displayed based on the browser setting. Proceeding to 4810, the modified content may be displayed at the modified browser interface.

The electronic device may be configured to send the at least one parameter, to automatically modify the browser interface, and to display the modified content in response to detecting the hardware configuration change without receiving additional user input. To illustrate, when the electronic device 101 of FIG. 1 is folded into the fully folded configuration 200 of FIG. 2 while a browser application is executing, the device 101 may automatically configure the browser to display at the first surface 102 and may transmit a request for a mobile device webpage with reduced page content to a web server providing content that is displayed at the browser, such as by identifying the web browser as a mobile browser type. When the device 101 is changed to the fully extended configuration 500 of FIG. 5 or 600 of FIG. 6, the device 101 may automatically configure the browser to display across all three display surfaces 102-106 and may transmit to the web server providing a request for a desktop-type webpage with more content, such as by identifying the web browser as a desktop or laptop browser type.

Figure 49:
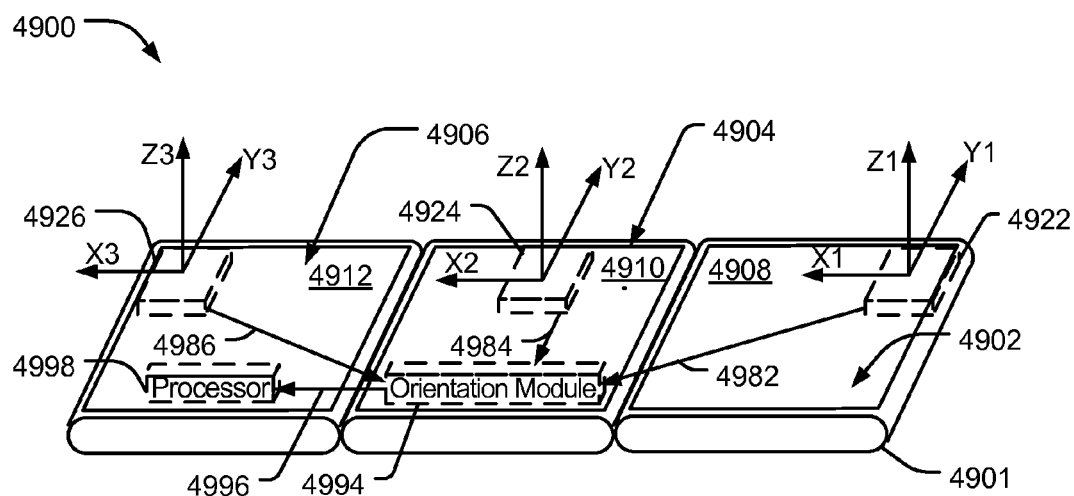
FIG. 49 is a diagram of a twelfth illustrative embodiment of an electronic device.

Referring to FIG. 49, a particular illustrative embodiment of an electronic device 4901 having accelerometers is depicted and generally designated 4900. In a particular embodiment, the electronic device 4901 is the electronic device 101 of FIGS. 1-7, the electronic device 800 of FIG. 8, a three-panel version of the electronic device 900 of FIGS. 9-14, the electronic device 1501 of FIGS. 15-17, the electronic device 1801 of FIGS. 18-20, the electronic device 2100 of FIG. 21, the electronic device 2201 of FIGS. 22-23, the electronic device 2401 of FIGS. 24 and 25, the electronic device 2701 of FIGS. 27-31, the electronic device 3201 of FIGS. 32-37, the electronic device 3801 of FIGS. 38-41, or any combination thereof. In a particular embodiment, the electronic device 4901 is configured to operate according to the method 2600 of FIG. 26, the method 4200 of FIG. 42, the method 4300 of FIG. 43, the method 4400 of FIG. 44, the method 4500 of FIG. 45, the method 4600 of FIG. 46, the method 4700 of FIG. 47, the method 4800 of FIG. 48, or any combination thereof.

The electronic device 4901 includes a first panel 4902 having a first display surface 4908, a second panel 4904 having a second display surface 4910, and a third panel 4906 having a third display surface 4912. The three display surfaces 4908-4912 may be controlled to emulate a single display screen that extends across all three display surfaces 4908-4912. The first panel 4902 is rotatably coupled to a first edge of the second panel 4904 and the third panel 4906 is rotatably coupled to a second edge of the second panel 4904. A first accelerometer 4922 is located at the first panel 4902, a second accelerometer 4924 is located at the second panel 4904, and a third accelerometer 4926 is located at the third panel 4906. An orientation module 4994 is coupled to receive first acceleration data 4982 from the first accelerometer 4922. The orientation module 4994 is coupled to receive second acceleration data 4984 from the second accelerometer 4924. The orientation module 4994 is coupled to receive third acceleration data 4986 from the third accelerometer 4926. A controller, such as a processor 4998, is coupled to the orientation module 4994 as shown by the arrow 4996. Mutually orthogonal axes X1, Y1, and Z1 are associated with the first accelerometer 4922. Mutually orthogonal axes X2, Y2, and Z2 are associated with the second accelerometer 4924. Mutually orthogonal axes X3, Y3, and Z3 are associated with the third accelerometer 4926.

The first accelerometer 4922 is coupled to the first panel 4902 and may be configured to generate the first acceleration data 4982 related to an acceleration of the first panel 4902. The second accelerometer 4924 is coupled to the second panel 4904 and may be configured to generate the second acceleration data 4984 related to an acceleration of the second panel 4904. The third accelerometer 4926 is coupled to the third panel 4906 and may be configured to generate the third acceleration data 4986 related to an acceleration of the third panel 4906. The orientation module 4994 may be configured to determine a configuration of the electronic device 4901 at least partially based on the first acceleration data 4982 received from the first accelerometer 4922, the second acceleration data 4984 received from the second accelerometer 4924, and the third acceleration data 4986 received from the third accelerometer 4926.

In a particular embodiment, the orientation module 4994 is configured to determine the configuration of the electronic device 4901 based on a first orientation of the first display surface 4908 relative to a direction of gravity, a second orientation of the second display surface 4910 relative to the direction of gravity, and a third orientation of the third display surface 4912 relative to the direction of gravity. In a particular embodiment, the processor 4998 is configured to automatically adjust a graphical user interface (GUI) provided to at least one of the first display surface 4908, the second display surface 4910, and the third display surface 4912, based on a detected change of the configuration of the electronic device 4901.

Figure 50:
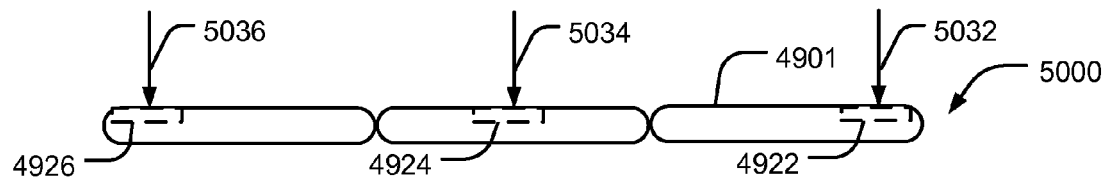
FIG. 50 is a diagram of an illustrative embodiment of the electronic device of FIG. 49 in a fully extended configuration.

Referring to FIG. 50, the electronic device 4901 of FIG. 49 in a fully extended configuration is depicted and generally designated 5000. In the fully extended configuration 5000, the acceleration sensed by the first accelerometer 4922 is shown by the arrow 5032, the acceleration sensed by the second accelerometer 4924 is shown by the arrow 5034, and the acceleration sensed by the third accelerometer 4926 is shown by the arrow 5036. The accelerations 5032-5036 are due to gravity and are all in the direction of gravity, in the negative Z1 direction according to the first accelerometer 4922, in the negative Z2 direction according to the second accelerometer 4924, and in the negative Z3 direction according to the third accelerometer 4926. The accelerations 5032-5036 are also of substantially the same magnitude, as represented by the respective lengths of the arrows 5032-5036.

Figure 51:
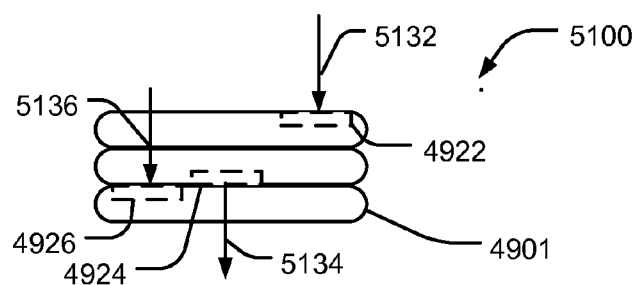
FIG. 51 is a diagram of an illustrative embodiment of the electronic device of FIG. 49 in a folded configuration.

Referring to FIG. 51, the electronic device 4901 of FIG. 49 in a fully folded configuration is depicted and generally designated 5100. In the fully folded configuration 5100, the acceleration sensed by the first accelerometer 4922 is shown by the arrow 5132, the acceleration sensed by the second accelerometer 4924 is shown by the arrow 5134, and the acceleration sensed by the third accelerometer 4926 is shown by the arrow 5136. The accelerations 5132-5136 are due to gravity and are all in the direction of gravity, in the negative Z1 direction according to the first accelerometer 4922, in the positive Z2 direction according to the second accelerometer 4924, and in the negative Z3 direction according to the third accelerometer 4926. The direction of the acceleration 5134 sensed by the second accelerometer 4924 is opposite to the direction of the acceleration 5132 sensed by the first accelerometer 4922 and is opposite to the direction of the acceleration 5136 sensed by the third accelerometer 4926. In the fully folded configuration 5100, the second accelerometer 4924 is "upside down" with respect to the first accelerometer 4922 and with respect to the third accelerometer 4926. The accelerations 5132-5136 are all of substantially the same magnitude, as represented by the respective lengths of the arrows 5132-5136.

Figure 52:
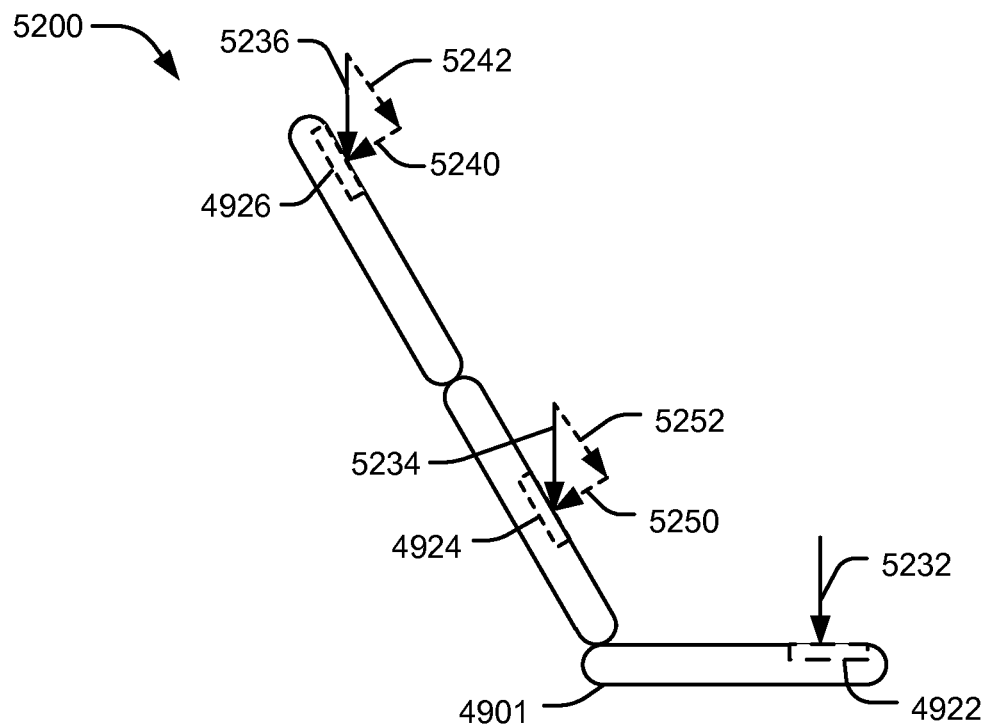
FIG. 52 is a diagram of an illustrative embodiment of the electronic device of FIG. 49 in a thumbing configuration.

Referring to FIG. 52, the electronic device 4901 of FIG. 49 in a thumbing configuration is depicted and generally designated 5200. In the thumbing configuration 5200, the acceleration sensed by the first accelerometer 4922 is shown by the arrow 5232, the acceleration sensed by the second accelerometer 4924 is shown by the arrow 5234, and the acceleration sensed by the third accelerometer 4926 is shown by the arrow 5236. The accelerations 5232-5236 are due to gravity and are all in the direction of gravity, in the negative Z1 direction according to the first accelerometer 4922, with a gravitational component 5250 in the negative Z2 direction and a gravitational component 5252 in the negative X2 direction according to the second accelerometer 4924, and with a gravitational component 5240 in the negative Z3 direction and a gravitational component 5242 in the negative X3 direction according to the third accelerometer 4926. The accelerations 5232-5236 are all of substantially the same magnitude, as represented by the respective lengths of the arrows 5232-5236.

The magnitude of the gravitational component 5240 is equal to the product of the sine of the angle between the acceleration 5236 and the gravitational component 5242 with the magnitude of the acceleration 5236. For example, if the angle is thirty degrees, then the magnitude of the gravitational component 5240 is one half the magnitude of the acceleration 5236 and is also one half the magnitude of the acceleration 5232 because the magnitude of the acceleration 5232 is the same as the magnitude of the acceleration 5236. Similarly, the magnitude of the gravitational component 5250 is equal to the product of the sine of the angle between the acceleration 5234 and the gravitational component 5252 with the magnitude of the acceleration 5234. For example, if the angle is thirty degrees, then the magnitude of the gravitational component 5250 is one half the magnitude of the acceleration 5234 and is also one half the magnitude of the acceleration 5232 because the magnitude of the acceleration 5234 is the same as the magnitude of the acceleration 5232.

Figure 53:
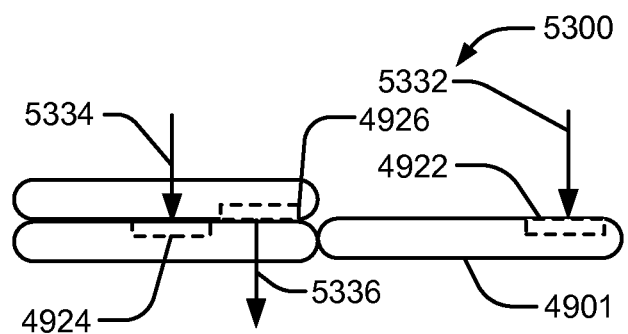
FIG. 53 is a diagram of an illustrative embodiment of the electronic device of FIG. 49 in a video conferencing configuration.

Referring to FIG. 53, the electronic device 4901 of FIG. 49 in a video conferencing configuration is depicted and generally designated 5300. In the video conferencing configuration 5300, the acceleration sensed by the first accelerometer 4922 is shown by the arrow 5332, the acceleration sensed by the second accelerometer 4924 is shown by the arrow 5334, and the acceleration sensed by the third accelerometer 4926 is shown by the arrow 5336. The accelerations 5332-5336 are due to gravity and are all in the direction of gravity, in the negative Z1 direction according to the first accelerometer 4922, in the negative Z2 direction according to the second accelerometer 4924, and in the positive Z3 direction according to the third accelerometer 4926. The direction of the acceleration 5336 sensed by the third accelerometer 4926 is opposite to the direction of the acceleration 5332 sensed by the first accelerometer 4922 and is opposite to the direction of the acceleration 5334 sensed by the second accelerometer 4924. In the video conferencing configuration 5300, the third accelerometer 4926 is "upside down" with respect to the first accelerometer 4922 and with respect to the second accelerometer 4924. The accelerations 5332-5336 are all of substantially the same magnitude, as represented by the respective lengths of the arrows 5332-5336.

Figure 54:
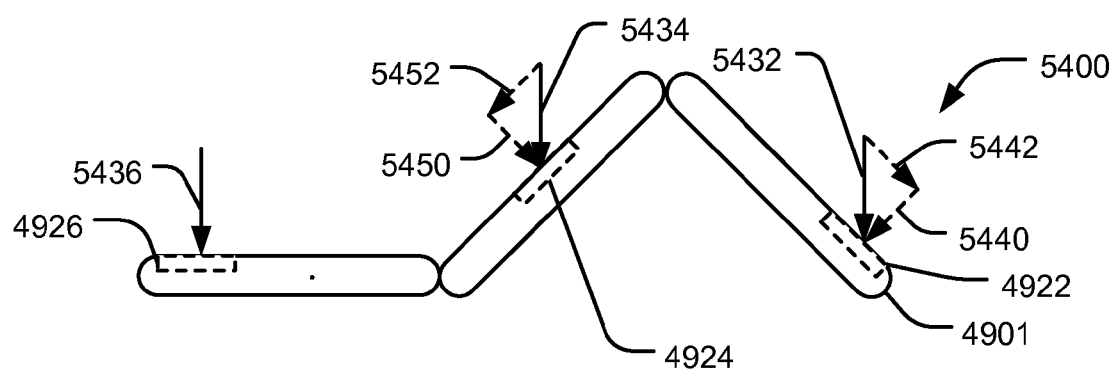
FIG. 54 is a diagram of an illustrative embodiment of the electronic device of FIG. 49 in a travel clock configuration.

Referring to FIG. 54, the electronic device 4901 of FIG. 49 in a travel clock configuration is depicted and generally designated 5400. In the travel clock configuration 5400, the acceleration sensed by the first accelerometer 4922 is shown by the arrow 5432, the acceleration sensed by the second accelerometer 4924 is shown by the arrow 5434, and the acceleration sensed by the third accelerometer 4926 is shown by the arrow 5436. The accelerations 5432-5436 are due to gravity and are all in the direction of gravity, with a gravitational component 5440 in the negative Z1 direction and a gravitational component 5442 in the negative X1 direction according to the first accelerometer 4922, with a gravitational component 5450 in the negative Z2 direction and a gravitational component 5452 in the positive X2 direction according to the second accelerometer 4924, and in the negative Z3 direction according to the third accelerometer 4926. The accelerations 5432-5436 are all of substantially the same magnitude, as represented by the respective lengths of the arrows 5432-5436.

The magnitude of the gravitational component 5440 is equal to the product of the sine of the angle between the acceleration 5432 and the gravitational component 5442 with the magnitude of the acceleration 5432. For example, if the angle is thirty degrees, then the magnitude of the gravitational component 5440 is one half the magnitude of the acceleration 5432 and is also one half the magnitude of the acceleration 5436 because the magnitude of the acceleration 5432 is the same as the magnitude of the acceleration 5436. Similarly, the magnitude of the gravitational component 5450 is equal to the product of the sine of the angle between the acceleration 5434 and the gravitational component 5452 with the magnitude of the acceleration 5434. For example, if the angle is thirty degrees, then the magnitude of the gravitational component 5450 is one half the magnitude of the acceleration 5434 and is also one half the magnitude of the acceleration 5436 because the magnitude of the acceleration 5434 is the same as the magnitude of the acceleration 5436.

Figure 55:
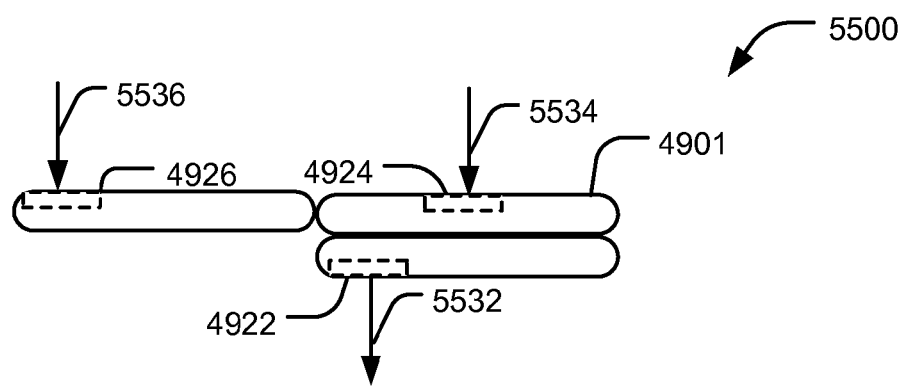
FIG. 55 is a diagram of an illustrative embodiment of the electronic device of FIG. 49 in a dual-panel configuration.

Referring to FIG. 55, the electronic device 4901 of FIG. 49 in a dual-panel configuration is depicted and generally designated 5500. In the dual-panel configuration 5500, the acceleration sensed by the first accelerometer 4922 is shown by the arrow 5532, the acceleration sensed by the second accelerometer 4924 is shown by the arrow 5534, and the acceleration sensed by the third accelerometer 4926 is shown by the arrow 5536. The accelerations 5532-5536 are due to gravity and are all in the direction of gravity, in the positive Z1 direction according to the first accelerometer 4922, in the negative Z2 direction according to the second accelerometer 4924, and in the negative Z3 direction according to the third accelerometer 4926. The direction of the acceleration 5532 sensed by the first accelerometer 4922 is opposite to the direction of the acceleration 5534 sensed by the second accelerometer 4924 and is opposite to the direction of the acceleration 5536 sensed by the third accelerometer 4926. In the dual-panel configuration 5500, the first accelerometer 4922 is "upside down" with respect to the second accelerometer 4924 and with respect to the third accelerometer 4926. The accelerations 5532-5536 are all of substantially the same magnitude, as represented by the respective lengths of the arrows 5532-5536.

In a particular embodiment, the dual-panel configuration illustrated in FIG. 55 may function as a "book mode," and the panels that include the second accelerometer 4924 and the third accelerometer 4926 may simulate the two sides of a book. In such a book mode configuration, the panel that includes the first accelerometer 4922 may be folded back away from the user during normal operation and turned off to conserve energy (e.g., energy supplied by the batteries 884 and 886 of FIG. 8). It should be noted that although the particular configuration illustrated in FIG. 55 depicts the book mode panels as substantially coplanar, the panels may instead be slightly bent towards each other, further simulating the viewing of text and images in a book.

Furthermore, one or more of the electronic device 101 of FIGS. 1-7, the electronic device 800 of FIG. 8, a three-panel version of the electronic device 900 of FIGS. 9-14, the electronic device 1501 of FIGS. 15-17, the electronic device 1801 of FIGS. 18-20, the electronic device 2100 of FIG. 21, the electronic device 2201 of FIGS. 22-23, the electronic device 2401 of FIGS. 24 and 25, the electronic device 2701 of FIGS. 27-31, the electronic device 3201 of FIGS. 32-37, and the electronic device 3801 of FIGS. 38-41, may also be configured to operate in a book mode configuration in addition to one or more predetermined configurations previously described.

Figure 56:
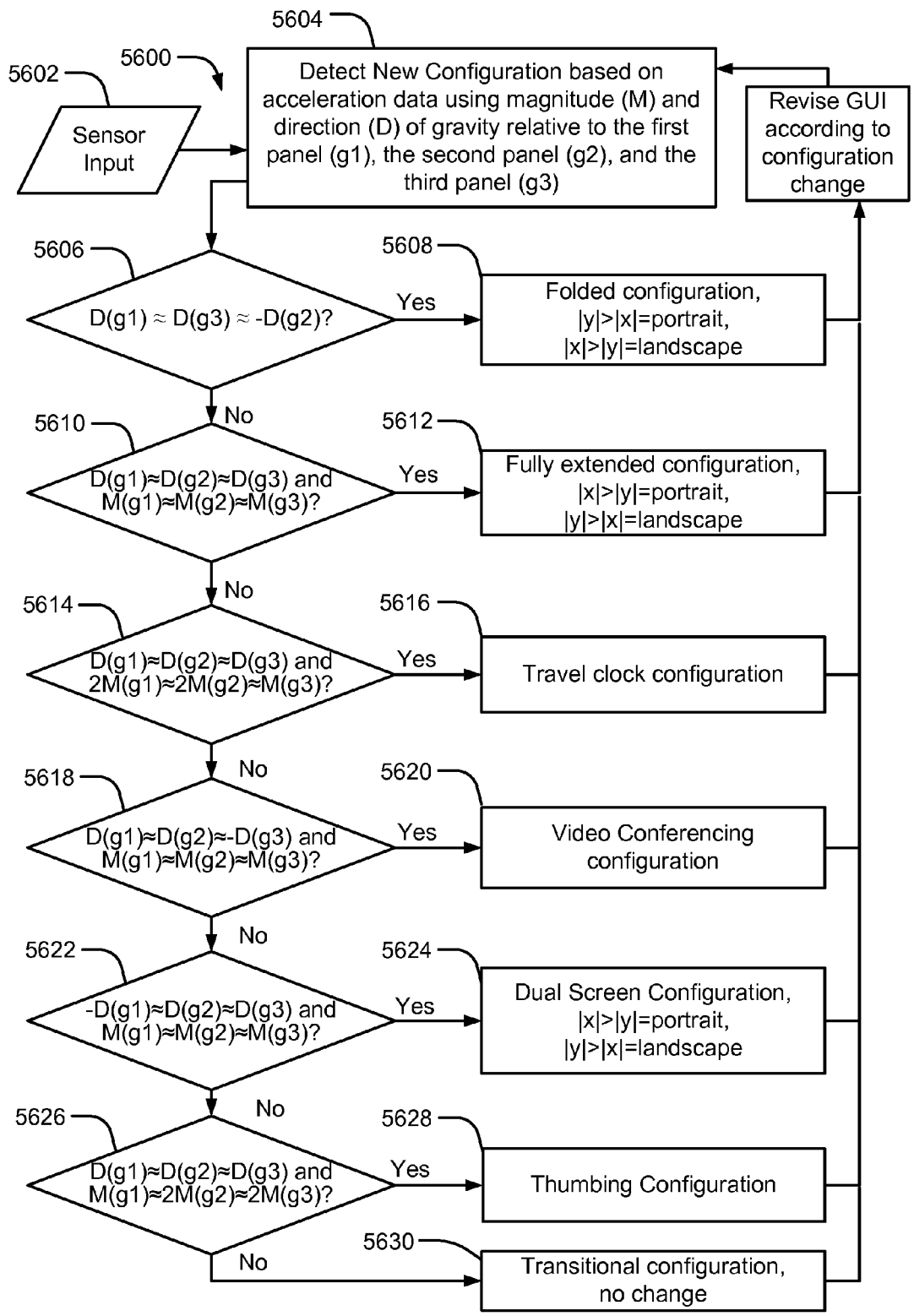
FIG. 56 is a flowchart of a first illustrative embodiment of a method of determining a configuration of an electronic device.

FIG. 56 is a flowchart of a first illustrative embodiment of a method 5600 of determining a configuration of an electronic device. In a particular embodiment, the method 5600 may be performed at the electronic device 101 of FIGS. 1-7, the electronic device 800 of FIG. 8, the electronic device 900 of FIGS. 9-14, the electronic device 1501 of FIGS. 15-17, the electronic device 1801 of FIGS. 18-20, the electronic device 2100 of FIG. 21, the electronic device 2201 of FIGS. 22-23, the electronic device 2401 of FIGS. 24 and 25, the electronic device 2701 of FIGS. 27-31, the electronic device 3201 of FIGS. 32-37, the electronic device 3801 of FIGS. 38-41, the electronic device 4901 of FIGS. 49-55, or any combination thereof.

A sensor input 5602 is received and used to detect a new hardware configuration at 5604. The new hardware configuration is detected based on acceleration data using the magnitude (M) and direction (D) of gravity relative to the first panel (g1), the second panel (g2), and the third panel (g3). For example, the sensor input 4202 may indicate a relative orientation, or a change in orientation, of one or more panels of a multi-panel device, such as via one or more accelerometers.

Moving to decision 5606, a determination is made whether the direction of gravity relative to the first panel D(g1) is substantially the same as the direction of gravity relative to the third panel D(g3) and is substantially opposite to the direction of gravity relative to the second panel D(g2), at 5606. Where it is determined that D(g1) is substantially the same as D(g3) and is substantially opposite to D(g2), the device is determined to be in the fully folded configuration, at 5608. For example, the device may be in the fully folded configuration 5100 of FIG. 51. When the magnitude of the acceleration data in the y-direction (i.e., in the direction Y1 of FIG. 49) is greater than the magnitude of the acceleration data in the x-direction (i.e., in the direction X1 of FIG. 49), the device is determined to be in the portrait configuration. When the magnitude of the acceleration data in the x-direction (i.e., in the direction X1 of FIG. 49) is greater than the magnitude of the acceleration data in the y-direction (i.e., in the direction Y1 of FIG. 49), the device is determined to be in the landscape configuration. If the configuration has changed (e.g., the previously detected configuration was not the fully folded configuration 5100 of FIG. 51), the graphic user interface is revised according to the configuration change and processing may return to detecting a new configuration at 5604.

Where it is determined that D(g1) is not substantially the same as D(g3) and/or is not substantially opposite to D(g2), a determination is made whether D(g1) is substantially the same as D(g2) and is substantially the same as D(g3) and whether the magnitude of the z-component of gravity (i.e., the component of gravity in the direction Z1 of FIG. 49) relative to the first panel M(g1) is substantially the same as the magnitude of the z-component of gravity (i.e., the component of gravity in the direction Z2 of FIG. 49) relative to the second panel M(g2) and is substantially the same as the magnitude of the z-component of gravity (i.e., the component of gravity in the direction Z3 of FIG. 49) relative to the third panel M(g3), at decision 5610. Where it is determined that D(g1) is substantially the same as D(g2) and is substantially the same as D(g3) and that M(g1) is substantially the same as M(g2) and is substantially the same as M(g3), the device is determined to be in the fully extended configuration, at 5612. For example, the device may be in the fully extended configuration 5000 of FIG. 50. When the magnitude of the acceleration data in the x-direction (i.e., in the direction X1 of FIG. 49) is greater than the magnitude of the acceleration data in the y-direction (i.e., in the direction Y1 of FIG. 49), the device is determined to be in the portrait configuration. When the magnitude of the acceleration data in the y-direction (i.e., in the direction Y1 of FIG. 49) is greater than the magnitude of the acceleration data in the x-direction (i.e., in the direction X1 of FIG. 49), the device is determined to be in the landscape configuration. If the configuration has changed (e.g., the previously detected configuration was not the fully extended configuration 5000 of FIG. 50), the graphic user interface is revised according to the configuration change and processing may return to detecting a new configuration at 5604.

Where it is determined that D(g1) is not substantially the same as D(g2) and/or is not substantially the same as D(g3) and/or that M(g1) is not substantially the same as M(g2) and/or is not substantially the same as M(g3), a determination is made whether D(g1) is substantially the same as D(g2) and is substantially the same as D(g3) and whether two times M(g1) is substantially the same as two times M(g2) and is substantially the same as M(g3), at decision 5614. Where it is determined that D(g1) is substantially the same as D(g2) and is substantially the same as D(g3) and that two times M(g1) is substantially the same as two times M(g2) and is substantially the same as M(g3), the device is determined to be in the travel clock configuration, at 5616. For example, the device may be in the travel clock configuration 5400 of FIG. 54 where the angle between the first panel and the second panel is sixty degrees. In alternative embodiments, the angle between the first panel and the second panel may be more or less than sixty degrees. If the configuration has changed (e.g., the previously detected configuration was not the travel clock configuration 5400 of FIG. 54), the graphic user interface is revised according to the configuration change and processing may return to detecting a new configuration at 5604.

Where it is determined that D(g1) is not substantially the same as D(g2) and/or is not substantially the same as D(g3) and/or that two times M(g1) is not substantially the same as two times M(g2) and/or is not substantially the same as M(g3), a determination is made whether D(g1) is substantially the same as D(g2) and is substantially opposite to D(g3) and whether M(g1) is substantially the same as M(g2) and is substantially the same as M(g3), at decision 5618. Where it is determined that D(g1) is substantially the same as D(g2) and is substantially opposite to D(g3) and that M(g1) is substantially the same as M(g2) and is substantially the same as M(g3), the device is determined to be in the video conferencing configuration, at 5620. For example, the device may be in the video conferencing configuration 5300 of FIG. 53. If the configuration has changed (e.g., the previously detected configuration was not the video conferencing configuration 5300 of FIG. 53), the graphic user interface is revised according to the configuration change and processing may return to detecting a new configuration at 5604.

Where it is determined that D(g1) is not substantially the same as D(g2) and/or is not substantially opposite to D(g3) and/or that M(g1) is not substantially the same as M(g2) and/or is not substantially the same as M(g3), a determination is made whether D(g1) is substantially opposite to D(g2) and is substantially opposite to D(g3) and whether M(g1) is substantially the same as M(g2) and is substantially the same as M(g3), at decision 5622. Where it is determined that D(g1) is substantially opposite to D(g2) and is substantially opposite to D(g3) and that M(g1) is substantially the same as M(g2) and is substantially the same as M(g3), the device is determined to be in the dual-screen configuration, at 5624. For example, the device may be in the dual-screen configuration 5500 of FIG. 55. When the magnitude of the acceleration data in the x-direction (i.e., in the direction X1 of FIG. 49) is greater than the magnitude of the acceleration data in the y-direction (i.e., in the direction Y1 of FIG. 49), the device is determined to be in the portrait configuration. When the magnitude of the acceleration data in the y-direction (i.e., in the direction Y1 of FIG. 49) is greater than the magnitude of the acceleration data in the x-direction (i.e., in the direction X1 of FIG. 49), the device is determined to be in the landscape configuration. If the configuration has changed (e.g., the previously detected configuration was not the dual-screen configuration 5500 of FIG. 55), the graphic user interface is revised according to the configuration change and processing may return to detecting a new configuration at 5604.

Where it is determined that D(g1) is not substantially opposite to D(g2) and/or is not substantially opposite to D(g3) and/or that M(g1) is not substantially the same as M(g2) and/or is not substantially the same as M(g3), a determination is made whether D(g1) is substantially the same as D(g2) and is substantially the same as D(g3) and whether M(g1) is substantially the same as two times M(g2) and is substantially the same as two times M(g3), at decision 5626. Where it is determined that D(g1) is substantially the same as D(g2) and is substantially the same as D(g3) and that M(g1) is substantially the same as two times M(g2) and is substantially the same as two times M(g3), the device is determined to be in the thumbing configuration, at 5628. For example, the device may be in the thumbing configuration 5200 of FIG. 52 where the angle between the first panel and the second panel is one-hundred-twenty degrees. In alternative embodiments, the angle between the first panel and the second panel may be more or less than one-hundred-twenty degrees. If the configuration has changed (e.g., the previously detected configuration was not the thumbing configuration 5200 of FIG. 52), the graphic user interface is revised according to the configuration change and processing may return to detecting a new configuration at 5604.

Where a determination is made that D(g1) is not substantially the same as D(g2) and/or is not substantially the same as D(g3) and/or that M(g1) is not substantially the same as two times M(g2) and/or is not substantially the same as two times M(g3), a determination may be made, at 5630, that the device is in a transitional configuration, and no change may be performed at the display panels, and processing may return to detecting a new configuration at 5604.

In various illustrative embodiments, an orientation may not be considered to be a changed orientation until the new orientation has been consistent for some period of time, for example, about 200 milliseconds (ms). If the magnitude of the acceleration data in the z-direction (i.e., in the direction Z1 of FIG. 49) is substantially zero, it may be difficult to determine the orientations of the panels from the magnitude of the acceleration in the z-direction. The magnitude of the acceleration data in the x-direction (i.e., in the direction X1 of FIG. 49) may be used instead, if the magnitude of the acceleration data in the x-direction is greater than zero. If the magnitudes of the acceleration data in the x-direction and in the z-direction are both substantially zero, the magnitude of the acceleration data in the y-direction (i.e., in the direction Y1 of FIG. 49) may be used instead.

Figure 57:
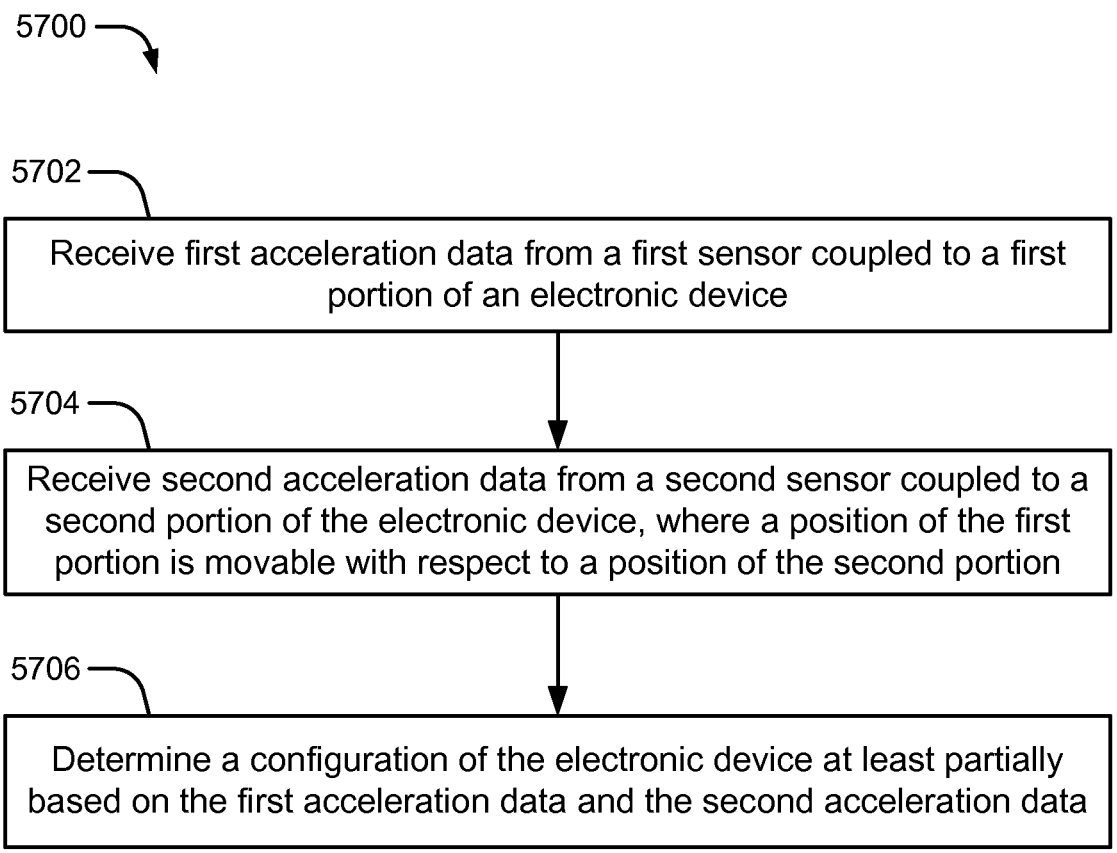
FIG. 57 is a flowchart of a second illustrative embodiment of a method of determining a configuration of an electronic device.

FIG. 57 is a flowchart of a second illustrative embodiment of a method 5700 of determining a configuration of an electronic device. In a particular embodiment, the method 5700 may be performed at the electronic device 101 of FIGS. 1-7, the electronic device 800 of FIG. 8, the electronic device 900 of FIGS. 9-14, the electronic device 1501 of FIGS. 15-17, the electronic device 1801 of FIGS. 18-20, the electronic device 2100 of FIG. 21, the electronic device 2201 of FIGS. 22-23, the electronic device 2401 of FIGS. 24 and 25, the electronic device 2701 of FIGS. 27-31, the electronic device 3201 of FIGS. 32-37, the electronic device 3801 of FIGS. 38-41, the electronic device 4901 of FIGS. 49-55, or any combination thereof.

The method 5700 includes receiving first acceleration data from a first sensor coupled to a first portion of an electronic device, at 5702. For example, the orientation module 4994 may receive the first acceleration data 4982 from the first accelerometer 4922 coupled to the first panel 4902 of the electronic device 4901 of FIG. 49. The method further includes receiving second acceleration data from a second sensor coupled to a second portion of the electronic device, where a position of the first portion is movable with respect to a position of the second portion, at 5704. For example, the orientation module 4994 may receive the second acceleration data 4984 from the second accelerometer 4924 coupled to the second panel 4904 of the electronic device 4901 of FIG. 49, where the position of the first panel 4902 is movable with respect to the position of the second panel 4904.

The method further includes determining a configuration of the electronic device at least partially based on the first acceleration data and the second acceleration data, at 5706. For example, if the first acceleration data 4982 indicates a direction of gravity in the negative Z1 direction at the first accelerometer 4922 and the second acceleration data 4984 indicates a direction of gravity in the positive Z2 direction at the second accelerometer 4924, the orientation module 4994 may determine that the first panel 4902 is fully folded against the second panel 4904 so that the device 4901 of FIG. 49 may be in the fully folded configuration 5100 of FIG. 51. Similarly, if the first acceleration data 4982 indicates a direction of gravity in the negative Z1 direction at the first accelerometer 4922 and the second acceleration data 4984 indicates a direction of gravity in the negative Z2 direction at the second accelerometer 4924, the orientation module 4994 may determine that the first panel 4902 is fully extended with respect to the second panel 4904 so that the device 4901 of FIG. 49 may be in the fully extended configuration 5000 of FIG. 50.

Figure 58:
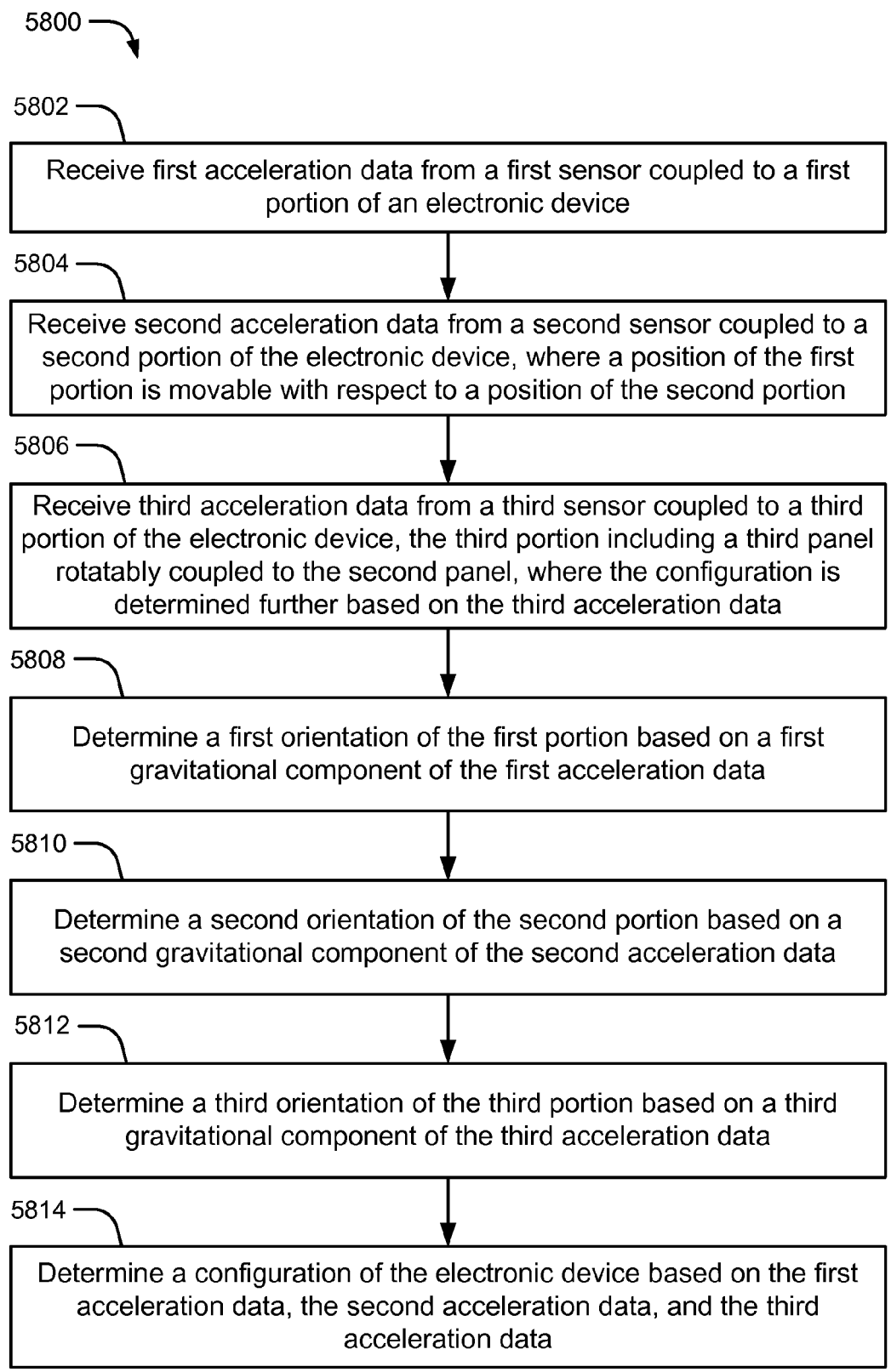
FIG. 58 is a flowchart of a third illustrative embodiment of a method of determining a configuration of an electronic device.

FIG. 58 is a flowchart of a third illustrative embodiment of a method 5800 of determining a configuration of an electronic device. In a particular embodiment, the method 5800 may be performed at the electronic device 101 of FIGS. 1-7, the electronic device 800 of FIG. 8, the electronic device 900 of FIGS. 9-14, the electronic device 1501 of FIGS. 15-17, the electronic device 1801 of FIGS. 18-20, the electronic device 2100 of FIG. 21, the electronic device 2201 of FIGS. 22-23, the electronic device 2401 of FIGS. 24 and 25, the electronic device 2701 of FIGS. 27-31, the electronic device 3201 of FIGS. 32-37, the electronic device 3801 of FIGS. 38-41, the electronic device 4901 of FIGS. 49-55, or any combination thereof.

The method 5800 includes receiving first acceleration data from a first sensor coupled to a first portion of an electronic device, at 5802. For example, the orientation module 4994 may receive the first acceleration data 4982 from the first accelerometer 4922 coupled to the first panel 4902 of the electronic device 4901 of FIG. 49. The method further includes receiving second acceleration data from a second sensor coupled to a second portion of the electronic device, where a position of the first portion is movable with respect to a position of the second portion, at 5804. For example, the orientation module 4994 may receive the second acceleration data 4984 from the second accelerometer 4924 coupled to the second panel 4904 of the electronic device 4901 of FIG. 49, where the position of the first panel 4902 is movable with respect to the position of the second panel 4904. The method further includes receiving third acceleration data from a third sensor coupled to a third portion of the electronic device, the third portion including a third panel rotatably coupled to the second panel, where the configuration is determined further based on the third acceleration data, at 5806. For example, the orientation module 4994 may receive the third acceleration data 4986 from the third accelerometer 4926 coupled to the third panel 4906 of the electronic device 4901 of FIG. 49, where the third panel 4906 is rotatably coupled to the second panel 4904. If the first acceleration data 4982 indicates a direction of gravity in the negative Z1 direction at the first accelerometer 4922, the second acceleration data 4984 indicates a direction of gravity in the positive Z2 direction at the second accelerometer 4924, and the third acceleration data 4986 indicates a direction of gravity in the negative Z3 direction at the third accelerometer 4926, the orientation module 4994 may determine that the device 4901 of FIG. 49 may be in the fully folded configuration 5100 of FIG. 51. Similarly, if the first acceleration data 4982 indicates a direction of gravity in the negative Z1 direction at the first accelerometer 4922, the second acceleration data 4984 indicates a direction of gravity in the negative Z2 direction at the second accelerometer 4924, and the third acceleration data 4986 indicates a direction of gravity in the negative Z3 direction at the third accelerometer 4926, the orientation module 4994 may determine that the device 4901 of FIG. 49 may be in the fully extended configuration 5000 of FIG. 50.

The method further includes determining a first orientation of the first portion based on a first gravitational component of the first acceleration data, at 5808. For example, the first acceleration data 4982 may indicate the acceleration 5432 of FIG. 54 due to gravity in the direction of gravity, with a gravitational component 5440 in the negative Z1 direction and a gravitational component 5442 in the negative X1 direction, according to the first accelerometer 4922. The magnitude of the gravitational component 5440 is equal to the product of the sine of the angle between the acceleration 5432 and the gravitational component 5442 with the magnitude of the acceleration 5432. For example, if the angle is thirty degrees, then the magnitude of the gravitational component 5440 is one half the magnitude of the acceleration 5432. The orientation of the first panel 4902 may be that shown in the travel clock configuration 5400 of FIG. 54.

The method further includes determining a second orientation of the second portion based on a second gravitational component of the second acceleration data, at 5810. For example, the second acceleration data 4984 may indicate the acceleration 5434 of FIG. 54 due to gravity in the direction of gravity, with a gravitational component 5450 in the negative Z2 direction and a gravitational component 5452 in the positive X2 direction, according to the second accelerometer 4924. The magnitude of the gravitational component 5450 is equal to the product of the sine of the angle between the acceleration 5434 and the gravitational component 5452 with the magnitude of the acceleration 5434. For example, if the angle is thirty degrees, then the magnitude of the gravitational component 5450 is one half the magnitude of the acceleration 5434. The orientation of the second panel 4904 may be that shown in the travel clock configuration 5400 of FIG. 54.

The method further includes determining a third orientation of the third portion based on a third gravitational component of the third acceleration data, at 5812. For example, the third acceleration data 4986 may indicate the acceleration 5236 of FIG. 52 due to gravity in the direction of gravity, with a gravitational component 5240 in the negative Z3 direction and a gravitational component 5242 in the negative X3 direction, according to the third accelerometer 4926. The magnitude of the gravitational component 5240 is equal to the product of the sine of the angle between the acceleration 5236 and the gravitational component 5242 with the magnitude of the acceleration 5236. For example, if the angle is thirty degrees, then the magnitude of the gravitational component 5240 is one half the magnitude of the acceleration 5236. The orientation of the third panel 4906 may be that shown in the thumbing configuration 5200 of FIG. 52. The method further includes determining a configuration of the electronic device based on the first acceleration data, the second acceleration data, and the third acceleration data, at 5814. For example, the configuration of the electronic device 4901 of FIG. 49 may be determined according to the method 5600 of FIG. 56 based on the first acceleration data 4982, the second acceleration data 4984, and the third acceleration data 4986.

Figure 59:
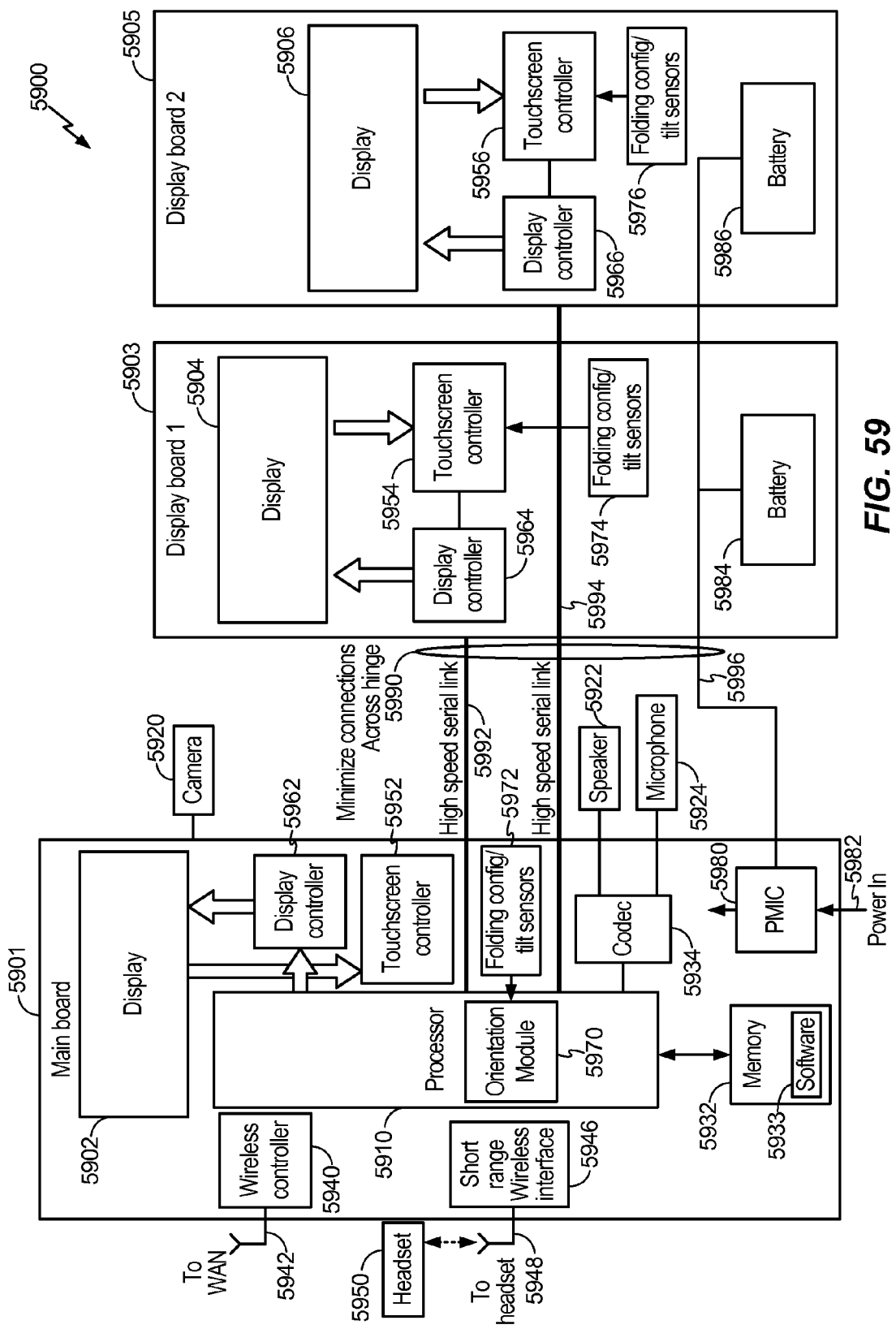
FIG. 59 is a block diagram of a thirteenth illustrative embodiment of an electronic device.

Referring to FIG. 59, a particular illustrative embodiment of an electronic device having folding configuration/tilt sensor, such as accelerometers, is depicted and generally designated 5900. In a particular embodiment, the electronic device 5900 is the electronic device 101 of FIGS. 1-7, the electronic device 800 of FIG. 8, a three-panel version of the electronic device 900 of FIGS. 9-14, the electronic device 1501 of FIGS. 15-17, the electronic device 1801 of FIGS. 18-20, the electronic device 2100 of FIG. 21, the electronic device 2201 of FIGS. 22-23, the electronic device 2401 of FIGS. 24 and 25, the electronic device 2701 of FIGS. 27-31, the electronic device 3201 of FIGS. 32-37, the electronic device 3801 of FIGS. 38-41, the electronic device 4901 of FIGS. 49-55, or any combination thereof. In a particular embodiment, the electronic device 5900 is configured to operate according to the method 2600 of FIG. 26, the method 4200 of FIG. 42, the method 4300 of FIG. 43, the method 4400 of FIG. 44, the method 4500 of FIG. 45, the method 4600 of FIG. 46, the method 4700 of FIG. 47, the method 4800 of FIG. 48, the method 5600 of FIG. 56, the method 5700 of FIG. 57, the method 5800 of FIG. 58, or any combination thereof.

The device 5900 includes a main board 5901 coupled to a first display board 5903 and to second display board 5905 via set of connections 5990 across a hinge (not shown). Each of the boards 5901, 5903, and 5905 may be in separate panels of a multi-panel hinged device, such as the electronic device 101 of FIGS. 1-7.

The main board 5901 includes a display 5902, a processor 5910 coupled to a memory 5932, an orientation module 5970 coupled to one or more folding configuration/tilt sensors 5972, a display controller 5962, a touchscreen controller 5952, a wireless controller 5940, a short range wireless interface 5946, a coder/decoder (CODEC) 5934, and a power management integrated circuit (PMIC) 5980. The first display board 5903 includes a display 5904 coupled to a display controller 5964, a touchscreen controller 5954, and one or more folding configuration/tilt sensors 5974. The second display board 5905 includes a display 5906 coupled to a display controller 5966, a touchscreen controller 5956, and one or more folding configuration/tilt sensors 5976. The first display board 5903 is coupled to the main board 5901 via a first communication path, such as a first high-speed serial link 5992. The second display board 5905 is coupled to the main board 5901 via a second communication path, such as a second high-speed serial link 5994. The first display board 5903 and the second display board 5905 each have a battery 5984 and 5986 that is coupled to the PMIC 5980 via a power line 5996, which may be able to conduct at least 1.5 amps (A) between the PMIC 5980 and the batteries 5984 and 5986. In a particular embodiment, a camera 5920 and a power input 5982 are also coupled to the main board 5901.

The processor 5910 may include one or more processing devices, such as one or more ARM-type processors, one or more digital signal processors (DSPs), other processors, or any combination thereof. The processor 5910 can access one or more computer readable media, such as the representative memory 5932. The memory 5932 stores data (not shown) and processor executable instructions such as software 5933. Generally, the software 5933 includes processor executable instructions that are executable by the processor 5910, and may include application software, operating system software, other types of program instructions, or any combination thereof. Although the memory 5932 is depicted as external to the processor 5910, in other embodiments the memory 5932 may be internal to the processor 5910 such as at a cache, at one or more registers or register files, at other storage devices at the processor 5910, or any combination thereof.

The processor 5910 is also coupled to folding configuration sensors, such as the folding configuration and tilt sensors 5972, 5974, and 5976 at the main board 5901, the first display panel 5903, and the second display panel 5905, respectively. In an illustrative example, the device 5900 may be the electronic device 4901 of FIG. 49, and the sensors 5972, 5974, and 5976 may adapted to detect a folding configuration of the device 5900 as one or more of the fully folded configuration illustrated in FIG. 51, the thumbing configuration illustrated in FIG. 52, the travel clock configuration illustrated in FIG. 54, the fully extended configuration illustrated in FIG. 50, the dual-screen configuration illustrated in FIG. 55, or the video conferencing configuration illustrated in FIG. 53. In a particular embodiment, the sensors 5972, 5974, and 5976 include accelerometers, such as the first accelerometer 4922, the second accelerometer 4924, and the third accelerometer 4986 of FIG. 49. The orientation module 5970 can be the orientation module 4994 of FIG. 49 and can implement the method 5600 of FIG. 56, the method 5700 of FIG. 57, the method 5800 of FIG. 58, or any combination thereof. The orientation module 5970 can be hardware, the software 5933 being executed by the processor 5910, or any combination thereof.

The display controllers 5962, 5964, and 5966 are configured to control the displays 5902, 5904, and 5906. In a particular embodiment, the displays 5902, 5904, and 5906 may correspond to the display surfaces 102, 104, and 106 illustrated in FIGS. 1-7. The display controllers 5962, 5964, and 5966 may be configured to be responsive to the processor 5910 to provide graphical data to display at the displays 5902, 5904, and 5906 according to a configuration of the device 5900. For example, when the device 5900 is in a fully folded configuration, the display controllers 5962, 5964, and 5966 may control the first display 5902 to display a graphical user interface and may power down or not use the other displays 5904 and 5906. As another example, when the device 5900 is in a fully extended configuration, the display controllers 5962, 5964, and 5966 may control the displays 5902, 5904, and 5906 to each display a respective portion of an image to operate as a single effective screen spanning all three displays 5902, 5904, and 5906.

In a particular embodiment, each of the displays 5902, 5904, and 5906 is responsive to user input via a respective touchscreen that is coupled to a touchscreen controller 5952, 5954, or 5956, respectively. The touchscreen controllers 5952, 5954, and 5956 are configured to receive signals from the displays 5902, 5904, and 5906 representing a user input and to provide data to the processor 5910 indicating the user input. For example, the processor 5910 may be responsive to a user input indicating a double-tap at an application icon on the first display 5902 and may launch an application and display an application window at one or more of the displays 5902, 5904, or 5906 in response to the user input.

In a particular embodiment, by having each display controller 5962, 5964, and 5966 and each touchscreen controller 5952, 5954, and 5956 with a corresponding display 5902, 5904, and 5906, an amount of data communicated between the panels may be reduced compared to other embodiments having a controller and a corresponding display on separate panels. However, in other embodiments, two or more of the display controllers 5962, 5964, or 5966, or touchscreen controllers 5953, 5954, or 5956, may be combined, such as into a single controller that controls all three displays 5902, 5904, and 5906. Additionally, although three displays 5902, 5904, and 5906 are illustrated, in other embodiments the device 5900 may include more or less than three displays.

The high-speed serial links 5992 and 5994 may be high speed bi-direction serial links. For example the links 5992 and 5994 may be Mobile Display Digital Interface (MDDI)-type links. Touchscreen data and sensor data may be embedded in the serial stream to return to the processor 5910 from the panels 5903 and 5905, so that only four differential pairs may be used for signaling across the respective hinges between the panels 5901, 5903, and 5905.

In a particular embodiment, the sensors 5972, 5974, and 5976 may be adapted detect a folding configuration of the device 5900 based on input received at one or more sensors. For example, one or more of the sensors 5972, 5974, and 5976 may include or receive input from one or more accelerometers, inclinometers, hinge detectors, other detectors, or any combination thereof. The sensors 5972, 5974, and 5976 may provide information to the orientation module 5970 and to the processor 5910 indicating a detected folding configuration of the device 5900. The sensors 5972, 5974, and 5976 may be responsive to a relative folding position, such as by detecting an angle of rotation of a display panel relative to a neighboring display panel of the device 5900. The sensors 5972, 5974, and 5976 may also be responsive to one or more other sensors such as one or more accelerometers or inclinometers coupled to one or more display panels of the device 5900.

As illustrated in FIG. 59, a coder/decoder (CODEC) 5934 can also be coupled to the processor 5910. A speaker 5922 and a microphone 5924 can be coupled to the CODEC 5934. FIG. 59 also indicates that a wireless controller 5940 can be coupled to the processor 5910 and to a wireless antenna 5942, and can enable the device 5900 to communicate via a wireless network such as a wide area network (WAN). The processor 5910 may be responsive to the wireless controller 5940 to display call indicia, such as a caller identification or a caller number, at one or more of the displays 5902, 5904, and 5906 when the device 5900 receives an incoming call. The processor 5910 may determine a size, position, and orientation, as well as a particular display 5902, 5904, and 5906, to display the call indicia at least partially based on the folding configuration of the device 5900 that is determined based on input from the sensors 5972, 5974, and 5976. For example the call indicia may be displayed as a pop-up window or text over one or more other applications having a size, location, and orientation based on the folding configuration.

In a particular embodiment, the device 5900 is configured to be operable for wireless telephonic communications in all folding configurations. In a particular embodiment, the processor 5910 is coupled to a short-range wireless interface 5946 that may be coupled to a headset 5950 via an antenna 5948. The short-range wireless interface 5946 may be wirelessly coupled to the headset 5950, such as a device including an earpiece and a microphone, via an ad-hoc wireless network, such as a Bluetooth network. The processor 5910 may implement logic to determine whether to display the call indicia or to alert the headset 5950 in response to an incoming call. For example, the processor 5910 may automatically alert the headset 5950 when the device 5900 is in a fully expanded configuration and a multimedia file or streaming media is displayed across all displays 5902, 5904, and 5906, and may display the call indicia otherwise.

In a particular embodiment, one or more components of FIG. 59 may be located proximate to or within one or more of the device panels. For example, the processor 5910 may be located within the center panel and the outer panels may each store a battery 5984 and 5986. In a particular embodiment, the panels may be weighted in a manner to enable the device to remain upright in a thumbing configuration.

As discussed previously with reference to FIG. 21, when a multi-panel electronic device displays an image or video across multiple display surfaces, a portion of the image or video may be missing due to the presence of a gap between the display surfaces. For example, referring to FIGS. 39-41, portions of the displayed webpage may be missing due to gaps between display surfaces of the electronic device 3801. To avoid this appearance of missing portions, the image or video may be "split" along the edge of the display surfaces. For example, the application icon 3206 of FIG. 33 and the application window 3516 of FIG. 36 may be "split." However, when such "splitting" occurs, the geometry of the application icon 3206 of FIG. 33 and the application window 3516 of FIG. 36 may appear distorted. That is, the application icon 3206 of FIG. 33 and the application window 3516 of FIG. 36 may appear elongated due to the presence of the gap 3414 of FIGS. 33 and 36.

Figure 60:
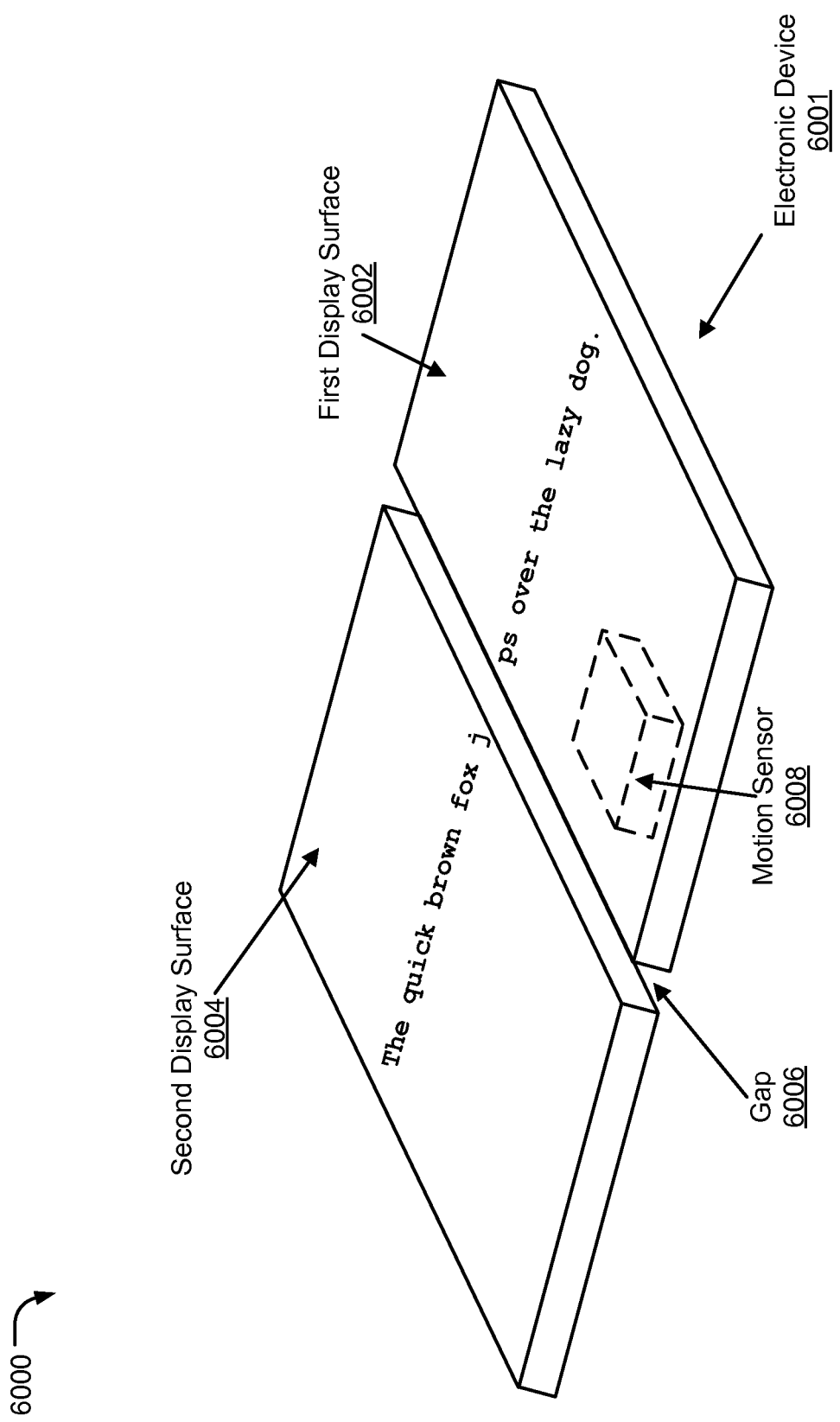
FIG. 60 is a diagram of a fourteenth illustrative embodiment of an electronic device.

Referring to FIG. 60, a particular illustrative embodiment of an electronic device 6001 is depicted and generally designated 6000. The electronic device 6001 includes a first display surface 6002 and a second display surface 6004 separated by a gap 6006. The electronic device 6001 also includes a motion sensor 6008. In a particular embodiment, the electronic device 6001 is a part of the electronic device 101 of FIGS. 1-7, the electronic device 800 of FIG. 8, the electronic device 900 of FIGS. 9-14, the electronic device 1501 of FIGS. 15-17, the electronic device 1801 of FIGS. 18-20, the electronic device 2100 of FIG. 21, the electronic device 2201 of FIGS. 22-23, the electronic device 2401 of FIGS. 24 and 25, the electronic device 2701 of FIGS. 27-31, the electronic device 3201 of FIGS. 32-37, the electronic device 3801 of FIGS. 38-41, the electronic device 4901 of FIGS. 49-55, or any combination thereof. In a particular embodiment, the electronic device 6001 is configured to operate according to the method 2600 of FIG. 26, the method 4200 of FIG. 42, the method 4300 of FIG. 43, the method 4400 of FIG. 44, the method 4500 of FIG. 45, the method 4600 of FIG. 46, the method 4700 of FIG. 47, the method 4800 of FIG. 48, the method 5600 of FIG. 56, the method 5700 of FIG. 57, the method 5800 of FIG. 58, or any combination thereof.

Occasionally, the electronic device 6001 may display an image that is larger than either of the display surfaces 6002 and 6004. For example, in the particular embodiment illustrated in FIG. 60, the electronic device 6001 displays the well-known pangram "The quick brown fox jumps over the lazy dog." A first portion "ps over the lazy dog." of the image is displayed at the first display surface 6002 and a second portion of the image "The quick brown fox j" is displayed at the second display surface 6004. Due to the presence of the gap 6006, a third portion "um" between the first portion and the second portion is not displayed.

The motion sensor 6008 may be configured to detect a movement of the electronic device 6001. For example, the motion sensor 6008 may be configured to detect a translation motion, a rotational motion, or a tilting motion of the electronic device 6001 as described with reference to the preceding figures. In an illustrative embodiment, the motion sensor 6008 includes an accelerometer, an inclinometer, or any combination thereof. In a particular embodiment, the motion sensor 6008 functions as described with reference to the sensors 3810 and 3820 of FIG. 38, the accelerometers 4922-4926 of FIGS. 49-55, or any combination thereof. In response to the motion sensor 6008 detecting a movement of the electronic device 6001, the electronic device 6001 may alter the image portions displayed at the first display surface 6002 and the second display surface 6004, as described herein with reference to FIGS. 61-69. It should be noted that although the motion sensor 6008 is depicted as coupled to the first display surface 6002, the motion sensor may instead be coupled to the second display surface 6004 or may be located in the gap 6006.

Figure 61:
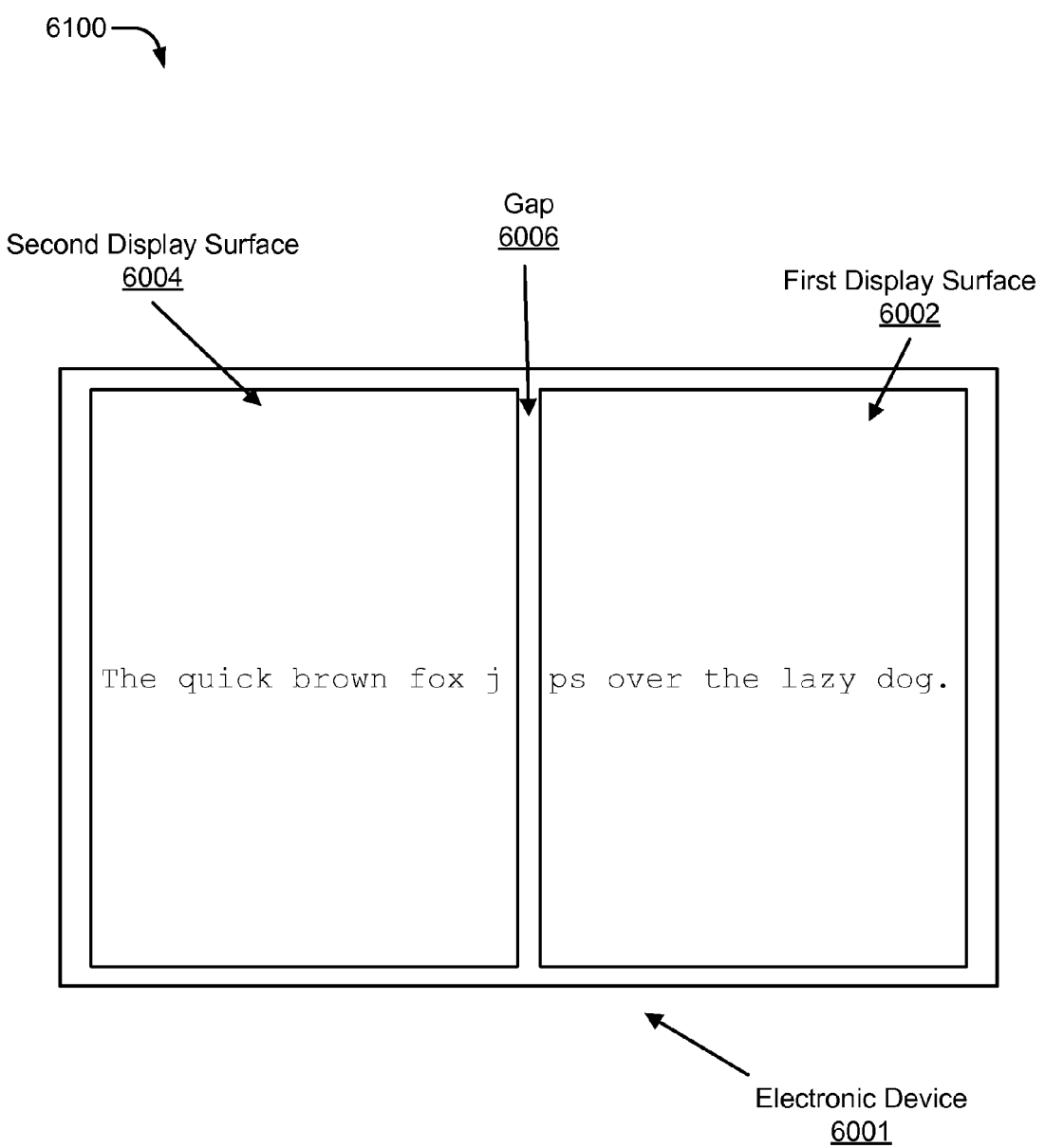
FIG. 61 is a diagram of an illustrative embodiment of displaying an image at the electronic device of FIG. 60.

Referring to FIG. 61, an illustrative embodiment of displaying an image at the electronic device 6001 is depicted and generally designated 6100. As described with reference to FIG. 60, a third portion "um" of the image is not displayed due to the gap 6006.

When the motion sensor 6008 of FIG. 60 detects a movement of the electronic device 6001, the electronic device 6001 may display the third portion "mp" of the image, such as at the first display surface 6002 or at the second display surface 6004. In a particular embodiment, the third portion of the image is displayed for a brief period of time (e.g., one or two seconds). After the brief period of time elapses, the image is once again displayed in the original state (i.e., the first portion of the image is displayed at the first display surface 6002, the second portion of the image is displayed at the second display surface 6004, and the third portion of the image is not displayed). Alternatively, the third portion of the image may be displayed until the motion sensor 6008 detects a second movement of the electronic device 6001.

Thus, the electronic device 6000 may be "shaken" or "tilted" by a user in order to see the third portion of the image not displayed due to the gap 6006. The third portion of the image may be displayed in the direction of the movement of the electronic device 6001 or in the direction opposite the movement of the electronic device 6001.

Figure 62:
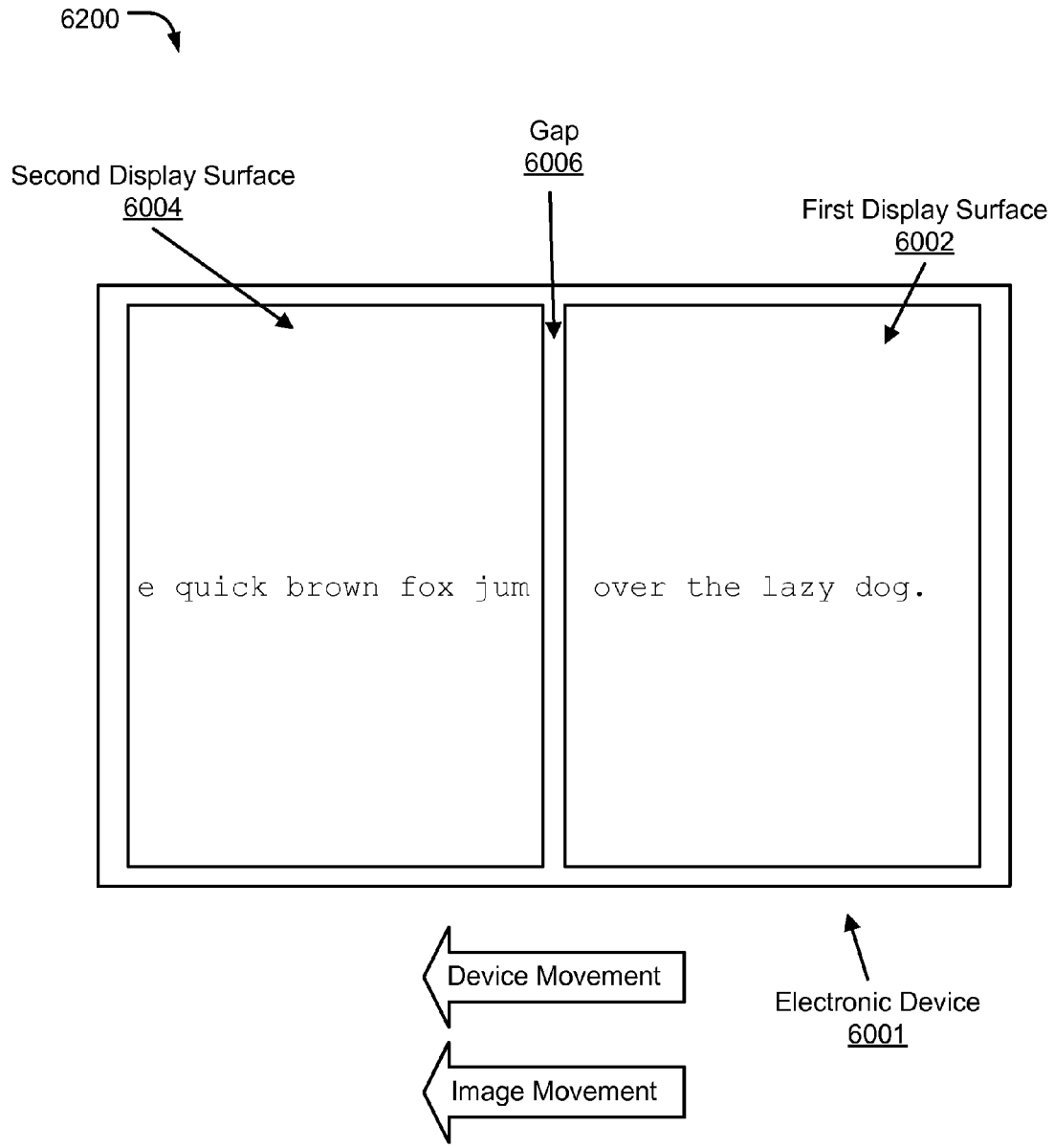
FIG. 62 is a diagram of a second illustrative embodiment of displaying an image at the electronic device of FIG. 60.

Referring to FIG. 62, an illustrative embodiment of displaying an image at the electronic device 6001 is depicted and generally designated 6200. In the particular embodiment illustrated in FIG. 62, the image moves in the same direction as a movement of the electronic device 6001. Thus, users of the electronic device 6001 may be made to feel as if they are "pushing" the image in the direction they shake the electronic device 6001. For example, the third portion "um" of the image may be displayed at the second display surface 6004 in response to a user of the electronic device 6001 moving the electronic device 6001 so as to translate the electronic device 6001 to the left substantially within the plane of the first display surface 6002.

Similarly, users of the electronic device 6001 may be made to feel as if they are "sliding" the image in the direction they tilt the electronic device 6001. For example, the third portion "um" of the image may be displayed at the second display surface 6004 in response to a user of the electronic device 6001 tilting the right edge of the electronic device upwards in a direction substantially normal to the plane of the first display surface 6002, such that the third portion "um" "slides down" onto the second display surface 6004.

It will be noted that in order to preserve the geometry of the image, when the third portion "um" of the image is displayed at the second display surface 6004, a hidden portion "Th" of the second portion of the image is no longer displayed at the second display surface 6004. In a particular embodiment, the third portion "um" and the hidden portion "Th" each have a width that is substantially equal to the width of the gap 6006.

Figure 63:
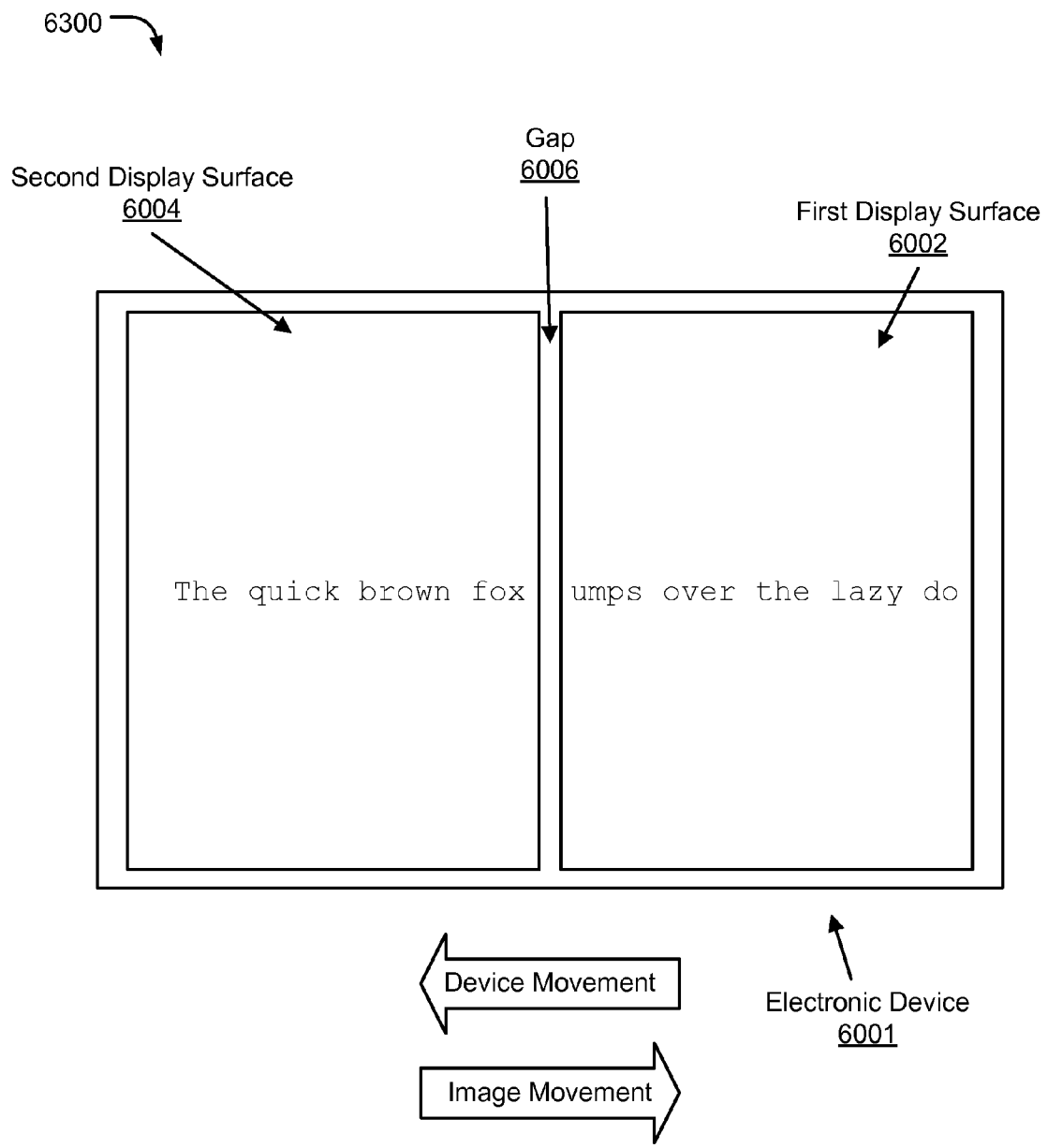
FIG. 63 is a diagram of a third illustrative embodiment of displaying an image at the electronic device of FIG. 60.

Referring to FIG. 63, an illustrative embodiment of displaying an image at the electronic device 6001 is depicted and generally designated 6300. In the particular embodiment illustrated in FIG. 63, the image moves in a direction opposite to a movement of the electronic device 6001. Thus, users of the electronic device 6001 be may perceive that if the electronic device 6001 functions as a moveable "window" to a fixed image.

It will be noted that in order to preserve the geometry of the image, when the third portion "um" of the image is displayed at the first display surface 6002, a hidden portion "g." of the first portion of the image is no longer displayed at the first display surface 6002. In a particular embodiment, the third portion "um" and the hidden portion "g." each have a width that is substantially equal to the width of the gap 6006.

Figure 64:
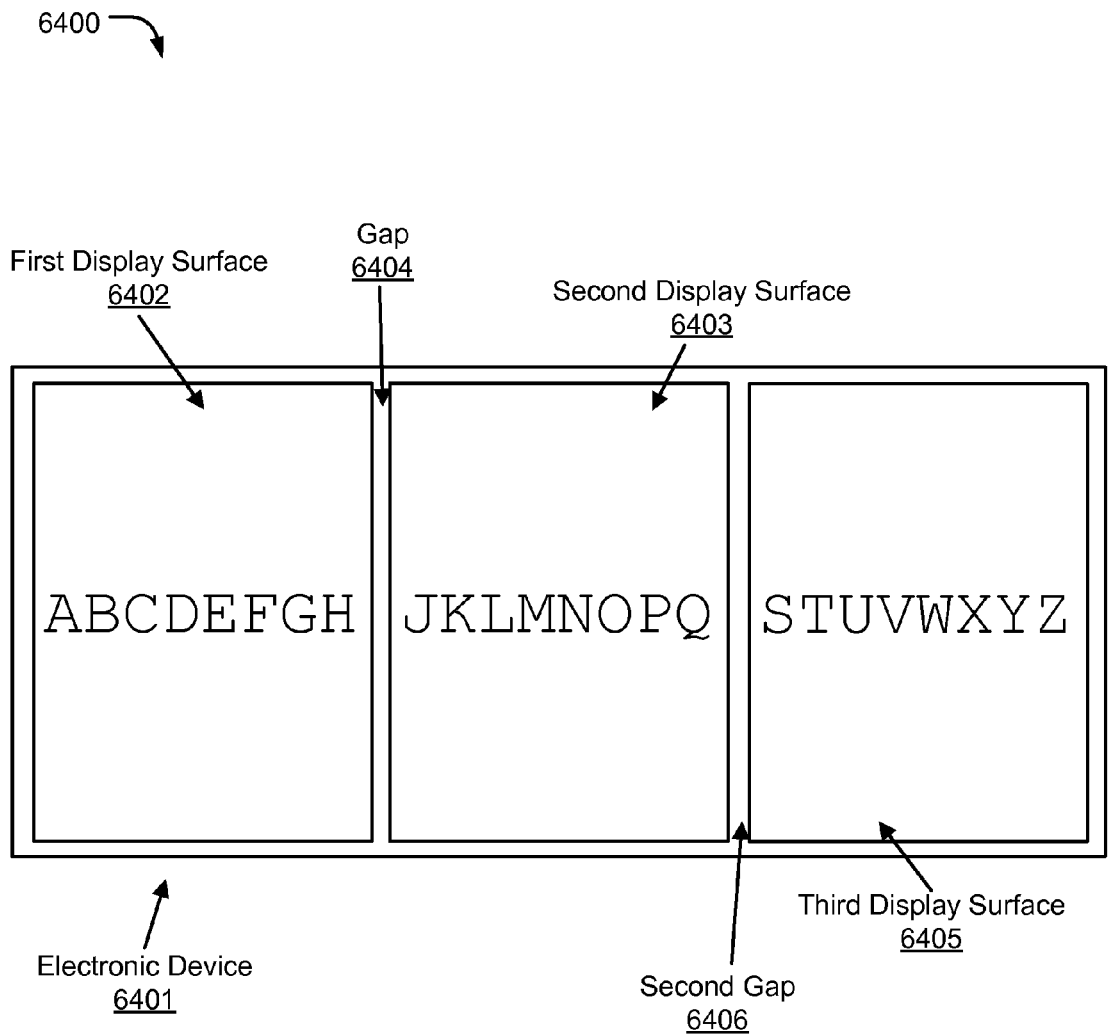
FIG. 64 is a diagram of a first illustrative embodiment of displaying an image at a three-panel version of the electronic device of FIG. 60.

Referring to FIG. 64, an illustrative embodiment of displaying an image at an electronic device 6401 is depicted and generally designated 6400. In a particular embodiment, the electronic device 6401 is a three-panel version of the electronic device 6001 of FIG. 60. The electronic device 6401 includes a first display surface 6402 and a second display surface 6403 separated by a gap 6404. The electronic device 6401 also includes a third display surface 6405 separated from the second display surface 6403 by a second gap 6406. The electronic device 6401 also includes a motion sensor (not shown) similar to the motion sensor 6008 of FIG. 60.

In the particular embodiment illustrated in FIG. 64, the electronic device 6401 displays an image of the alphabet "ABCDEFGHIJKLMNOPQRSTUVWXYZ." For purposes of illustration, the display surfaces 6402, 6403, and 6405 are depicted to be substantially equal in size and capable of displaying eight letters of the alphabet. The first display surface 6402 displays a first portion of the image "ABCDEFGH." The second display surface 6403 displays a second portion of the image "JKLMNOPQ." A third portion of the image "I" is not displayed due to the gap 6404. The third display surface 6405 displays a fourth portion of the image "STUVWXYZ." A fifth portion of the image "R" is not displayed due to the second gap 6406.

When the motion sensor of the electronic device 6401 detects a movement of the electronic device 6401, the electronic device may display the third portion "I" and fifth portion "R" of the image. In a particular embodiment, the third portion and the fifth portion are displayed for a brief period of time (e.g., one or two seconds). Thus, the electronic device 6401 may be "shaken" or "tilted" by a user in order to see portions of the image not displayed due to the gaps 6404 and 6406.

Figure 65:
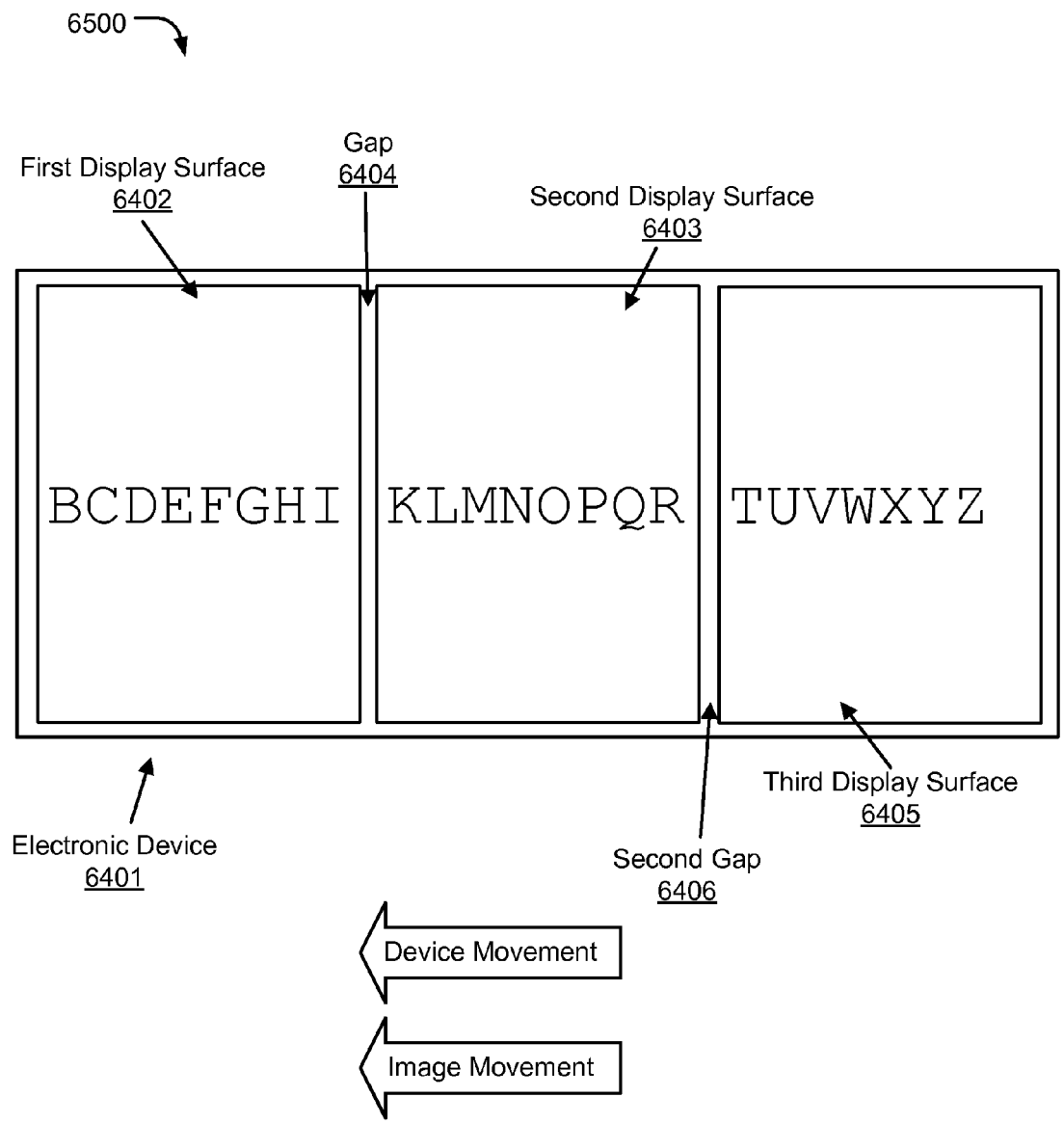
FIG. 65 is a diagram of a second illustrative embodiment of displaying an image at a three-panel version of the electronic device of FIG. 60.

Referring to FIG. 65, an illustrative embodiment of displaying an image at the electronic device 6401 is depicted and generally designated 6500. In the particular embodiment illustrated in FIG. 65, the image moves in the same direction as a movement of the electronic device 6401. The third portion "I" is displayed at the first display surface 6401 proximate to the gap 6404 and the fifth portion "R" is displayed at the second display surface 6403 proximate to the second gap 6406. Thus, users of the electronic device 6401 may perceive that they are "pushing" the image in the direction they shake, or quickly move the electronic device 6401. Similarly, users of the electronic device 6401 may, alternatively, perceive that they are "sliding" the image in the direction they tilt the electronic device 6401.

Figure 66:
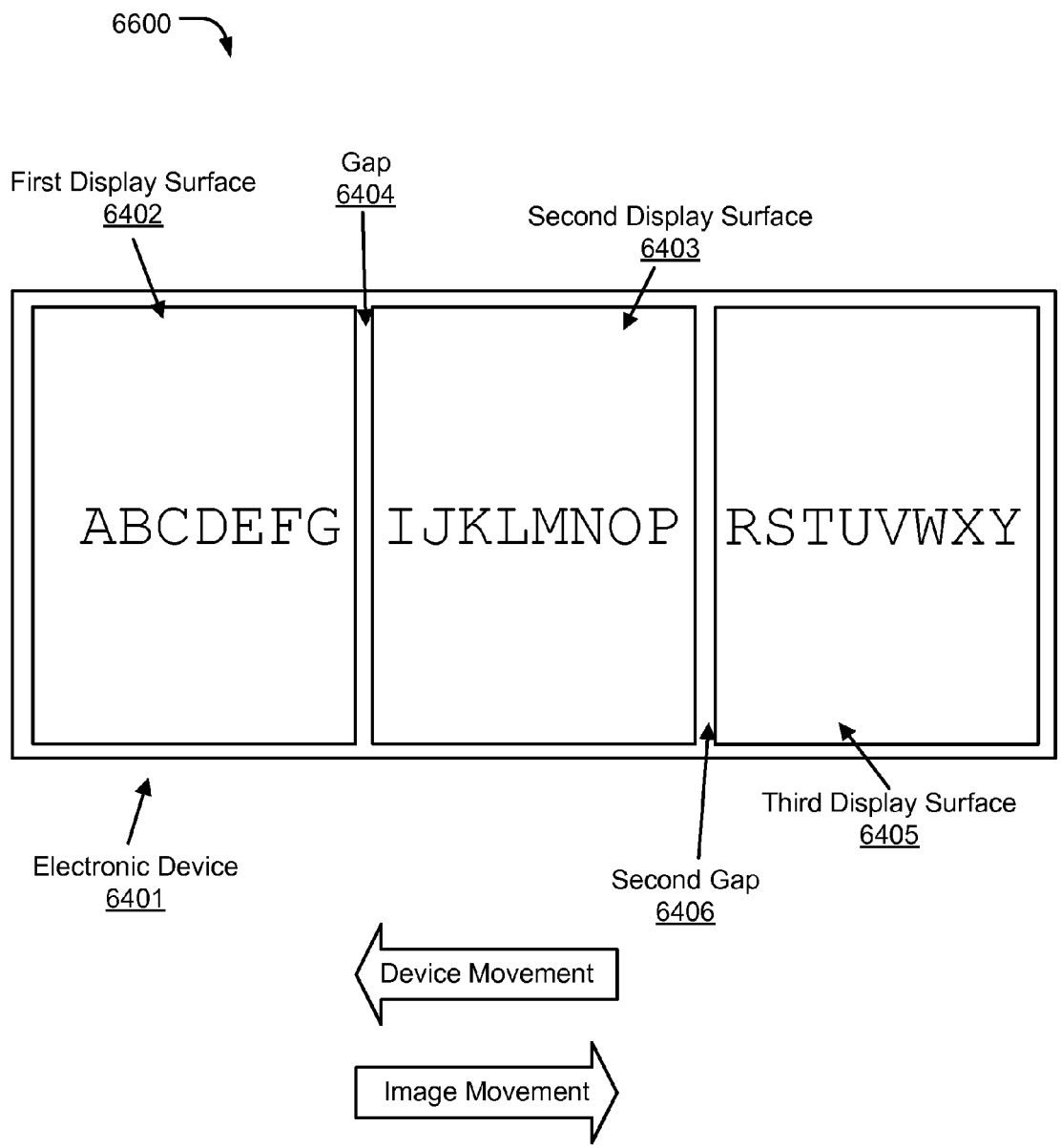
FIG. 66 is a diagram of a third illustrative embodiment of displaying an image at a three-panel version of the electronic device of FIG. 60.

Referring to FIG. 66, an illustrative embodiment of displaying an image at the electronic device 6401 is depicted and generally designated 6600. In the particular embodiment illustrated in FIG. 66, the image moves in a direction opposite to a movement of the electronic device 6401. The third portion "I" is displayed at the second display surface 6403 proximate to the gap 6404 and the fifth portion "R" is displayed at the third display surface 6405 proximate to the second gap 6406. Thus, users of the electronic device 6401 perceive that the electronic device 6401 functions as a moveable "window" to a fixed image.

It should be noted that although the embodiments illustrated in FIGS. 60-66 depict images that include text, images may also include non-textual content such as geometric shapes, digital illustrations, and photographs.

Figure 67:
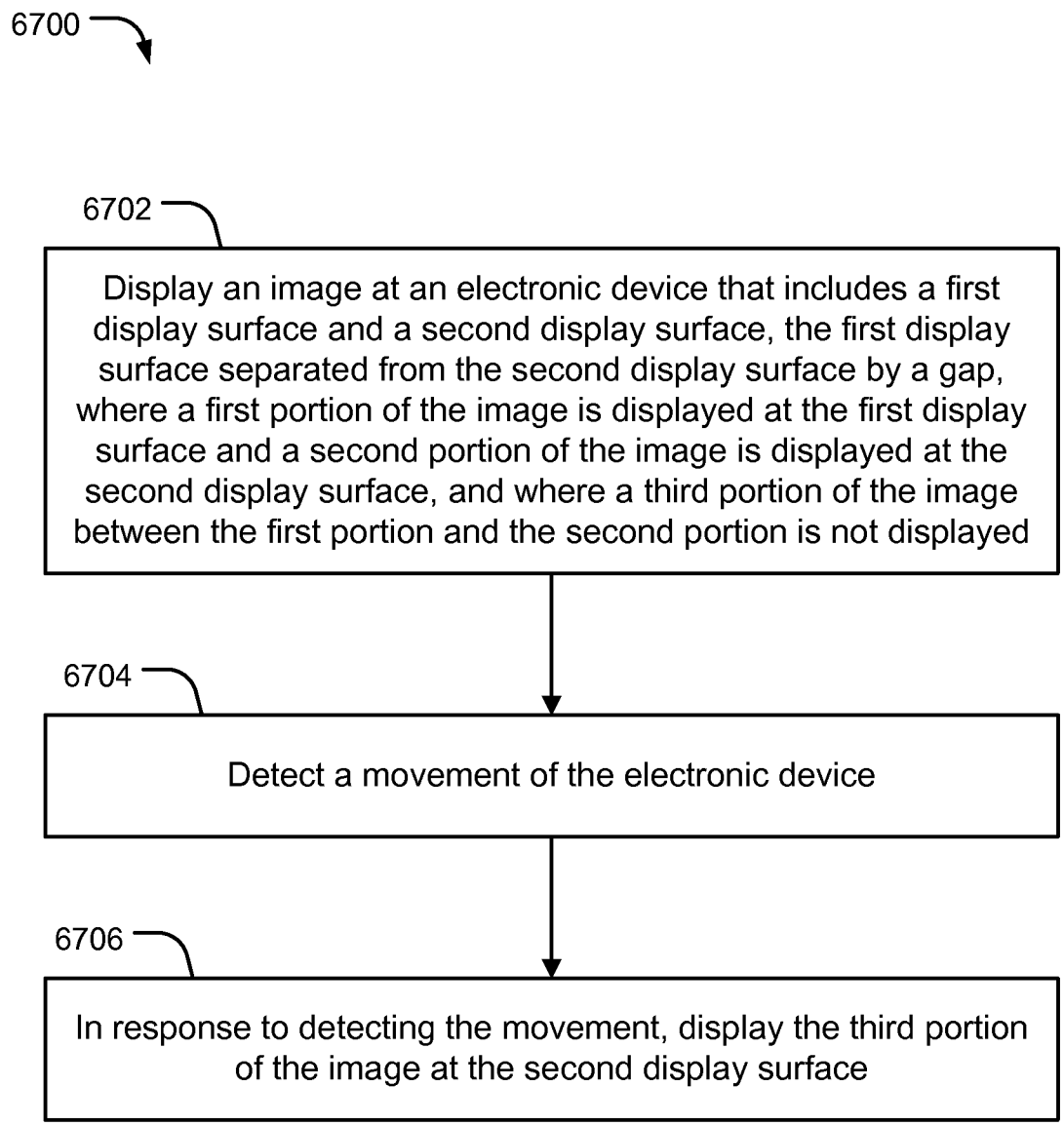
FIG. 67 is a flowchart of a first illustrative embodiment of a method of displaying an image at an electronic device.

FIG. 67 is a flowchart of a first illustrative embodiment of a method 6700 of displaying an image at an electronic device. In a particular embodiment, the method 6700 may be performed by the electronic device 101 of FIGS. 1-7, the electronic device 800 of FIG. 8, the electronic device 900 of FIGS. 9-14, the electronic device 1501 of FIGS. 15-17, the electronic device 1801 of FIGS. 18-20, the electronic device 2100 of FIG. 21, the electronic device 2201 of FIGS. 22-23, the electronic device 2401 of FIGS. 24 and 25, the electronic device 2701 of FIGS. 27-31, the electronic device 3201 of FIGS. 32-37, the electronic device 3801 of FIGS. 38-41, the electronic device 4901 of FIGS. 49-55, the electronic device 6001 of FIGS. 60-63, the electronic device 6401 of FIGS. 64-66, or any combination thereof.

The method 6700 includes displaying an image at an electronic device that includes a first display surface and a second display surface, at 6702. The first display surface is separated from the second display surface by a gap. A first portion of the image is displayed at the first display surface, a second portion of the image is displayed at the second display surface, and a third portion of the image between the first portion and the second portion is not displayed. For example, in FIG. 60, the first portion "ps over the lazy dog." may be displayed at the first display surface 6002, the second portion "The quick brown fox j" may be displayed at the second display surface 6004, and the third portion "um" may not be displayed.

The method 6700 also includes detecting a movement of the electronic device, at 6704. For example, in FIG. 60, the motion sensor 6008 may detect a movement of the electronic device 6001.

The method 6700 further includes, in response to detecting the movement, displaying the third portion of the image at the second display surface, at 6706. For example, the third portion "um" of the image may be displayed at the second display surface 6004, as depicted in FIG. 62.

Figure 68:
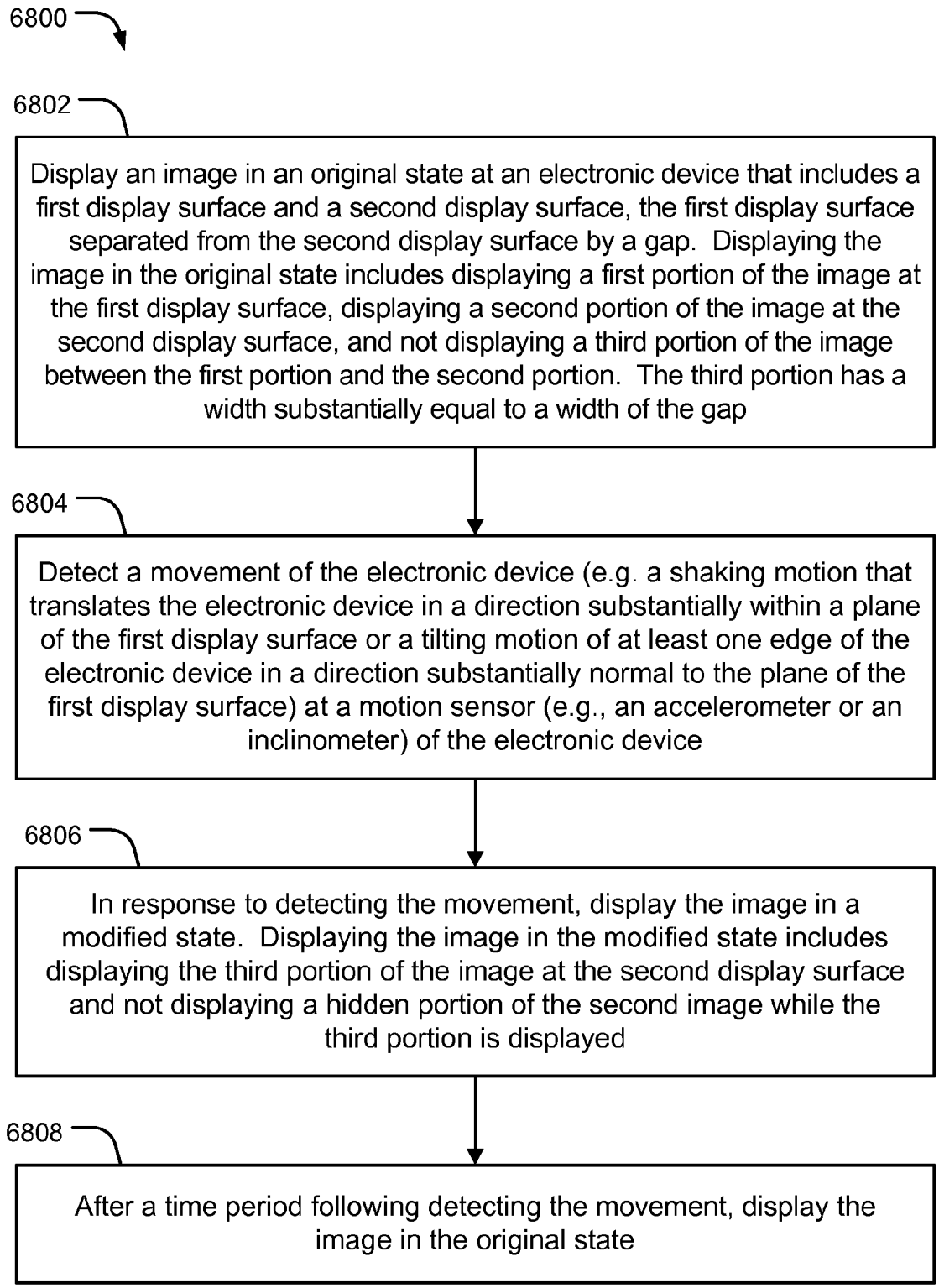
FIG. 68 is a flowchart of a second illustrative embodiment of a method of displaying an image at an electronic device.

FIG. 68 is a flowchart of a second illustrative embodiment of a method 6800 of displaying an image at an electronic device. In a particular embodiment, the method 6800 may be performed by the electronic device 101 of FIGS. 1-7, the electronic device 800 of FIG. 8, the electronic device 900 of FIGS. 9-14, the electronic device 1501 of FIGS. 15-17, the electronic device 1801 of FIGS. 18-20, the electronic device 2100 of FIG. 21, the electronic device 2201 of FIGS. 22-23, the electronic device 2401 of FIGS. 24 and 25, the electronic device 2701 of FIGS. 27-31, the electronic device 3201 of FIGS. 32-37, the electronic device 3801 of FIGS. 38-41, the electronic device 4901 of FIGS. 49-55, the electronic device 6001 of FIGS. 60-63, the electronic device 6401 of FIGS. 64-66, or any combination thereof.

The method 6800 includes displaying an image in an original state at an electronic device that includes a first display surface and a second display surface, at 6802. The first display surface is separated from the second display surface by a gap. Displaying the image in the original state includes displaying a first portion of the image at the first display surface, displaying a second portion of the image at the second display surface, and not displaying a third portion of the image between the first portion and the second portion, where the third portion has a width substantially equal to the width of the gap. For example, in FIG. 60, the first portion "ps over the lazy dog." may be displayed at the first display surface 6002, the second portion "The quick brown fox j" may be displayed at the second display surface 6004, and the third portion "um" may not be displayed.

The method 6800 also includes detecting a movement of the electronic device at a motion sensor of the electronic device, at 6804. The movement may be a shaking motion that translates the electronic device in a direction substantially within a plane of the first display surface or a tilting motion of at least one edge of the electronic device in a direction substantially normal to the plane of the first display surface. The motion sensor may be an accelerometer, an inclinometer, or any combination thereof. For example, in FIG. 60, the motion sensor 6008 may detect a movement (e.g. translation or tilting motion) of the electronic device 6001.

The method 6800 further includes, in response to detecting the movement, displaying the image in a modified state, at 6806. Displaying the image in the modified state includes displaying the third portion of the image at the second display surface and not displaying a hidden portion of the second portion while the third portion is displayed. For example, the hidden portion of the second portion "Th" may not be displayed while the third portion "um" of the image is displayed at the second display surface 6004, as depicted in FIG. 62.

The method 6800 includes displaying the image in the original state after a time period following detecting the movement, at 6808. For example, after a time period following the movement, the image may be displayed in the original state, as depicted in FIG. 60. In another embodiment, a second movement of the electronic device my trigger the change to the original state. For example, if the electronic device displayed the image in the modified state in response to detecting a shaking motion to the left, the electronic device may display the image in the original state in response to detecting a shaking motion to the right.

Figure 69:
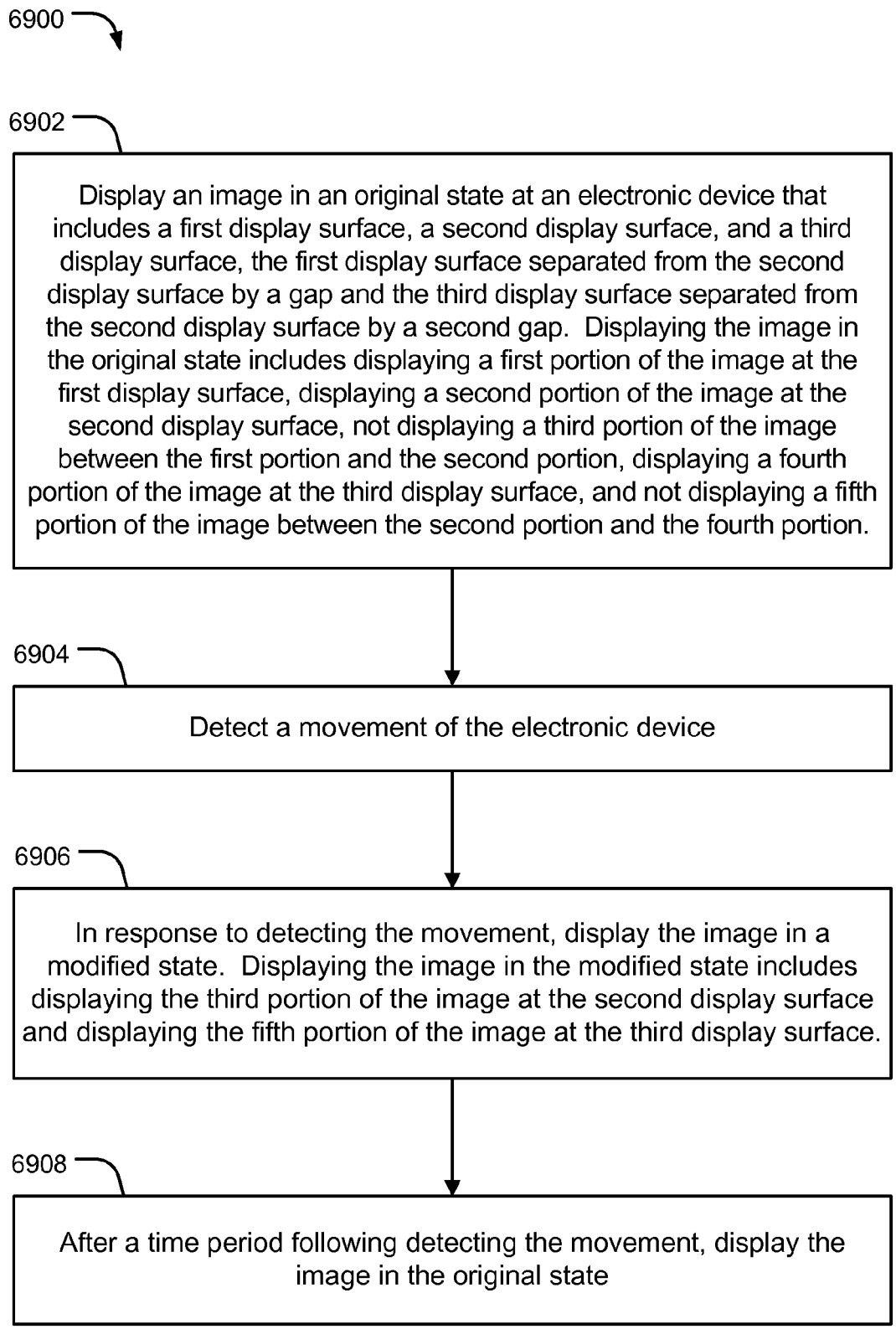
FIG. 69 is a flowchart of a third illustrative embodiment of a method of displaying an image at an electronic device.

FIG. 69 is a flowchart of a third illustrative embodiment of a method 6900 of displaying an image at an electronic device. In a particular embodiment, the method 6900 may be performed by three-panel version of the electronic device 101 of FIGS. 1-7, the electronic device 800 of FIG. 8, the electronic device 900 of FIGS. 9-14, the electronic device 1501 of FIGS. 15-17, the electronic device 1801 of FIGS. 18-20, the electronic device 2100 of FIG. 21, the electronic device 2201 of FIGS. 22-23, the electronic device 2401 of FIGS. 24 and 25, the electronic device 2701 of FIGS. 27-31, the electronic device 3201 of FIGS. 32-37, the electronic device 3801 of FIGS. 38-41, the electronic device 4901 of FIGS. 49-55, the electronic device 6001 of the FIGS. 60-63, the electronic device 6401 of FIGS. 64-66, or any combination thereof.

The method 6900 includes displaying an image in an original state at an electronic device that includes a first display surface, a second display surface, and a third display surface, at 6902. The first display surface is separated from the second display surface by a gap and the third display surface is separated from the second display surface by a second gap. Displaying the image in the original state includes displaying a first portion of the image at the first display surface, displaying a second portion of the image at the second display surface, not displaying a third portion of the image between the first portion and the second portion, displaying a fourth portion of the image at the third display surface, and not displaying a fifth portion of the image between the second portion and the fourth portion. For example, referring to FIG. 64, the first portion "ABCDEFGH" may be displayed at the first display surface 6402, the second portion "JKLMNOPQ" may be displayed at the second display surface 6404, the third portion "I" may not be displayed, the fourth portion "STUVWXYZ" may be displayed at the third display surface 6405, and the fifth portion "R" may not be displayed.

The method 6900 also includes detecting a movement of the electronic device, at 6904. For example, referring to FIG. 64, a movement of the electronic device 6401 may be detected.

The method 6900 further includes, in response to detecting the movement, displaying the image in a modified state, at 6906. Displaying the image in the modified state may include displaying the third portion of the image at the second display surface and displaying the fifth portion of the image at the third display surface. For example, the third portion "I" may be displayed at the second display surface 6403 and the fifth portion "R" may be displayed at the third display surface 6405, as depicted in FIG. 66.

The method 6900 further includes, after a time period following detecting the movement, displaying the image in the original state, at 6908. For example, after a time period following the movement, the image may be displayed in the original state, as depicted in FIG. 64. Alternatively, a second movement of the electronic device may trigger the change to the original state. For example, if the electronic device displayed the image in the modified state in response to detecting a shaking motion to the left, the electronic device may display the image in the original state in response to detecting a shaking motion to the right.

It will thus be appreciated that a user of a multi-display device may be able to control (e.g., via motion) when the multi-display device "splits" an image along a gap (thereby displaying the entire image in a distorted geometry) and when the multi-display device "hides" a portion of the image corresponding to the gap (thereby preserving the image geometry but not displaying the entire image). Thus, the user may simply make a quick motion to see text and shapes of the image that would otherwise not be displayed due to the gap. Furthermore, content providers may distribute such "oversized" content to users without having to worry about making sure that important information is not located in "gap regions" that may be hidden by multi-display devices.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in a tangible storage medium such as a random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of tangible storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

The invention claimed is:

1. An electronic device comprising:
   a first panel having a first display surface;
   an inclinometer configured to detect a change in inclination of the first panel;
   an accelerometer configured to detect a rotation of the first panel from a landscape orientation to a portrait orientation; and
   a processor configured to execute at least one software application having a graphical user interface, the processor responsive to the inclinometer and responsive to the accelerometer to automatically redraw an image displayed at the first display surface from a landscape-type display of the image to a portrait-type display of the image when a change in the inclination of the first panel does not exceed a threshold during the rotation of the first panel;
   wherein the threshold comprises an angle in one of a first range between 5 degrees and 30 degrees and a second range between negative 5 (−5) degrees and negative 30 (−30) degrees.

2. The electronic device of claim 1, wherein the image comprises an image of a keyboard.

3. The electronic device of claim 1, wherein the processor is configured to redraw the image, such that the image maintains a substantially stationary orientation from a perspective of a viewer of the display during the rotation.

4. The electronic device of claim 1, further comprising:
   a second panel having a second display surface;
   a third panel having a third display surface, wherein the second panel is rotatably coupled to a first edge of the first panel and wherein the third panel is rotatably coupled to a second edge of the first panel;
   wherein the inclinometer is located at the first panel;
   wherein the accelerometer is offset from a center of the second panel; and
   wherein the processor is configured to redraw an image displayed at the first display surface, the second display surface, the third display surface, or any combination thereof, from a landscape-type display of the image to a portrait-type display of the image when the first panel, the second panel, and the third panel are in at least one predetermined folding configuration and the change in the inclination of the first panel does not exceed the threshold during the rotation of the first panel.

5. The electronic device of claim 4, wherein the processor is further configured to initiate an action at the electronic device responsive to the inclinometer and the accelerometer when the first panel, the second panel, and the third panel are in at least one predetermined folding configuration and the change in the inclination of the first panel does not exceed a threshold during the rotation of the first panel.

6. The electronic device of claim 5, wherein the action at the electronic device comprises triggering one or more vibration actuators of the electronic device.

7. The electronic device of claim 1, wherein the processor is further responsive to the inclinometer to detect a change in an orientation caused by a rotation of the first display surface about an axis within a plane of the first display surface.

8. The electronic device of claim 1, wherein the angle is about 15 degrees.

9. The electronic device of claim 1, wherein the angle is about negative 15 (−15) degrees.

10. The electronic device of claim 1, wherein the first display surface maintains a substantially vertical orientation during the rotation.

11. The electronic device of claim 1, wherein the first display surface maintains a substantially horizontal orientation during the rotation.

12. A method comprising:
    detecting a change in an inclination at a panel of an electronic device, the panel having a display surface;
    detecting a rotation of the panel from a first orientation to a second orientation; and
    automatically redrawing an image displayed at the display surface responsive to the rotation when the change in the inclination of the panel does not exceed a threshold during the rotation;
    wherein the threshold comprises an angle in one of a first range between 5 degrees and 30 degrees and a second range between negative 5 (−5) degrees and negative 30 (−30) degrees.

13. The method of claim 12, wherein the first orientation is a landscape orientation and the second orientation is a portrait orientation.

14. The method of claim 12, wherein the panel is a second panel of the electronic device, the display surface is a second display surface of the second panel, the second panel is rotatably coupled to a first panel along a first hinged edge of the second panel, the first panel has a first display surface, a third panel is rotatably coupled to the second panel along a second hinged edge of the second panel, and the third panel has a third display surface.

15. The method of claim 14, wherein automatically redrawing the image further comprises redrawing the image displayed at the first display surface, the second display surface, the third display surface, or any combination thereof, from a landscape-type display of the image to a portrait-type display of the image when the first panel, the second panel, and the third panel are in at least one predetermined folding configuration.

16. The method of claim 12, wherein detecting the change in inclination at the panel of the electronic device further comprises detecting a change in an orientation caused by a rotation about of the display surface about an axis within a plane of the display surface.

17. The method of claim 12, wherein the angle is about 15 degrees.

18. The method of claim 12, wherein the angle is about negative 15 (−15) degrees.

19. The method of claim 12, wherein the display surface maintains a substantially vertical orientation during the rotation.

20. The method of claim 12, wherein the display surface maintains a substantially horizontal orientation during the rotation.

21. An apparatus comprising:
    means for detecting a change in an inclination at a panel of an electronic device, the panel having a display surface;
    means for detecting a rotation of the panel from a landscape orientation to a portrait orientation; and
    means for automatically redrawing an image displayed at the display surface responsive to the detected rotation when the change in the inclination of the panel does not exceed a threshold during the rotation;
    wherein the threshold comprises an angle in one of a first range between 5 degrees and 30 degrees and a second range between negative 5 (−5) degrees and negative 30 (−30) degrees.

22. The apparatus of claim 21, further comprising means for initiating an action at the electronic device responsive to the rotation when the change in the inclination of the panel does not exceed the threshold during the rotation.

23. The apparatus of claim 21, wherein the means for initiating the specific process comprises means for triggering one or more vibration actuators of the electronic device.

24. The apparatus of claim 21, wherein:
the panel is a second panel of the electronic device, the display surface is a second display surface, the second panel is rotatably coupled to a first panel along a first hinged edge of the second panel, the first panel has a first display surface, a third panel is rotatably coupled to the second panel along a second hinged edge of the second panel, and the third panel has a third display surface; and
the means for automatically redrawing the image further comprises means for redrawing the image displayed at the first display surface, the second display surface, the third display surface, or any combination thereof, from a landscape-type display of the image to a portrait-type display of the image when the first panel, the second panel, and the third panel are in at least one predetermined folding configuration.

25. The apparatus of claim 21, wherein the means for automatically redrawing the image is further responsive to the means for detecting an inclination to detect a change in an orientation caused by a rotation of the display surface about an axis within a plane of the first display surface.

26. The apparatus of claim 21, wherein the angle is about 15 degrees.

27. The apparatus of claim 21, wherein the angle is about negative 15 (−15) degrees.

28. The apparatus of claim 21, wherein the display surface maintains a substantially vertical orientation during the rotation.

29. The apparatus of claim 21, wherein the display surface maintains a substantially horizontal orientation during the rotation.

30. A non-transitory computer program product comprising a computer readable medium having stored thereon instructions that, when executed, cause one or more processors to:
detect a change in an inclination at a panel of an electronic device, the panel having a display surface;
detect a rotation of the panel from a landscape orientation to a portrait orientation; and
automatically redraw an image displayed at the display surface responsive to the detected rotation when the change in the inclination of the panel does not exceed a threshold during the rotation;
wherein the threshold comprises an angle in one of a first range between 5 degrees and 30 degrees and a second range between negative 5 (−5) degrees and negative 30 (−30) degrees.

31. The non-transitory computer program product of claim 30, wherein detecting the change in inclination further comprises detecting a change in an orientation caused by a rotation about of the display surface about an axis within a plane of the display surface.

32. The non-transitory computer program product of claim 30, further comprising instructions that, when executed, cause the one or more processors to initiate an action at the electronic device responsive to the rotation when the change in the inclination of the panel does not exceed the threshold during the rotation.

33. The non-transitory computer program product of claim 30, wherein initiating the action further comprises triggering one or more vibration actuators of the electronic device.

34. The non-transitory computer program product of claim 30, wherein the display surface maintains a substantially horizontal orientation during the rotation.

35. The non-transitory computer program product of claim 30, wherein the angle is about 15 degrees.

36. The non-transitory computer program product of claim 30, wherein the angle is about negative 15 (−15) degrees.

37. The non-transitory computer program product of claim 30, wherein the first display surface maintains a substantially vertical orientation during the rotation.

38. The non-transitory computer program product of claim 30, wherein the display surface maintains a substantially horizontal orientation during the rotation.

* * * * *